(12) United States Patent
Lemay et al.

(10) Patent No.: US 11,562,063 B2
(45) Date of Patent: *Jan. 24, 2023

(54) ENCODED INLINE CAPABILITIES

(71) Applicant: INTEL CORPORATION, Santa Clara, CA (US)

(72) Inventors: Michael Lemay, Hillsboro, OR (US); David M. Durham, Beaverton, OR (US); Michael E. Kounavis, Portland, OR (US); Barry E. Huntley, Hillsboro, OR (US); Vedvyas Shanbhogue, Austin, TX (US); Jason W. Brandt, Austin, TX (US); Josh Triplett, Hillsboro, OR (US); Gilbert Neiger, Portland, OR (US); Karanvir Grewal, Hillsboro, OR (US); Baiju Patel, Portland, OR (US); Ye Zhuang, Portland, OR (US); Jr-Shian Tsai, Portland, OR (US); Vadim Sukhomlinov, Santa Clara, CA (US); Ravi Sahita, Portland, OR (US); Mingwei Zhang, Hillsboro, OR (US); James C. Farwell, Portland, OR (US); Amitabh Das, Hillsboro, OR (US); Krishna Bhuyan, Sammamish, WA (US)

(73) Assignee: Intel Corporation, Santa Clara, CA (US)

( * ) Notice: Subject to any disclaimer, the term of this patent is extended or adjusted under 35 U.S.C. 154(b) by 144 days.

This patent is subject to a terminal disclaimer.

(21) Appl. No.: 17/114,246

(22) Filed: Dec. 7, 2020

(65) Prior Publication Data

US 2021/0117535 A1    Apr. 22, 2021

Related U.S. Application Data

(63) Continuation of application No. 16/024,547, filed on Jun. 29, 2018, now Pat. No. 10,860,709.

(51) Int. Cl.
*G06F 21/53*    (2013.01)
*G06F 12/02*    (2006.01)

(52) U.S. Cl.
CPC ............ *G06F 21/53* (2013.01); *G06F 12/023* (2013.01); *G06F 2212/1008* (2013.01); *G06F 2212/1052* (2013.01); *G06F 2221/034* (2013.01)

(58) Field of Classification Search
CPC ............... G06F 21/53; G06F 12/023; G06F 2212/1008; G06F 2212/1052;
(Continued)

(56) References Cited

U.S. PATENT DOCUMENTS 5,625,819 A ‡ 4/1997 Hoffer, Jr. ............ G06F 11/1441
8,762,717 B2 ‡ 6/2014 Nagai ............... G06Q 20/35765
                                                                 713/168

(Continued)

OTHER PUBLICATIONS

Shen Y., et al., "To Isolate, or to Share? That is a Question for Intel SGX," APSys '18, Aug. 27-28, 2018, 9 pages.‡

(Continued)

*Primary Examiner* — Christopher A Revak
(74) *Attorney, Agent, or Firm* — Nicholson De Vos Webster & Elliott LLP

(57) ABSTRACT

Disclosed embodiments relate to encoded inline capabilities. In one example, a system includes a trusted execution environment (TEE) to partition an address space within a memory into a plurality of compartments each associated with code to execute a function, the TEE further to assign a message object in a heap to each compartment, receive a request from a first compartment to send a message block to a specified destination compartment, respond to the request by authenticating the request, generating a corresponding encoded capability, conveying the encoded capability to the destination compartment, and scheduling the destination (Continued)

compartment to respond to the request, and subsequently, respond to a check capability request from the destination compartment by checking the encoded capability and, when the check passes, providing a memory address to access the message block, and, otherwise, generating a fault, wherein each compartment is isolated from other compartments.

24 Claims, 37 Drawing Sheets

(58) Field of Classification Search
CPC ........... G06F 2221/034; G06F 9/45516; G06F 9/45558; G06F 12/1441; G06F 21/57; G06F 2009/45583; G06F 2009/45587; G06F 21/74; G06F 15/7807; G06F 9/547; G06F 2209/544; H04L 9/0897; H04L 9/3242; H04L 2209/127
See application file for complete search history.

(56) References Cited

U.S. PATENT DOCUMENTS

| | | | | |
|---|---|---|---|---|
| 8,995,657 | B2 ‡ | 3/2015 | Nagai | G09C 1/00 380/44 |
| 9,390,030 | B2 ‡ | 7/2016 | Kobayashi | G06F 21/10 |
| 9,569,612 | B2 ‡ | 2/2017 | Wilkerson | G06F 12/145 |
| 10,860,709 | B2 * | 12/2020 | Lemay | G06F 9/45558 |
| 2006/0256108 | A1 ‡ | 11/2006 | Scaralata | G06F 9/45558 345/418 |
| 2011/0125812 | A1 * | 5/2011 | Kandasamy | G06F 9/45537 711/170 |
| 2015/0143071 | A1 ‡ | 5/2015 | Sahita | G06F 21/6227 711/202 |
| 2018/0113817 | A1 ‡ | 4/2018 | Banginwar | G06F 9/485 |
| 2018/0189479 | A1 ‡ | 7/2018 | Dam | G06N 5/003 |
| 2020/0042733 | A1 * | 2/2020 | Chen | G06F 9/526 |
| 2020/0097646 | A1 ‡ | 3/2020 | Buhren | G06F 9/5016 |
| 2020/0117509 | A1 * | 4/2020 | Wimmer | G06F 9/5066 |
| 2020/0125742 | A1 ‡ | 4/2020 | Kounavis | G06F 9/45558 |
| 2020/0133885 | A1 ‡ | 4/2020 | Tshouva | G06F 21/78 |
| 2021/0200546 | A1 * | 7/2021 | Lemay | G06F 9/45558 |

OTHER PUBLICATIONS

Kwon A., et al., "Low-Fat Pointers: Compact Encoding and Efficient Gate—Level Implementation of Fat Pointers for Spatial Safety and Capability-based Security," ACM, CCS'13, Nov. 4-8, 2013, 12 pages.‡
Zeng B., et al., "Strato: A Retargetable Framework for Low-Level Inlined-Reference Monitors," Proceedings of the 22nd USENIX conference on Security, Aug. 2013, 14 pages.‡

Zeng B., et al., "Combining Control-Flow Integrity and Static Analysis for Efficient and Validated Data Sandboxing," CCS'11, Oct. 17-21, 2011, 11 pages.‡
Duck G J., et al., "Heap Bounds Protection with Low Fat Pointers," ACM, CC'16, Mar. 17-18, 2016, pp. 132-142.‡
Duck G J., et al., "Stack Bounds Protection with Low Fat Pointers," NDSS '17, Feb. 26-Mar. 1, 2017, 1-15 pages.‡
Bershad B N., et al., "Lightweight Remote Procedure Call," ACM Transactions on Computer Systems, vol. 8 (1), Feb. 1990, pp. 37-55.‡
Shinde et al., "Panoply: Low-TCB Linux Applications with SGX Enclaves", Network and Distributed System Security (NDSS) Symposium 2017, Feb. 27, 2017, 16 pages.‡
Vilanova et al., "CODOMs: Protecting Software with Code-centric Memory Domains" , 2014 ACM/IEEE 41st International Symposium on Computer Architecture (ISCA), vol. 42, No. 3, Jun. 14, 2014, pp. 469-480.‡
European Search Report and Search Opinion, EP App. No. 19176635.1, dated Nov. 5, 2019, 10 pages.‡
Wagner et al, "Compartmental Memory Management in a Modern Web Browser", Jun. 2011, ISMM'11, p. 119-128.‡
"Heap Functions", May 31, 2018, Win 32 apps, Microsoft Docs, p. 1-2.‡
Decision to grant a European patent, EP App. No. 19176635.1, dated Oct. 14, 2021, 2 pages.
European Search Report and Search Opinion, EP App. No. 21201854.3, dated Jan. 25, 2022, 10 pages.
Bershad et al., "Lightweight Remote Procedure Call", ACM Transactions on Computer Systems, vol. 8, No. 1, Feb. 1990, pp. 37-55.
Duck et al., "Heap Bounds Protection with Low Fat Pointers", ACM, CC'16, Mar. 17-18, 2016, pp. 132-142.
Duck et al., "Stack Bounds Protection with Low Fat Pointers", NDSS '17, Feb. 26-Mar. 1, 2017, pp. 1-15.
Kwon et al., "Low-Fat Pointers: Compact Encoding and Efficient Gate-Level Implementation of Fat Pointers for Spatial Safety and Capability-based Security", ACM, CCS'13, Nov. 4-8, 2013, 12 pages.
Microsoft, "Heap Functions", Microsoft Docs, May 31, 2018, pp. 1-2.
Notice of Allowance, U.S. Appl. No. 16/024,547, dated Aug. 4, 2020, 9 pages.
Shen et al., "To Isolate, or to Share? That is a Question for Intel SGX", APSys '18, Aug. 27-28, 2018, 9 pages.
Wagner et al, "Comparlmental Memory Management in a Modem Web Browser", ISMM'11, Jun. 2011, pp. 119-128.
Zeng et al., "Strate: A Retargetable Framework for Low-Level Inlined-Reference Monitors", Proceedings of the 22nd USENIX conference on Security, Aug. 2013, 14 pages.
Zeng et al., "Combining Control-Flow Integrity and Static Analysis for Efficient and Validated Data Sandboxing", CCS'11, Oct. 17-21, 2011, 11 pages.
Intention to Grant, EP App. No. 19176635.1, dated May 27, 2021, 6 pages.

\* cited by examiner
‡ imported from a related application

```
Pseudocode 700

// MAC-Tr32
//
// Generate a Message Authentication Code (MAC) using Advanced Encryption Standard (AES)
MAC-Tr32(param Input) {
    RETURN AES_ECB_Encrypt(Input, {EIC_AUTH_KEY_HI, EIC_AUTH_KEY_LO})[24:0]
}
```

FIG. 7A

```
Pseudocode 710

// GenCap
//
// Generate an encoded, authenticated capability granting access to
// a message object stored in the shared heap and having the specified base and size.
//
GenCap(param ObjBase, param ObjSize) {
    ChunkSize = {1'b0, ObjBase[31:28]} + 7  // Infer chunk size from address LB = ObjBase[ChunkSize+2:ChunkSize]  // Compute the lower bound
    Chunks = ObjSize[ChunkSize+3:ChunkSize]  // Compute the number of chunks required to store the object IF ObjBase[63:32] != EIC_SDR_BASE[63:32]    OR // Check that the object is within the shared data region
           ObjSize[63:ChunkSize+4] != 0         OR // Check that the object size is not too large to represent
           Chunks not in [5, 8]                 OR // Check that the number of chunks is representable
           ObjSize[ChunkSize-1:0] != 0          OR // Check that size is even number of chunks representable
           ObjBase[ChunkSize-1:0] != 0          OR // require a 0 offset when creating a capability
           8 <= LB + Chunks AND AND_REDUCE(ObjBase[27:ChunkSize+3]) == 1 // i.e. object crosses
                    boundary between chunk sizes, which is unsupported since the carry would destroy the
                    size info represented in ObjBase[31:28] when the pointer crosses the boundary.
                    AND_REDUCE accepts a bit vector as input, performs a binary AND operation on
                    all of the bits, and returns the single-bit result.
    {
            #GP(0) // Generate a general-protection fault
    }
    CompChunks = Chunks – 5 (truncated to 2 bits)
    MAC = MAC-Tr32({ObjBase[31,ChunkSize+3], {0}*(ChunkSize+3), CompChunks, LB, {0}*91})
    RETURN {2'b01, MAC, CompChunks, LB, ObjBase[31:0]}
}
```

FIG. 7B

```
Pseudocode 720

// CheckCap
//
// Given an encoded, authenticated capability or an unauthenticated memory pointer and
// access size, test whether access is permitted to the indicated memory location(s).
//
// If access is to be granted, a memory pointer is returned.  If access is denied,
// a #GP exception is generated.
//
CheckCap(param Pointer, param MaxOffset) {
    Context = Pointer[63:62]
    IF Context[1] != Context[0] // Pointer may be an encoded, authenticated capability
        IF Context == 2'b10 // The context field has an invalid value
                #GP(0)

CheckBounds(Pointer)
        CheckBounds(Pointer + MaxOffset)

RETURN {EIC_SDR_BASE[63:32], Pointer[31:0]}
    ELSE
        IF Pointer AND EIC_PDR_MASK != EIC_PDR_BASE OR
                (Pointer + MaxOffset) AND EIC_PDR_MASK != EIC_PDR_BASE
        {
                #GP(0)
        } ELSE {
                RETURN Pointer
        }
}
```

FIG. 7C

```
Pseudocode 730

// CheckBounds
//
// Check that a pointer value is within its authorized bounds.
CheckBounds(param Pointer) {
    CompChunks = Pointer[36:35]
    Chunks = {1'b0, CompChunks} + 3'h5 // Note that this is truncated to three bits ChunkSize = {1'b0, Pointer[31:28]} + 7 // Infer chunk size from address LB = Pointer[34:32] // Extract the lower bound
    UB = LB + Chunks // Note that this is truncated to three bits ChunkIndex = Pointer[ChunkSize+2:ChunkSize]

IF (LB < UB AND (ChunkIndex < LB OR UB <= ChunkIndex)) OR
       (UB <= LB AND UB <= ChunkIndex AND ChunkIndex < LB)
        #GP(0)

Atop = Pointer[31:ChunkSize+3]          // Extract address bits above the chunk index IF UB <= LB AND ChunkIndex < UB         // has been a carry out of the chunk index into upper address bits
        Atop = Atop – 1                     // Decrement Atop to compensate for carry out of the chunk index ExpectedMAC = Pointer[61:37]

// If CheckBounds is being invoked for Pointer + MaxOffset, this MAC computation
    // and the subsequent comparison against ExpectedMAC is not actually necessary.
    // Instead, it is sufficient to check that the input
    // that would have been passed to MAC-Tr32 this time is identical to the input
    // that was passed when checking the bounds for Pointer.
    ActualMAC = MAC-Tr32({Atop, {0}*(ChunkSize+3), CompChunks, LB, {0}*91})

IF ExpectedMAC != ActualMAC
        #GP(0)
}
```

FIG. 7D

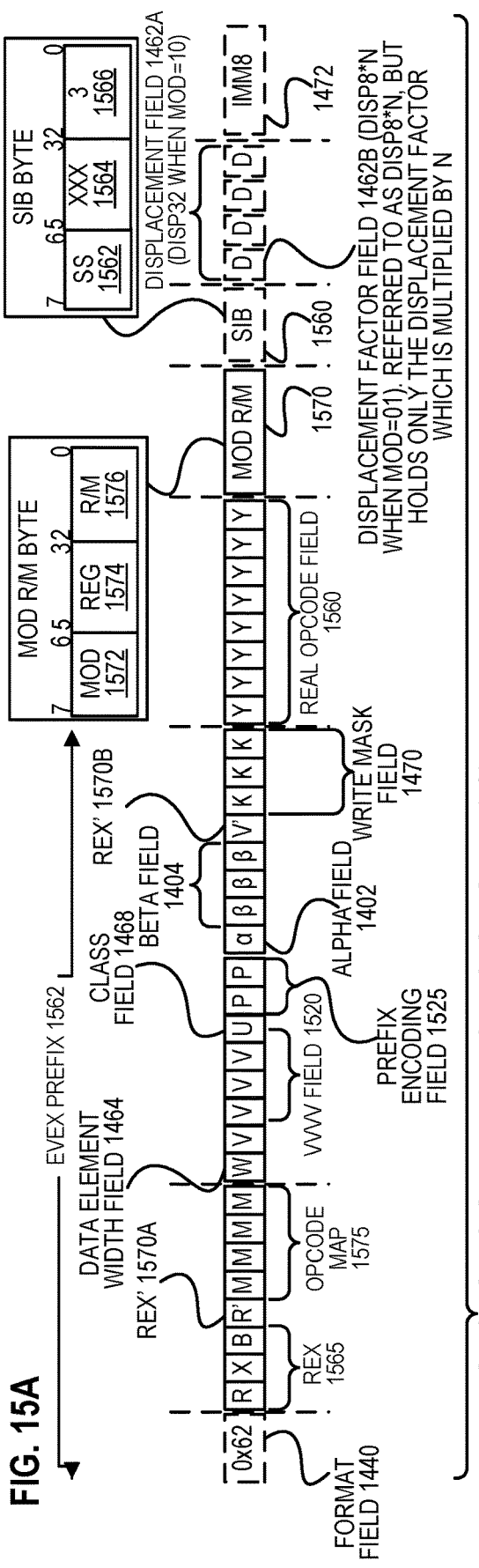
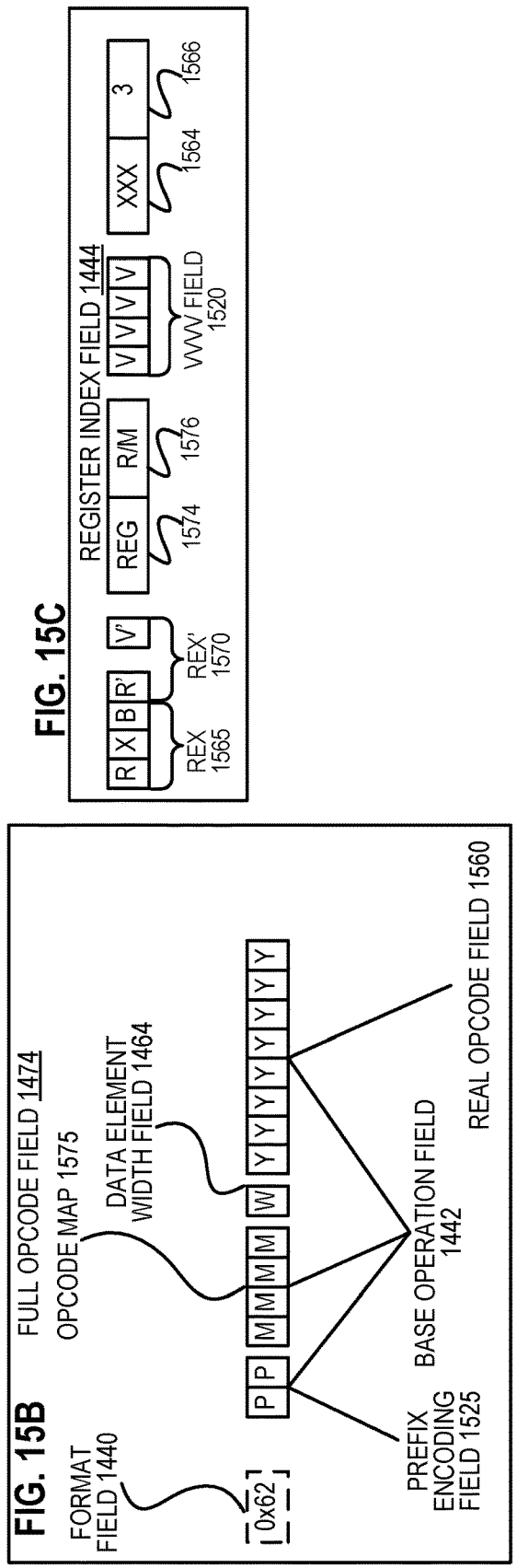

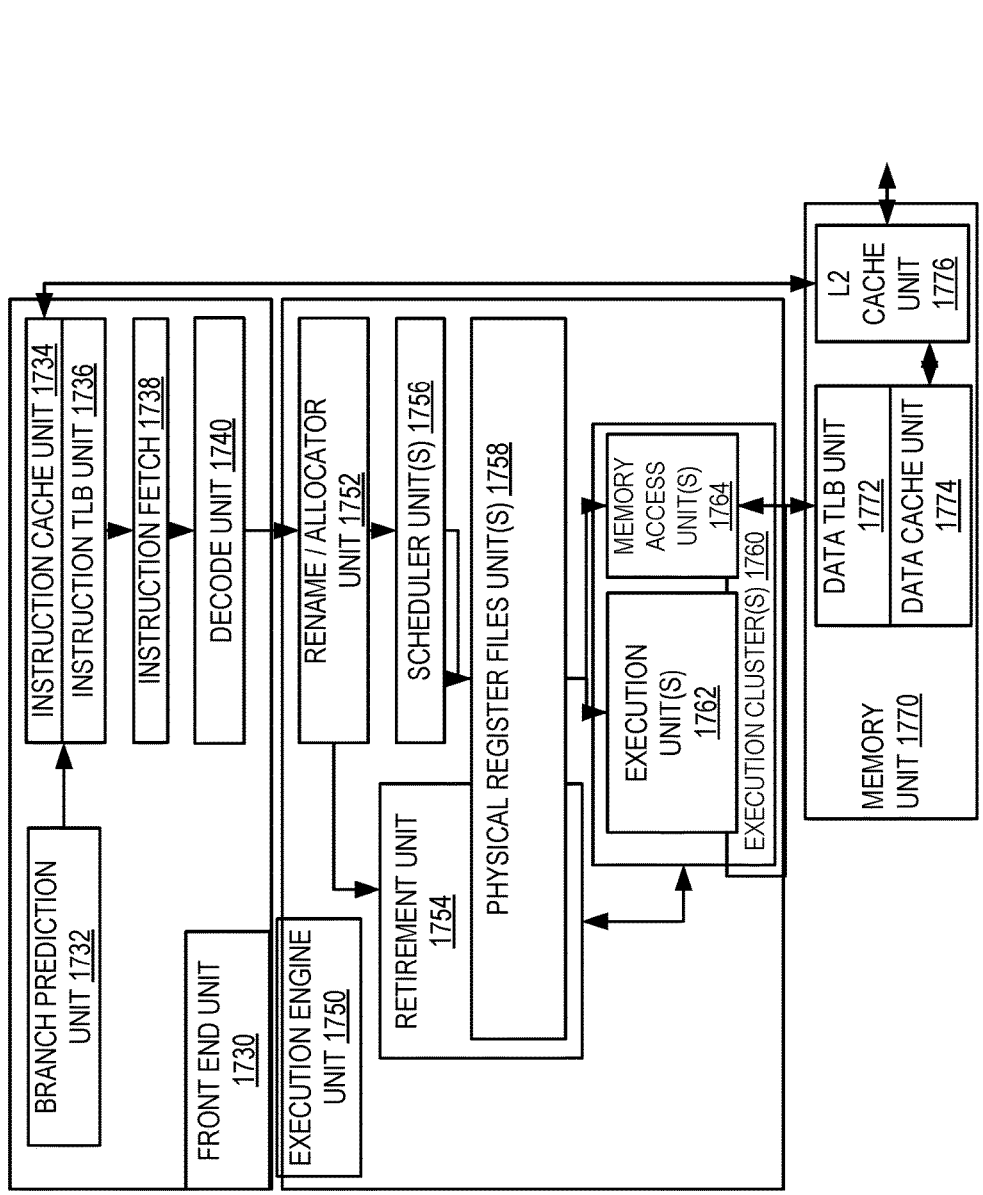
FIG. 17A
FIG. 17B

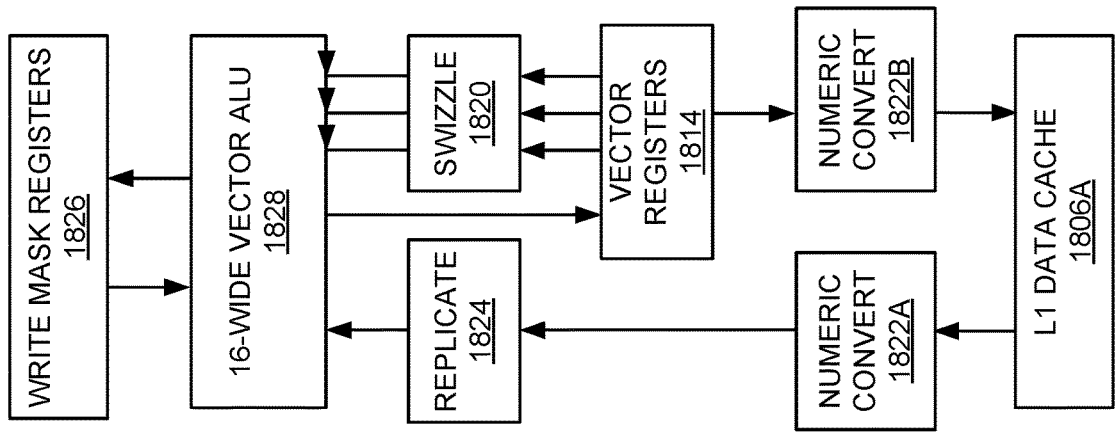
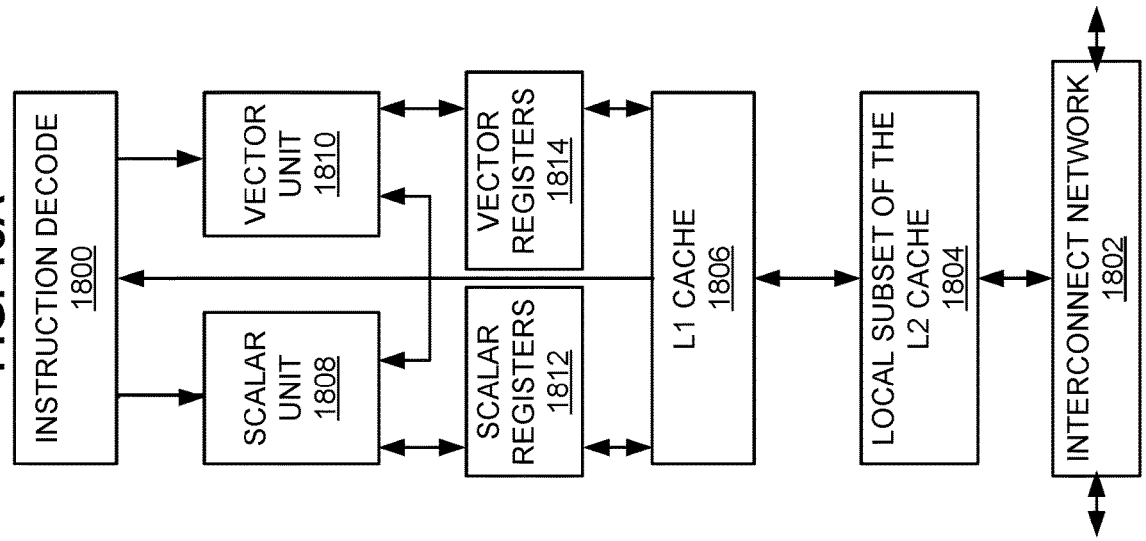

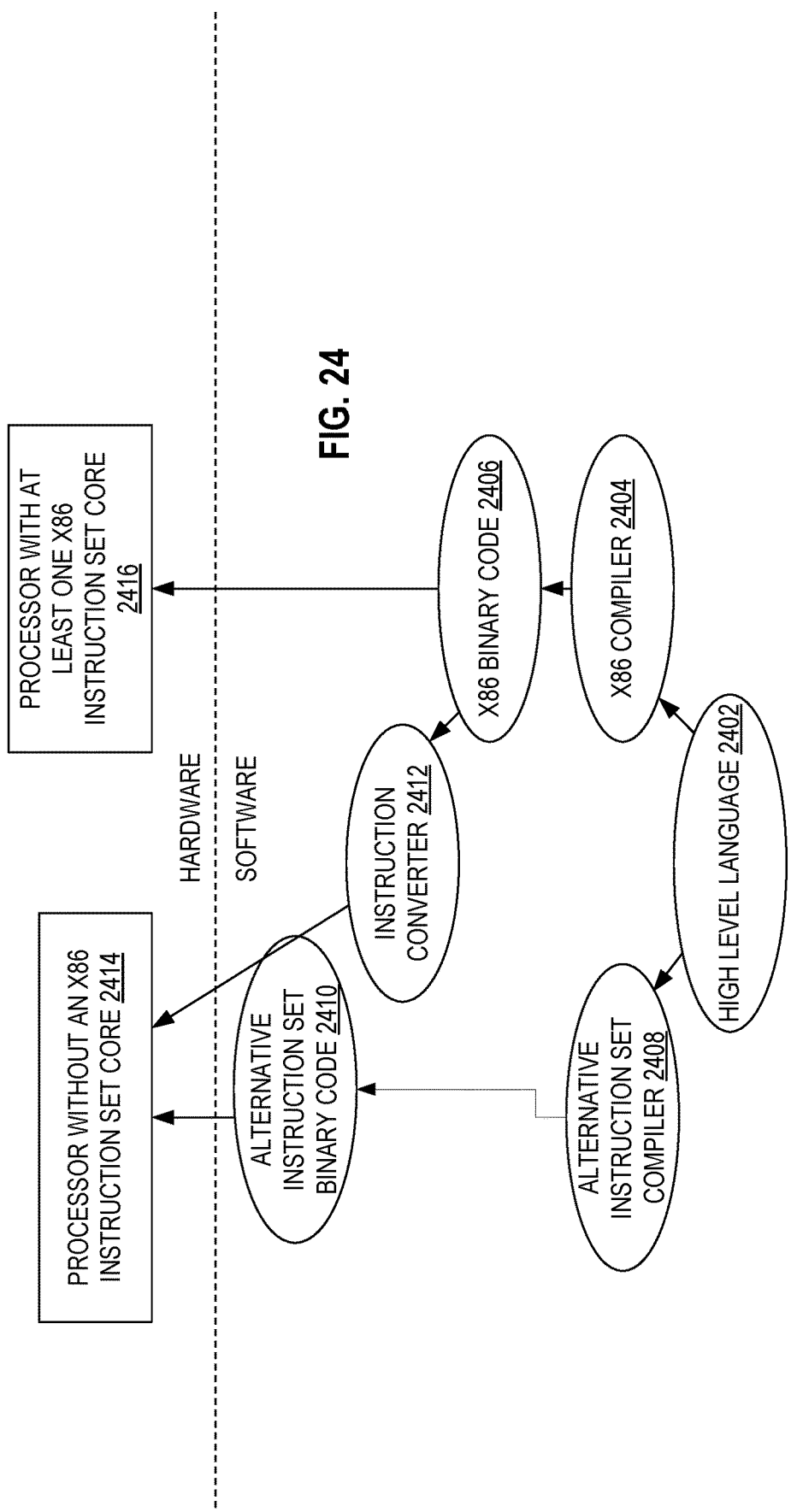

ENCODED INLINE CAPABILITIES

FIELD OF THE INVENTION

The field of invention relates generally to computer processor architecture, and, more specifically, to encoded inline capabilities.

BACKGROUND

It is increasingly common for workloads to be divided into small protection domains with access to different data to improve their robustness and security, or to increase development and deployment agility and increase resource utilization through hyper bin-packing. Some examples of such workloads include microservices, Functions-as-a-Service (FaaS), and web browsers. Implementing such workloads using separate address spaces (e.g., as processes, containers, or virtual machines) results in excessive overhead due to context-switching and remote procedure calls (RPCs) (e.g., marshalling/unmarshalling, data movement).

FaaS is expected to continue gaining market share and being adopted, so it may be advantageous to optimize platforms for secure and efficient FaaS hosting.

Security of individual programs, as well as isolation of individual programs from each other, is an open challenge presented by such platforms.

BRIEF DESCRIPTION OF THE DRAWINGS

The present invention is illustrated by way of example and not limitation in the figures of the accompanying drawings, in which like references indicate similar elements and in which:

FIGS. 7A-7D are pseudocode illustrating capability generation, capability checking flows, and associated sub-flows, according to an embodiment;

FIG. 7A is pseudocode for generating a message authentication code (MAC), according to an embodiment;

FIG. 7B is pseudocode for a GenCap instruction, according to an embodiment;

FIG. 7C is pseudocode for a CheckCap instruction, according to an embodiment;

FIG. 7D is pseudocode for a CheckBounds helper function, invoked by a CheckCap instruction, according to an embodiment;

FIG. 14A is a block diagram illustrating a generic vector friendly instruction format and class A instruction templates thereof according to some embodiments;

FIG. 14B is a block diagram illustrating the generic vector friendly instruction format and class B instruction templates thereof according to some embodiments;

FIG. 15A is a block diagram illustrating an exemplary specific vector friendly instruction format according to some embodiments;

FIG. 15B is a block diagram illustrating the fields of the specific vector friendly instruction format that make up the full opcode field according to one embodiment;

FIG. 15C is a block diagram illustrating the fields of the specific vector friendly instruction format that make up the register index field according to one embodiment;

FIG. 17A is a block diagram illustrating both an exemplary in-order pipeline and an exemplary register renaming, out-of-order issue/execution pipeline according to some embodiments;

FIG. 17B is a block diagram illustrating both an exemplary embodiment of an in-order architecture core and an exemplary register renaming, out-of-order issue/execution architecture core to be included in a processor according to some embodiments;

FIGS. 18A-B illustrate a block diagram of a more specific exemplary in-order core architecture, which core would be one of several logic blocks (including other cores of the same type and/or different types) in a chip;

FIG. 18A is a block diagram of a single processor core, along with its connection to the on-die interconnect network and with its local subset of the Level 2 (L2) cache, according to some embodiments;

FIG. 18B is an expanded view of part of the processor core in FIG. 18A according to some embodiments;

FIG. 20 shown a block diagram of a system in accordance with some embodiments;

FIG. 21 is a block diagram of a first more specific exemplary system in accordance with some embodiment;

FIG. 22 is a block diagram of a second more specific exemplary system in accordance with some embodiments;

FIG. 23 is a block diagram of a System-on-a-Chip (SoC) in accordance with some embodiments; and FIG. 24 is a block diagram contrasting the use of a software instruction converter to convert binary instructions in a source instruction set to binary instructions in a target instruction set according to some embodiments.

DETAILED DESCRIPTION OF THE EMBODIMENTS

Figure 1A:
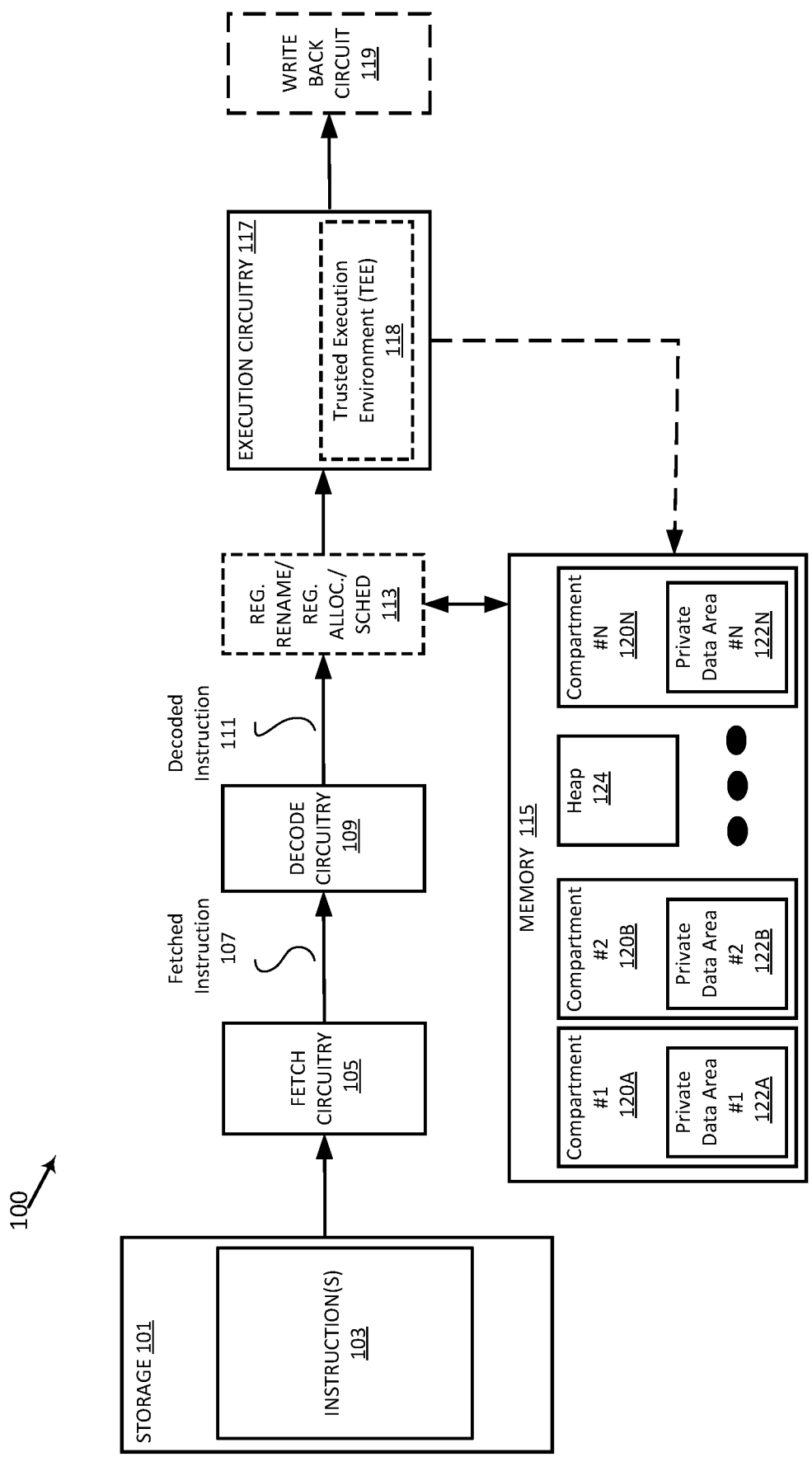
FIG. 1A is a block diagram illustrating processing components for executing instructions, according to an embodiment.

In the following description, numerous specific details are set forth. However, it is understood that some embodiments may be practiced without these specific details. In other instances, well-known circuits, structures and techniques have not been shown in detail in order not to obscure the understanding of this description.

References in the specification to "one embodiment," "an embodiment," "an example embodiment," etc., indicate that the embodiment described may include a feature, structure, or characteristic, but every embodiment may not necessarily include the feature, structure, or characteristic. Moreover, such phrases are not necessarily referring to the same embodiment. Further, when a feature, structure, or characteristic is described about an embodiment, it is submitted that it is within the knowledge of one skilled in the art to affect such feature, structure, or characteristic about other embodiments if explicitly described.

Disclosed embodiments relate to Encoded Inline Capabilities (EIC) and describe encoded pointers that implement capability machine semantics. In some embodiments, an address space is partitioned into a plurality of compartments, each compartment being associated with code, having access to a private memory and access to a message object in a shared heap. In operation, a trusted execution environment (TEE) receives an instruction (e.g., GenCap, as illustrated and described with respect to FIGS. 6A-6B) to send a message from a first compartment, the request including a pointer to a message block in the heap, and a destination compartment identifier. The TEE responds by authenticating the request (e.g., ensuring that the message block is in an authorized address range), generating a corresponding encoded capability, conveying the encoded capability to the destination compartment, and scheduling the destination compartment to respond to the request.

In some embodiments, a compartment is associated with code to perform a function or a service or a microservice or a function-as-a-service (FaaS), in which case the compartment is referred to as a service, or microservice, or networked service.

It should be noted that various terminology is sometimes herein to refer to the compartments and trusted environments of disclosed embodiments. The term, "service protection domain" is sometimes used to refer to an individual service being hosted in a protected compartment. The terms "root protection domain," "trusted runtime," and "trusted execution environment" are sometimes used to refer to trusted hosting components that control execution of the service protection domains. In some embodiments, the TEE uses Intel® Software Guard Extensions (SGX). The disclosed compartments are sometimes referred to herein as "protection domains." or enclaves. Accordingly, the trusted execution environment (TEE) is sometimes referred to as a "root protection domain (PD)." The TEE is also sometimes referred to herein as the "trusted runtime." In some embodiments, multiple "protection domains" exist in a single enclave.

Subsequently, the TEE responds to a check capability request (e.g., CheckCap, as illustrated and described with respect to FIG. 7) from the destination compartment by checking the encoded capability and, when the check passes, providing a memory address to access the message block, and, otherwise, generating a fault. Disclosed embodiments thus isolate the private memory region of each compartment from that of other compartments. In other words, each compartment is only able to access its own private memory region, and not that of other compartments. Each compartment is further to access only message blocks assigned to it in the shared heap, and not message blocks assigned to other compartments.

Disclosed embodiments provide a scalable solution for subdividing an address space into an arbitrary number of compartments and for efficiently switching between them and communicating between them. Disclosed embodiments also support efficient bounds checking, which can be used to delegate access to objects between compartments or to enforce memory safety. Disclosed embodiments reduce function execution variability (a significant issue in current FaaS) by minimizing inter function communication overhead (a significant contributor to execution variability).

As used herein, the term "compartment" refers to a memory region or partition, and is associated with code to perform a function or a service. Compartments are therefore sometimes referred to herein as "microservices," "services," or "networked services."

Disclosed EIC pointers in some embodiments are used for isolating microservices or function-as-a-service (FaaS) functions. Disclosed embodiments further provide low-overhead, fine-grained access control over shared objects. Some embodiments further improve a computing apparatus by providing microarchitecturally-visible security checks and compartment boundaries to help direct and optimize side channel mitigations.

According to some embodiments, new instructions are defined (e.g., GenCap and CheckCap) that are used to perform security checks on memory accesses, or alternatively the semantics of memory operands in all instructions can be enhanced to perform security checks inline.

Some embodiments further enhance security by encrypting messaging objects. For example, some embodiments encrypt pointers using an Advanced Encryption Standard (AES) cipher, with a key stored in a user-mode-accessible register, EIC_AUTH_KEY used to specify the cryptographic key to be used for encryption. In some embodiments, AES is implemented as described in an Advanced Encryption Standard specification for the encryption of electronic data established by the U.S. National Institute of Standards and Technology (NIST) in 2001. The trusted execution environment (TEE) has access to the register, and it can update, save, and restore the key in that register. Before a pointer can be used to perform a memory access, it is checked to verify that none of the fixed bits have been modified. The detailed checks and pointer manipulations that are performed prior to accessing memory through an encoded pointer are further illustrated and described, at least with respect to FIGS. 6A, 6B and 7.

As will be described and illustrated with respect to FIG. 2 and onward, disclosed embodiments define at least one shared memory region and use encoded capabilities to refer to objects within that region so that a compartment (also referred to as a "protection domain" herein) is only permitted to access an object in the shared memory if it has a corresponding capability. In contrast, each compartment has unfettered access to the contents of its private memory region. The shared and private memory regions for the current compartment are both defined using base and mask registers, although the shared memory region may have an implicit mask register with a fixed value for reasons that will become apparent shortly. A TEE is used to configure those base and mask registers, to schedule invocations of compartments, and to allocate memory within the shared heap. The TEE has unfettered access to the entire address space, which includes all compartments within the address space.

Code associated with each compartment can be stored within the private memory region or outside of it, although it is write-protected if stored within the private memory region to ensure that its security instrumentation, control flow, instruction restrictions, etc., are not violated. In some embodiments, a separate code instance is associated with each compartment, or a single copy of the code is shared between multiple compartment instances. One advantage of using dedicated copies is that direct addressing of global variables is possible using conventional RIP-relative addresses.

In an alternative embodiment, when a single copy of code is shared, a new instruction is described that converts an offset within a private memory region to an absolute linear address by concatenating the offset with the private memory region base address. Alternatively, some embodiments describe RIP-relative memory operands to be relative to the base of the private memory region. The TEE in some embodiments enables that control when scheduling a compartment and disables it when the TEE is invoked from a compartment. Of course, in some embodiments, the underlying OS kernel and virtual machine manager (VMM) is also cognizant of these redefined memory operand semantics.

The encoded capabilities as described herein can be packed into the storage for a standard 64-bit pointer, which has significant advantages such as minimizing needed compiler changes, compatibility with standard pointer arithmetic, and efficient storage. However, it is also possible to expand this encoding, which confers other benefits such as being able to cover a larger shared heap, a stronger MAC, etc.

FIG. 1 is a block diagram illustrating processing components for instructions, according to some embodiments. As illustrated, storage 101 stores instruction(s) 103 to be executed. In some embodiments, computing system 100 is a SIMD processor to concurrently process multiple elements of packed-data vectors.

In operation, the instruction(s) 103 is fetched from storage 101 by fetch circuitry 105. The fetched instruction 107 is decoded by decode circuitry 109. The instruction format is further illustrated and described with respect to FIGS. 14A-B and 15A-D. Decode circuitry 109 decodes the fetched instruction 107 into one or more operations. In some embodiments, this decoding includes generating a plurality of micro-operations to be performed by execution circuitry (such as execution circuitry 117). The decode circuitry 109 also decodes instruction suffixes and prefixes (if used). Execution circuitry 117 is further described and illustrated below, at least with respect to FIGS. 17A-B and 18A-B.

Also shown is trusted execution environment (TEE) 118, which is used to implement the encoded inline capabilities, according to embodiments described and illustrated with respect to FIGS. 2-14, and 17A-18B. TEE 118 is shown with dashed borders to indicate that it can optionally be included in execution circuitry 117. TEE 118 may also include hardware outside of execution circuitry 117. TEE may also include some software functionality. According to some embodiments, TEE 118 provisions and configures a plurality of compartments #1-#N, labeled as 120A-N, each with a private data area, labeled as 122A-N, and all sharing heap 124.

In some embodiments, register renaming, register allocation, and/or scheduling circuit 113 provides functionality for one or more of: 1) renaming logical operand values to physical operand values (e.g., a register alias table in some embodiments), 2) allocating status bits and flags to the decoded instruction, and 3) scheduling the decoded instruction 111 for execution on execution circuitry 117 out of an instruction pool (e.g., using a reservation station in some embodiments).

Registers (register file) and/or memory 115 store data as operands of decoded instruction 111 to be operated on by execution circuitry 117. Exemplary register types include writemask registers, packed data registers, general purpose registers, and floating-point registers, as further described and illustrated below, at least with respect to FIG. 16.

In some embodiments, write back circuit 119 commits the result of the execution of the decoded instruction 111. Execution circuitry 117 and system 100 are further illustrated and described with respect to FIGS. 17A-B and 18A-B.

Figure 1B:
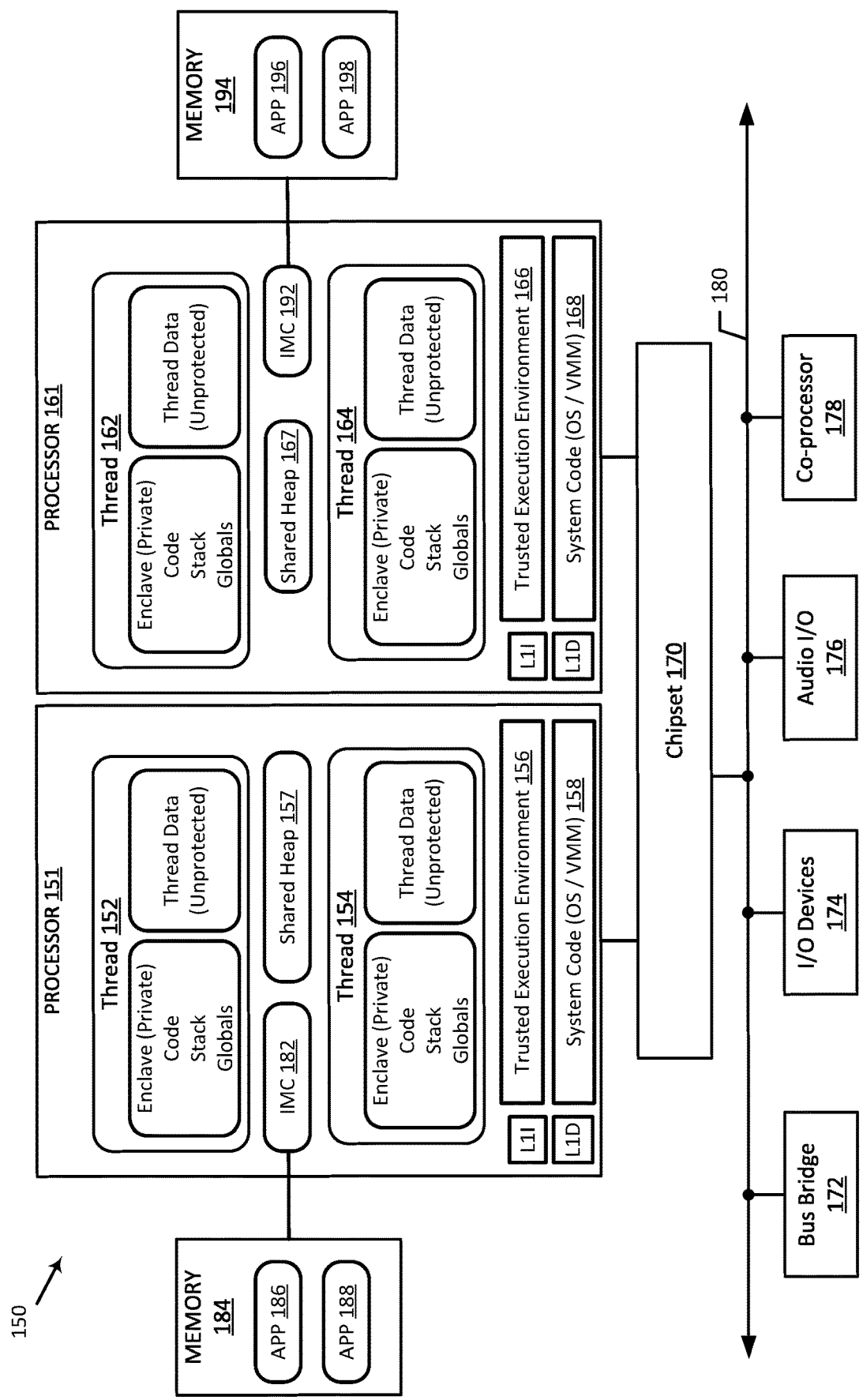
FIG. 1B illustrates a system for executing applications with protections for code and data, according to an embodiment.
Figure 19:
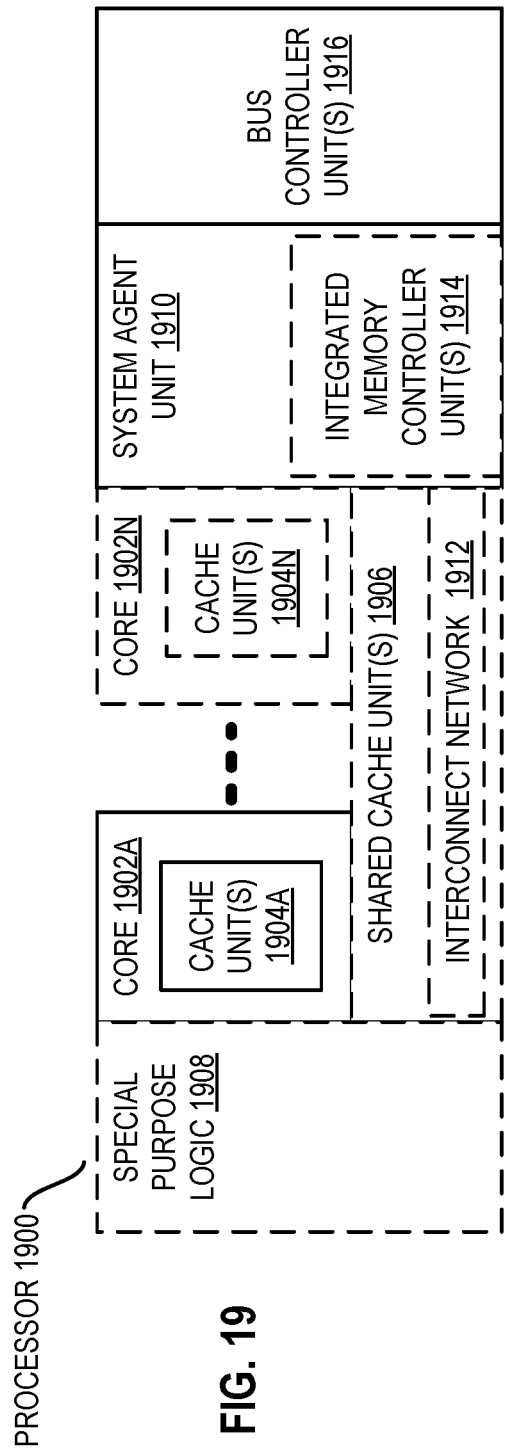
FIG. 19 is a block diagram of a processor that may have more than one core, may have an integrated memory controller, and may have integrated graphics according to some embodiments.

FIG. 1B illustrates a system for executing applications with protections for code and data, according to an embodiment. Shown is a block diagram of a first more specific exemplary system 150 in accordance with some embodiments. As shown in FIG. 1B, multiprocessor system 150 includes a first processor 151 and a second processor 161, each of which may be some version of the processor 1900 (FIG. 19). Processors 151 and 161 are shown including integrated memory controller (IMC) units 182 and 192, respectively. As shown IMCs 182 and 192 couple the processors to respective memories, namely a memory 184 and a memory 194, which may be portions of main memory locally attached to the respective processors.

Processor 151 includes system code 158, including an operating system and a virtual machine manager (VMM). Processor 151 also includes a trusted execution environment (TEE) 156, which manages protections of threads 152 and 154, each of which has an enclave, or a private data region, including private code, stack, and globals. Each thread's private data region is protected from access by any other thread. Each thread 152 and 154 also includes thread data, an unprotected memory region. Processor 151 has a shared heap 157 accessible by two or more threads.

Processor 161 includes system code 168, including an operating system and a virtual machine manager (VMM). Processor 161 also includes a trusted execution environment (TEE) 166, which manages protections of threads 162 and 164, each of which has an enclave, or a private data region, including private code, stack, and globals. Each thread's private data region is protected from access by any other thread. Each thread 162 and 164 also includes thread data, an unprotected memory region. Processor 161 has a shared heap 167 accessible by two or more threads.

Processor 161 also includes a trusted execution environment (TEE) 166, which manages protections of threads 162 and 164, each of which as an enclave, or a private data region, including private code, stack, and globals. Each thread's private data region is protected from access by any other thread. Each thread 162 and 164 also includes thread data, an unprotected memory region. Processor 161 has a shared heap 167 in its memory, the shared heap accessible by two or more threads.

Processors 151 and 161 may each exchange information with a chipset 170 which may optionally exchange information with the coprocessor 178. In one embodiment, the coprocessor 178 is a special-purpose processor, such as, for example, a high-throughput MIC processor, a network or communication processor, compression engine, graphics processor, GPGPU, embedded processor, or the like.

A shared cache (not shown) may be included in either processor or outside of both processors yet connected with the processors, such that either or both processors' local cache information may be stored in the shared cache if a processor is placed into a low power mode.

Chipset 170 may be coupled to a first bus 180, which, in one embodiment, is a Peripheral Component Interconnect (PCI) bus, or a bus such as a PCI Express bus or another third generation I/O interconnect bus, although the scope of disclosed embodiments is not so limited.

As shown in FIG. 1B, various I/O devices 174 may be coupled to first bus 180, along with a bus bridge 172 which couples first bus 180 to a second bus, not shown. In one embodiment, one or more additional processor(s), such as coprocessor 178, are high-throughput MIC processors, GPGPU's, accelerators (such as, e.g., graphics accelerators or digital signal processing (DSP) units), field programmable gate arrays, or any other processor, are coupled to first bus 180. Furthermore, an audio I/O 176 may be coupled to the second bus (not shown). Note that other architectures are possible.

In operation, processors 151 and 161 are to load apps 186, 188, 196, and 198, which include computer-executable instructions, to be executed in threads 152, 154, stored in their associated memories, 184 and 194, and execute those apps in threads 152, 154, 162, and 164, respectively.

Figure 2:
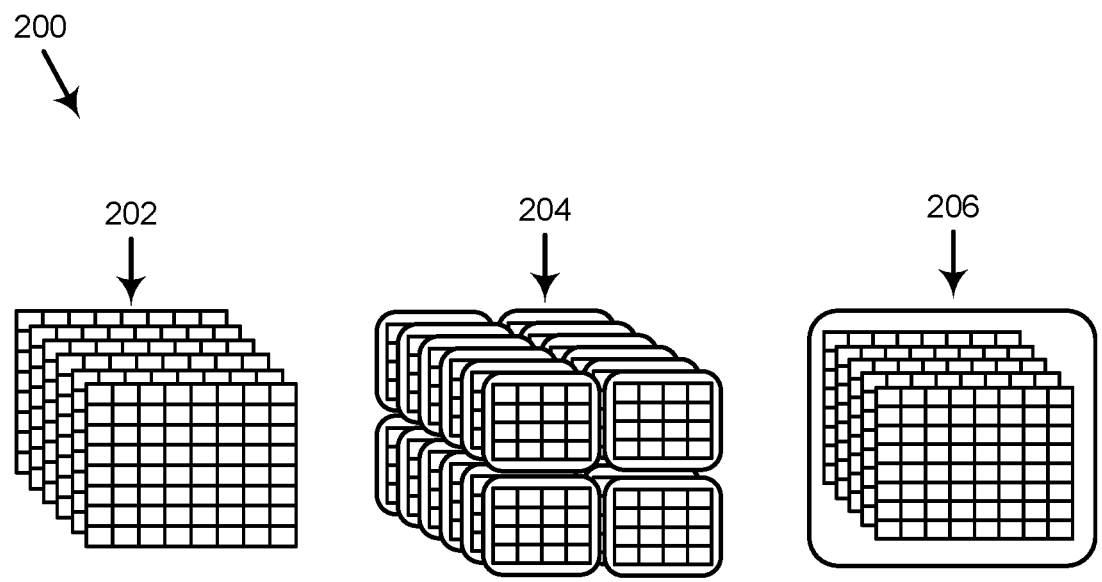
FIG. 2 illustrates memory compartments in a memory address space, according to some embodiments.

FIG. 2 illustrates memory compartments in a memory address space, according to some embodiments. As shown, multiple compartments (a.k.a., functions, services, microservices, or FaaS) occupy address spaces in each of memory maps 202, 204, and 206. In memory map 202, each compartment has its own address space. In memory map 204, each compartment is part of a partition of an address space, with 16 possible services per partitions. In memory map 206, all functions are part of a single address space.

Figure 3A:
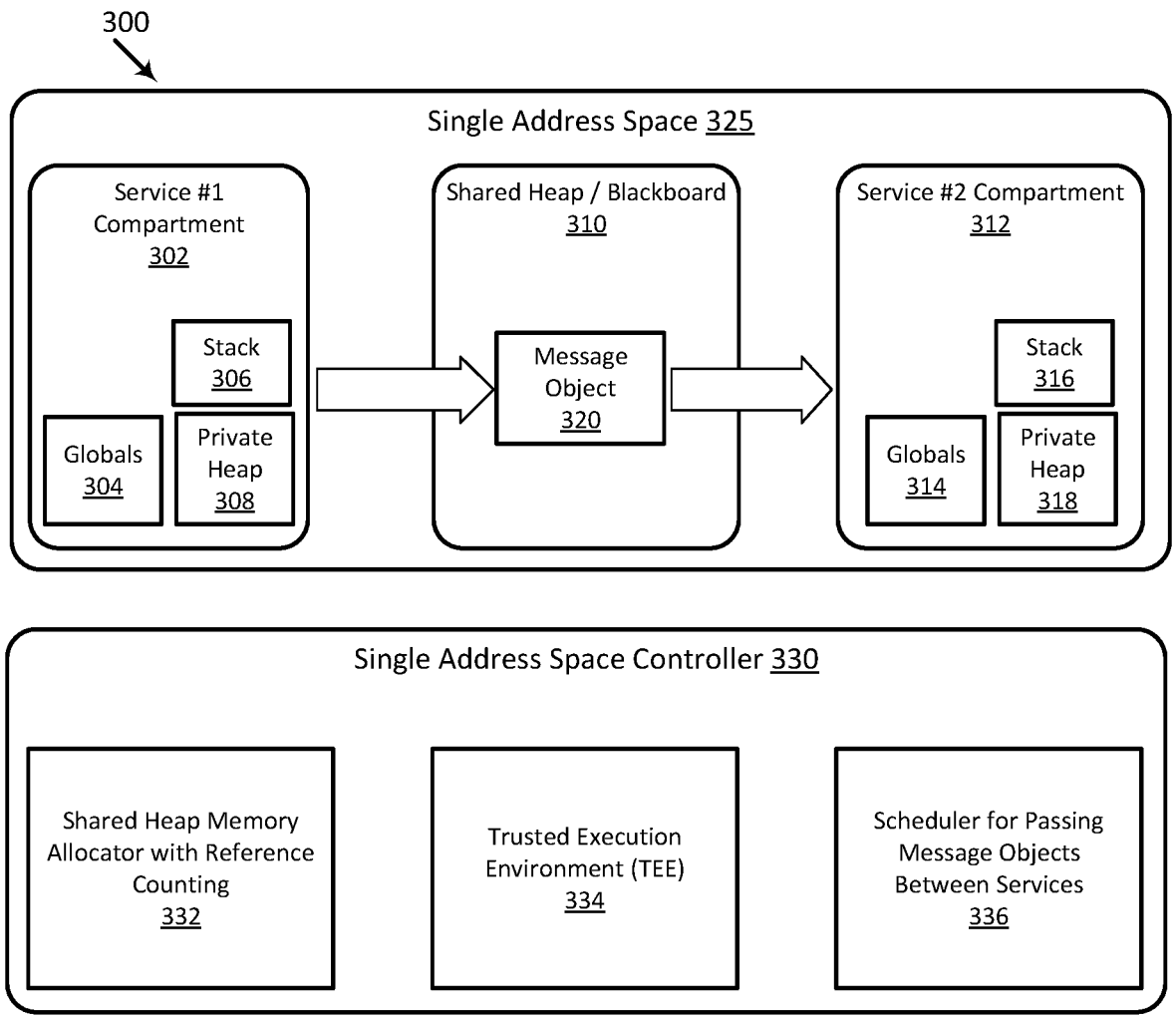
FIG. 3A illustrates a system with multiple service compartments in a memory, according to some embodiments.

FIG. 3A illustrates a system with multiple service compartments in a memory, according to some embodiments. As shown, system 300 includes service #1 compartment 302, which includes its stack 306, its private heap 308 and its globals 304 (i.e., global variables stored in registers or memory). Stack 306, private heap 308, and globals 304 are sometimes referred to herein as existing within a "private memory area" or "private memory region" of service #1 compartment 302. Also shown is service #2 compartment 312, which includes its stack 316, its private heap 318, and its globals 314 (i.e., global variables stored in registers or memory). Stack 316, private heap 318, and globals 314 are sometimes referred to herein as existing within a "private memory area" or "private memory region" of service #2 compartment 312. It should be understood that the stack, heap, and globals are logical structures shown for each of the compartments, but that in some embodiments, a single memory is used to serve all three functions. Also illustrated is shared heap/blackboard 310, with a message object 320 in transition from service #1 compartment 302 to service #2 compartment 312. As shown, service #1 compartment 302, service #2 compartment 312 and shared heap 310 are all part of a single address space 325.

Also illustrated is single address space controller 330, which includes shared heap memory allocator with reference counting 332, trusted execution environment (TEE) 334, and a scheduler for passing message objects between services 336. The illustrated components of single address space controller 330 include circuitry and memory resources to perform their functions. In some embodiments, as here, code and services running as part of the service compartments is controlled by the TEE 334, which in some embodiments is provided as Intel® SGX to defend the software runtime and the applications against the types of attacks that are in scope for the TEE in use.

In operation, the TEE 334 is to partition an address space within the memory into a plurality of compartments, shown here as compartments 302 and 312, and shared heap 310. Each compartment 302 and 312 here includes a private memory associated with code to execute a function. Here, compartments 302 and 312 have private memory areas that include their stack, private heap, and globals. In some embodiments, the TEE 334 is to provision the functions and schedule operation of the code for service #1 compartment and service #2 compartment. As used herein, that code can be termed a service, a microservice, a networked service, or a function-as-a-service (FaaS). As part of the provisioning, the TEE 334 assigns pointers to one or more message objects stored in the shared heap. The TEE 334 thus allocates memory for use to buffer a message and provides a pointer to each of the compartments to access the message object(s).

Continuing operation, at some point, after the code in service #1 compartment begins to run, the TEE 334 receives a request to send a message from a first compartment, the request including a pointer to a message block in the heap, and a destination compartment identifier (i.e., service #2 compartment 312). In response, the TEE 334 authenticates the request, generates a corresponding encoded capability, conveys the encoded capability to the destination compartment, and schedules the destination compartment to respond to the request. Subsequently, the TEE 334 receives a check capability request from service #2 compartment 312, and responds by checking the encoded capability and, when the check passes, providing service #2 compartment 312 a memory address to access the message block, and, otherwise, generating a fault. As shown, each compartment is isolated from other compartments, is unable to access private memory regions of other compartments, and is unable to access any message objects in the heap that are assigned to other compartments.

Figure 3B:
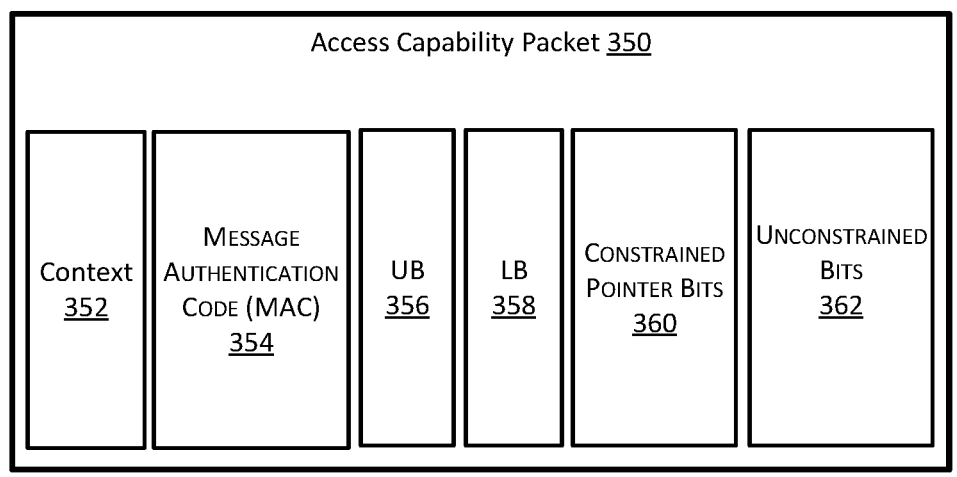
FIG. 3B illustrates an access capability packet, according to an embodiment.

FIG. 3B illustrates an access capability packet, according to an embodiment. As shown, access capability packet 350 includes context 352, message authentication code (MAC)

354, upper bound (UB) 356, lower bound (LB) 358, constrained pointer bits 360, and unconstrained bits 362. In operation, MAC 354 is used to detect modifications of fixed bits (bounds and constrained pointer bits) by service protection domains. Fixed Bits: UB 356, LB 358, and constrained pointer bits 360 are "fixed bits," which service protection domains are prevented from undetectably modifying. They indicate the base and limit of the object. Unconstrained bits 362, on the other hand, are allowed to be modified by service protection domains (recall that as defined above, a service protection domain corresponds to an individual service being hosted). The number of unconstrained bits is determined by the size of the object, which is inferred from upper address bits of base address. For example, an 8-byte object requires 3 unconstrained bits. Objects are aligned at corresponding power-of-two chunk boundaries.

Figure 3C:
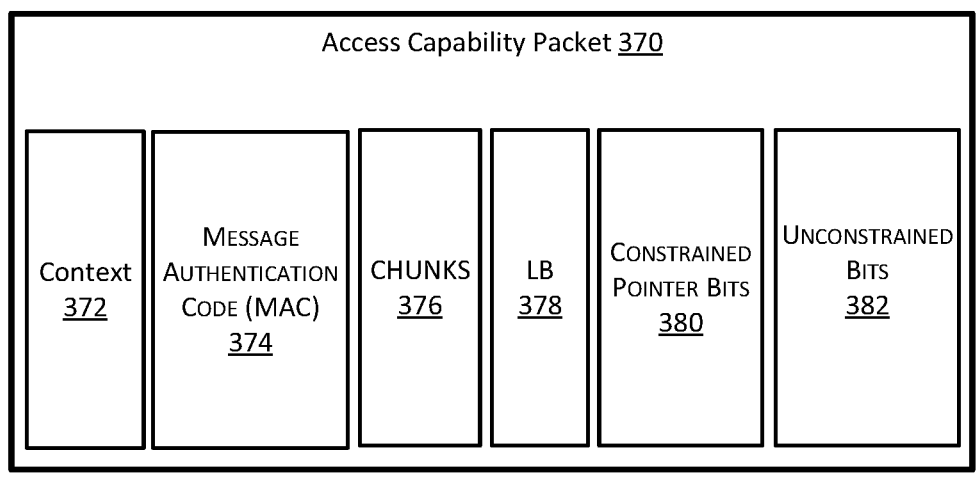
FIG. 3C illustrates an access capability packet, according to an embodiment.

FIG. 3C illustrates an access capability packet, according to an embodiment. As shown, access capability packet 370 includes context 372, message authentication code (MAC) 374, chunks 376, lower bound (LB) 378, constrained pointer bits 380, and unconstrained bits 382.

In some embodiments, chunks 376 is encoded uses only two bits. In such embodiments, each object allocated with a certain chunk size comprises at least five chunks. Otherwise, it would have fit in eight or fewer smaller chunks, since chunk sizes are a contiguous range of powers-of-two. Thus, a range of only four values, 5-8, needs to be encoded in the chunks 376.

In operation, MAC 374 is used to detect modifications of fixed bits (bounds and constrained pointer bits) by service protection domains. Fixed Bits: chunks 376, LB 378, and constrained pointer bits 380 are "fixed bits," which service protection domains are prevented from undetectably modifying. They indicate the base and limit of the object.

Unconstrained bits 382, on the other hand, are allowed to be modified by service protection domains (recall that, as defined above, a service protection domain corresponds to an individual service being hosted). The number of unconstrained bits is determined by the size of the object, which is inferred from upper address bits of base address. For example, an 8-byte object requires 3 unconstrained bits. Objects are aligned at corresponding power-of-two chunk boundaries.

Figure 4A:
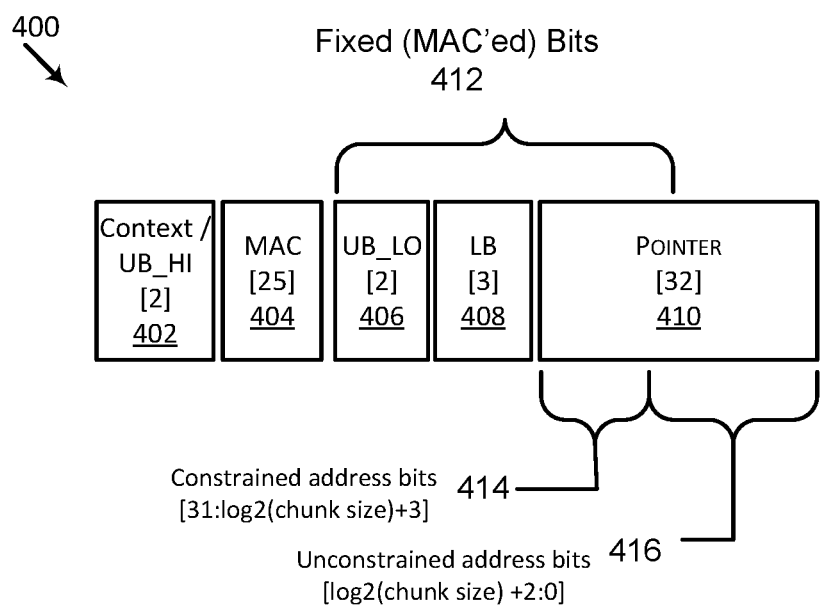
FIG. 4A illustrates an access capability packet, according to an embodiment.

FIG. 4A illustrates an access capability packet, according to an embodiment. As shown, access capability packet 400 includes context/UBHI [2] 402 (which includes 2 bits), MAC [25] 404 (25 bits), UB_LO [2] 406 (2 bits), LB [3] 408 (3 bits), and pointer [32] 410 (32 bits). Also shown are fixed (MAC'ed) bits 412, constrained address bits 414, which include [31:log 2(chunk size)+3], and unconstrained address bits 416, which include [log 2(chunk size)+2:0]. As used herein, the chunk size can be any power-of-2, i.e. 2, 4, 8, 16, etc.

The context field 402 distinguishes encoded pointers from unencoded pointers so that the same instructions can be used to process both. This field also supports interoperability with memory safety solutions. EIC has the limitations of supporting restricted object sizes and alignments and objects stored within the shared heap, so it is advantageous to interoperate with other mechanisms.

The MAC 404 prevents undetected modification of the fixed bits identified in the diagram. Those fixed bits identify the authorized bounds of the object. Note that a portion of the pointer, the unconstrained address bits, is not covered by the MAC. This is the portion that the compartment is free to modify to reference different parts of the authorized object. However, in some embodiments, not all possible values of the unconstrained address bits are accepted. The specific bounds checking logic that incorporates the upper bound ({UB_HI: UB_LO}), the lower bound (LB), and the chunk size will be described below. Alternative embodiments employ a simpler encoding by simply specifying the power-of-two size of the object in a size field or implicitly based on address bits and allow any possible values for the unconstrained address bits.

Figure 4B:
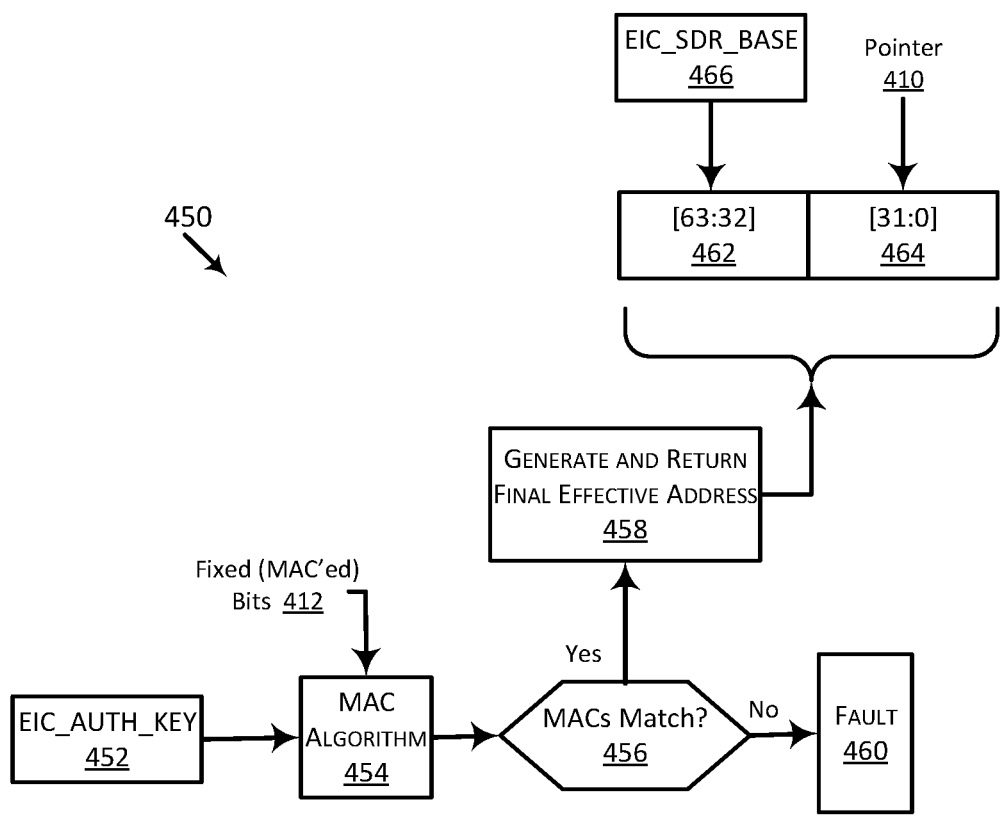
FIG. 4B is a block flow diagram illustrating an embodiment of checking a capability.

FIG. 4B is a block flow diagram illustrating an embodiment of a trusted execution environment (TEE) checking a capability. As shown, a TEE performs check flow 450 by retrieving EIC_AUTH_KEY at 452, EIC_AUTH_KEY being a privileged encryption seed used by the TEE and not known to the compartments. At 454, the TEE generates a MAC by running a MAC algorithm, with fixed (MAC'ed) bits 412 as an input. At 456, the TEE determines whether the generated MAC matches the MAC bits in the capability packet. If they do not, a fault is generated at 460. But if a match exists, the TEE at 458 generates and returns a final base address to be used to access the message object. This base address may differ from the original base address for the message object. However, in some embodiments, it is still referred to as a base address, since it is used as such to compute effective addresses in subsequent memory accesses. As shown, the final 64-bit address is labeled as 462 and 464, and consists of 32-bit EIC_SDR_BASE 466 concatenated with 32-bit pointer 410. EIC_SDR_BASE specifies the upper 32 bits of a base address of a shared data region.

Figure 4C:
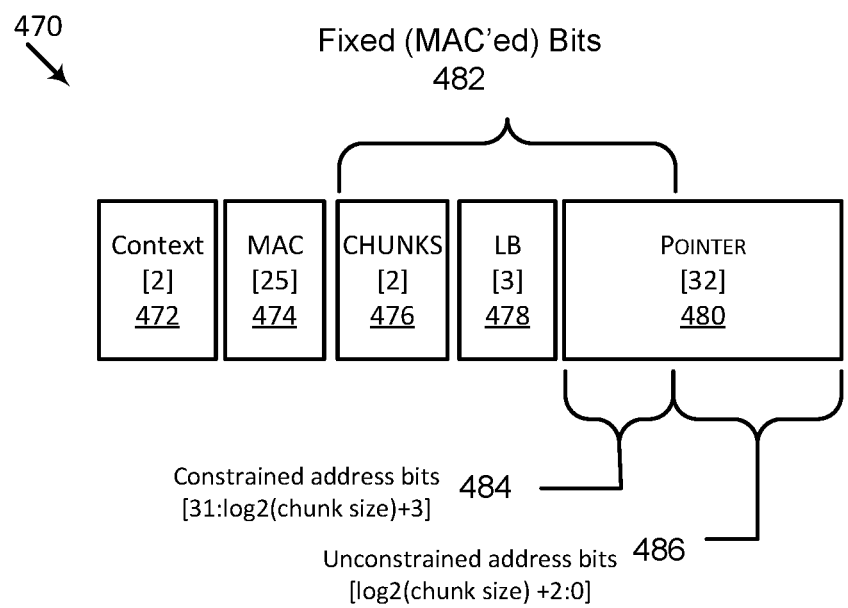
FIG. 4C illustrates an access capability packet, according to an embodiment.

FIG. 4C illustrates an access capability packet, according to an embodiment. As shown, access capability packet 470 includes context/UBHI [2] 472 (which includes 2 bits), MAC [25] 474 (25 bits), Chunks [2] 476 (2 bits), LB [3] 478 (3 bits), and pointer [32] 480 (32 bits). Also shown are fixed (MAC'ed) bits 482, constrained address bits 484, which include [31:log 2(chunk size)+3], and unconstrained address bits 486, which include [log 2(chunk size)+2:0]. As used herein, the chunk size can be any power-of-2, i.e. 2, 4, 8, 16, etc.

The context field 472 distinguishes encoded pointers from unencoded pointers so that the same instructions can be used to process both. This field also supports interoperability with memory safety solutions. EIC has the limitations of supporting restricted object sizes and alignments and objects stored within the shared heap, so it is advantageous to interoperate with other mechanisms.

The MAC 474 prevents undetected modification of the fixed bits identified in the diagram. Those fixed bits identify the authorized bounds of the object. Note that a portion of the pointer, the unconstrained address bits, is not covered by the MAC. This is the portion that the compartment is free to modify to reference different parts of the authorized object. However, in some embodiments, not all possible values of the unconstrained address bits are accepted. The specific bounds checking logic that incorporates the upper bound ({UB_HI: UB_LO}), the lower bound (LB), and the chunk size will be described below. Alternative embodiments employ a simpler encoding by simply specifying the power-of-two size of the object in a size field or implicitly based on address bits and allow any possible values for the unconstrained address bits.

Figure 5:
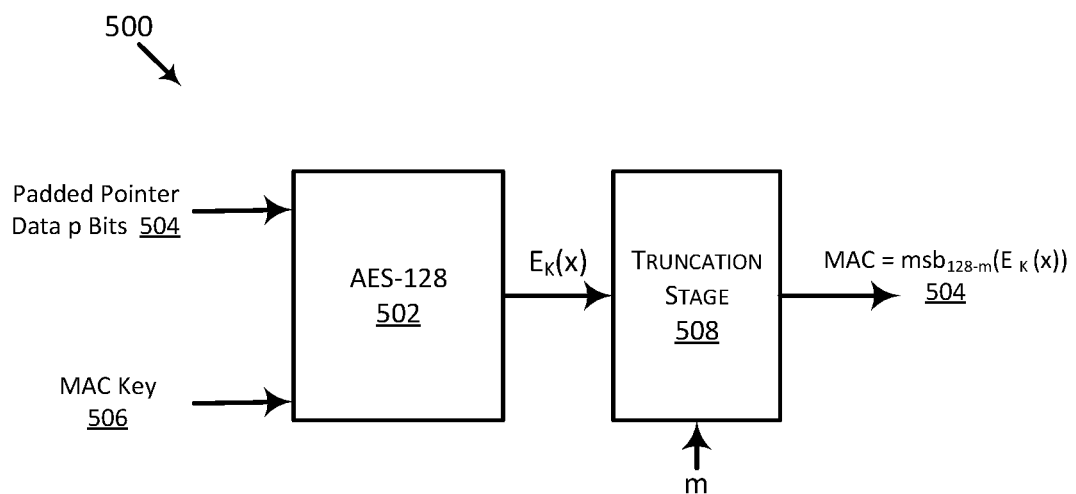
FIG. 5 is a block flow diagram illustrating encrypting a pointer to generate a capability, according to some embodiments.

FIG. 5 is a block flow diagram illustrating encrypting a pointer to generate a capability, according to some embodiments. As shown, flow 500 includes a standard Advanced Encryption Standard (AES-128) 502, which receives as inputs padded pointer data p bits 504 and MAC key 506, and generates at its output $E_K(x)$, which is fed to truncation stage 508, which also receives input m, and generates MAC 504, which here is $msb_{128-m}(E_K(x))$.

The MAC may be computed using a variety of algorithms. One that is desirable, from the standpoint of being based on a standard cipher, is AES-128 502. The MAC key 506 is stored in a user-mode-accessible register, EIC_AUTH_KEY. The TEE has access to the register, and it can update, save, and restore the key in that register. Before a pointer can be used to perform a memory access, its MAC is checked to verify that none of the fixed bits have been modified.

The detailed checks and pointer manipulations that are performed prior to accessing memory through an encoded pointer will be described below, which will also clarify the purpose of the EIC_SDR_BASE register.

Note that an advantage of these checks compared to conventional 64-bit range registers or bounds such as those used in Intel® Memory Protection Extensions (MPX) is that the comparisons are performed on much smaller numbers, most only three bits in length, which reduces energy usage and latency.

Figure 6A:
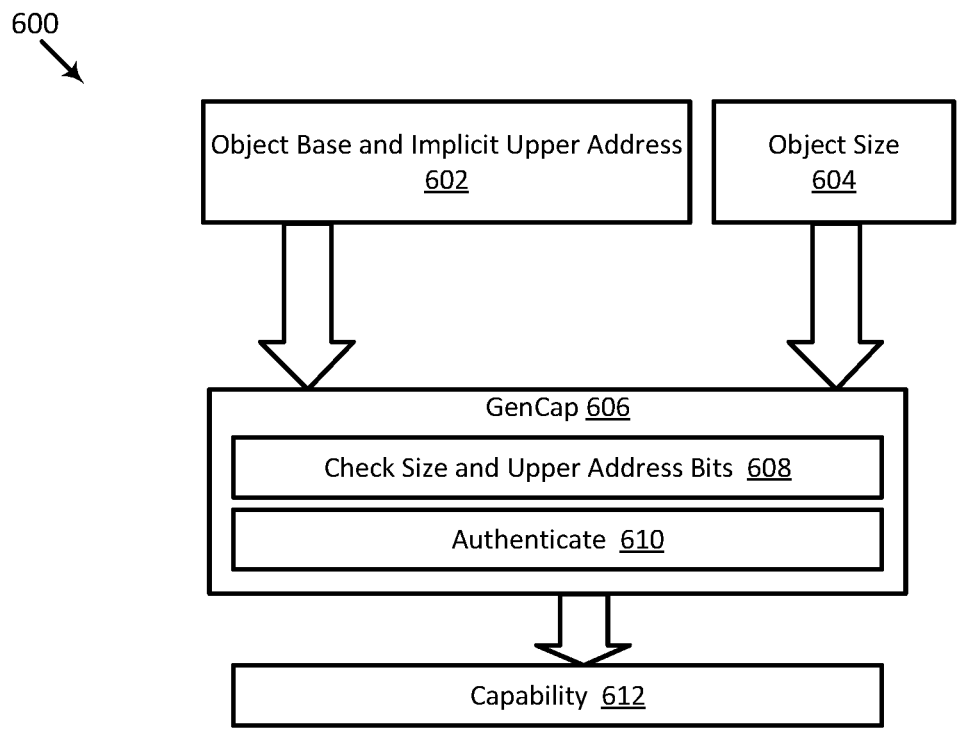
FIG. 6A is a block flow diagram illustrating execution of a GenCap instruction, according to some embodiments.

FIG. 6A is a block flow diagram illustrating execution of a GenCap instruction, according to some embodiments. As shown, flow 600 includes inputs object base and implicit upper address 602 and object size 604 being fedFcrypto into GenCap 606, which, at 608, checks size and upper address bits and at 610 authenticates the request. GenCap 606 generates a capability 612 as its output.

Figure 6B:
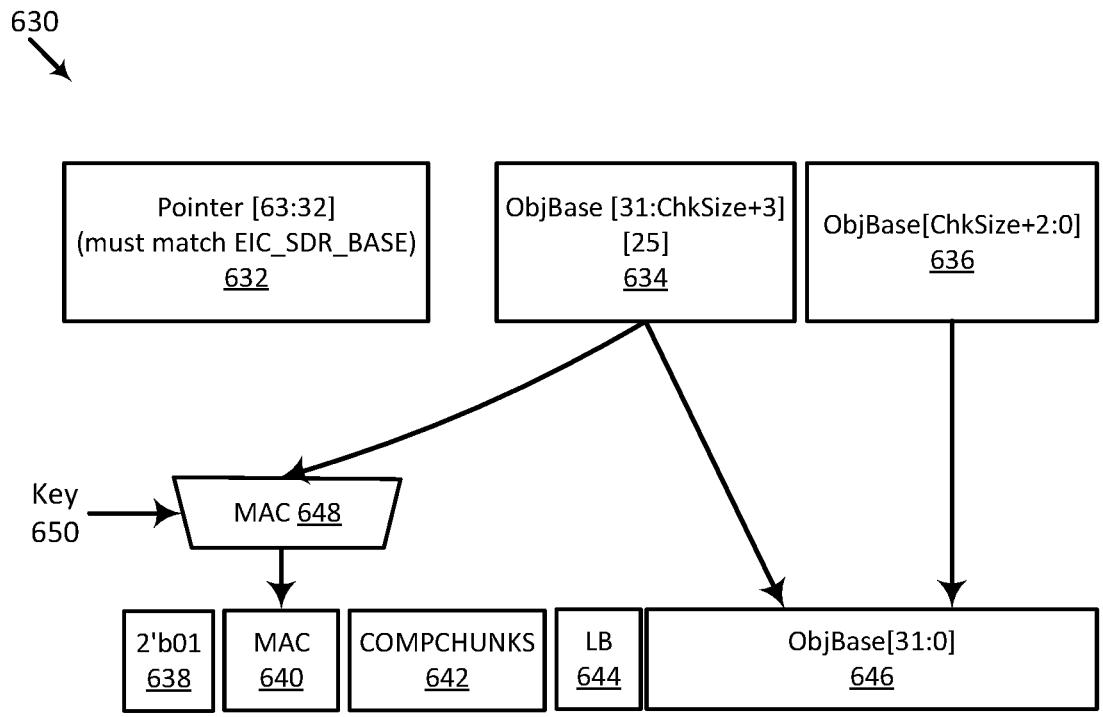
FIG. 6B illustrates inputs and outputs of a GenCap instruction, according to some embodiments.

FIG. 6B illustrates inputs and outputs of a GenCap instruction, according to some embodiments. As shown, GenCap flow 630 includes inputs: pointer [63:32] 632, 25-bit ObjBase [31:ChSize+3] 634, and ObjBase[ChkSize+2:0] 636. GenCap is executed, including performing MAC function 648 with key 650 as input, to generate a 64-bit access capability consisting of encoded UB_HI (2'b01) 638, MAC 640, UB_LO (COMPCHUNKS) 642, LB 644, and ObjBase [31:0] 646.

Figure 6C:
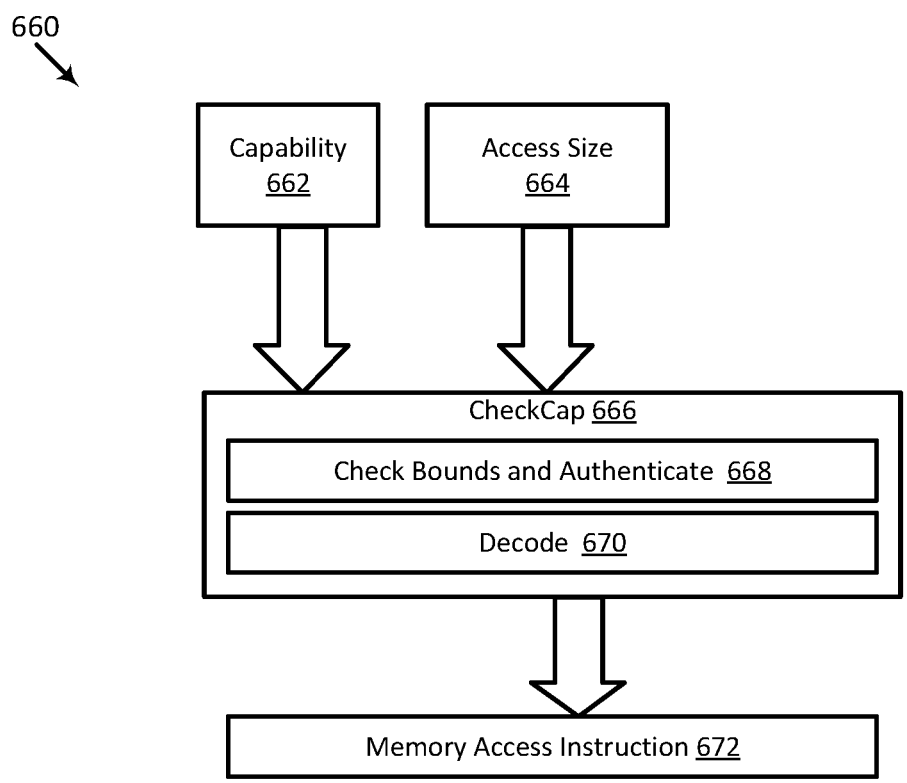
FIG. 6C is a block flow diagram illustrating execution of a CheckCap instruction, according to some embodiments.

FIG. 6C is a block flow diagram illustrating execution of a CheckCap instruction, according to some embodiments. As shown, flow 660 includes inputs capability 662 and access size 664, which are fed into CheckCap 666, which, at 668, checks bounds and authenticates, and at 670 performs a decode. As a result, CheckCap generates a memory address instruction 672.

FIGS. 7A-7D are pseudocode illustrating capability generation, capability checking flows, and associated sub-flows, according to some embodiments.

FIG. 7A is pseudocode for generating a message authentication code (MAC), according to some embodiments. As shown, pseudocode 700 is to generate a Message Authentication Code (MAC) using Advanced Encryption Standard (AES). Execution and security checking flows of disclosed embodiments are further illustrated and described with respect to FIGS. 3A-6C, 8-12, 17A-B, and 18A-B.

FIG. 7B is pseudocode for a GenCap instruction, according to some embodiments. As shown, pseudocode 710 is for a GenCap routine to generate an encoded, authenticated capability granting access to a message object stored in the shared heap and having a specified base address and size. Execution and security checking flows of disclosed embodiments are further illustrated and described with respect to FIGS. 3A-6C, 8-12, 17A-B, and 18A-B.

FIG. 7C is pseudocode for a CheckCap instruction, according to some embodiments. As shown, pseudocode 720 is for a CheckCap instruction to test whether access is permitted to the indicated memory location(s), given an encoded, authenticated capability or an unauthenticated memory pointer and access size. Execution and security checking flows of disclosed embodiments are further illustrated and described with respect to FIGS. 3A-6C, 8-12, 17A-B, and 18A-B.

FIG. 7D is pseudocode for a CheckBounds helper function, invoked by a CheckCap instruction, according to an embodiment. As shown, pseudocode 730 is for a CheckBounds instruction to check that a pointer value is within its authorized bounds. Execution and security checking flows of disclosed embodiments are further illustrated and described with respect to FIGS. 3A-6C, 8-12, 17A-B, and 18A-B.

Figure 8A:
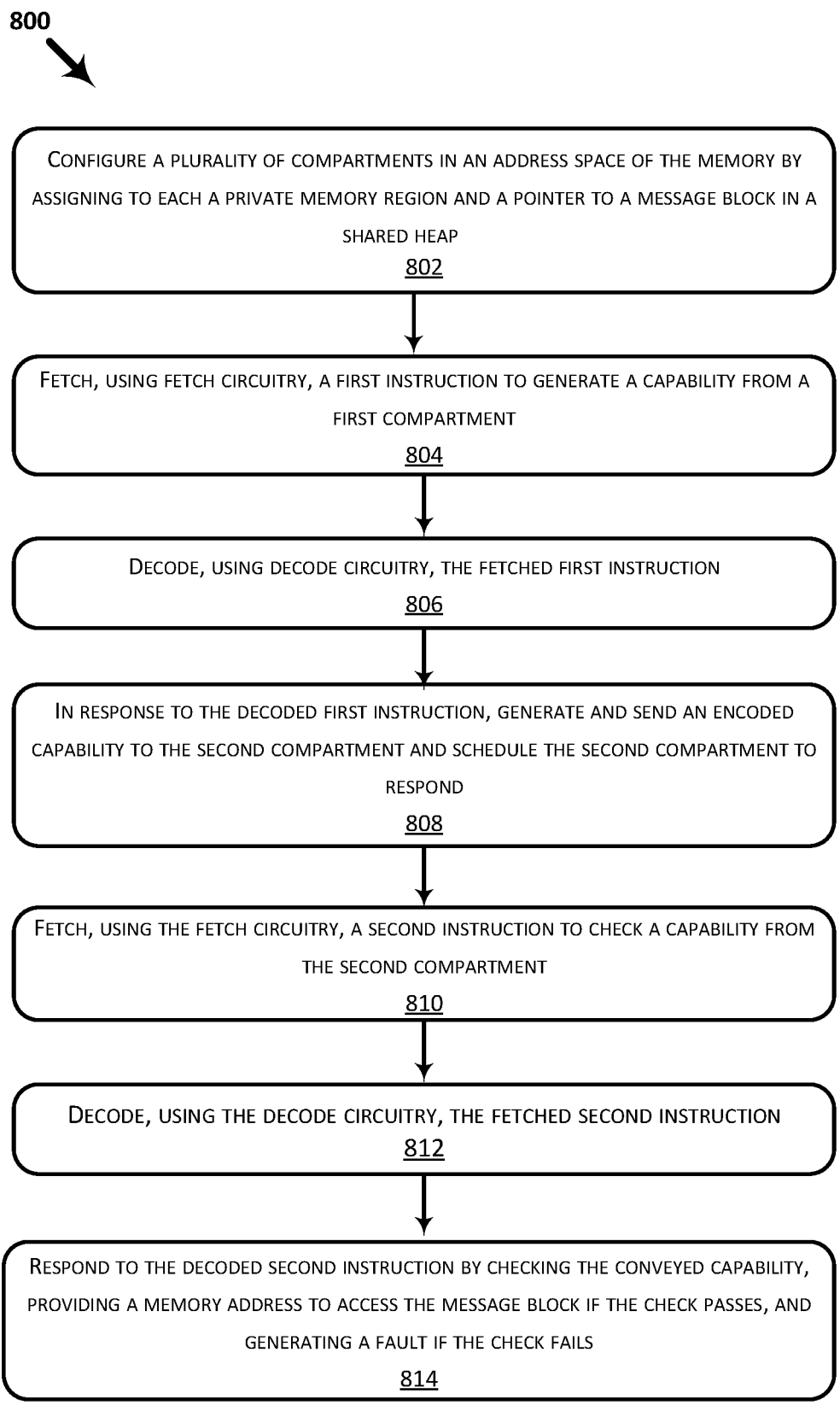
FIG. 8A is a block flow diagram illustrating a security check, according to some embodiments.

FIG. 8A is a block flow diagram illustrating a security check performed by a trusted execution environment (TEE), according to some embodiments. As shown, a TEE performs flow 800 starting at 802 by invoking a CheckCap instruction with a pointer and a maximum offset to be accessed. At 804, the TEE determines: does the context field indicate that this is an encoded pointer (i.e. its bits differ)? If so, at 806 the TEE determines: is Pointer [ChkSz+2: ChkSz]<LB? Then, at 808, TEE Decrement Pointer [27: ChkSize+3], and at 810 invoke sub-Flow: Check Pointer (which is illustrated and described at FIG. 8B). On the other hand, if the answer at determination 804 was "No," the TEE at 812 determines: does the capability fall within the region defined by EIC_PDR_RAS (base address of private data region)/ EIC_PDR_MASK (mask for private data region) base/mask register pair defining private memory region for current compartment? If so, the TEE at 814 returns unmodified Input pointer, and, if not, the TEE generates a fault at 816. In some embodiments, the specified private data region is enforced using a CheckCap instruction. A set bit in the EIC_PDR_MASK specifies that the corresponding bit in the address for the attempted access in the private data region is to match the value of the corresponding bit in the base, otherwise, a fault is generated.

Execution and security checking flows of disclosed embodiments are further illustrated and described with respect to FIGS. 3A-7D, 9-12, 17A-B, and 18A-B.

Figure 8B:
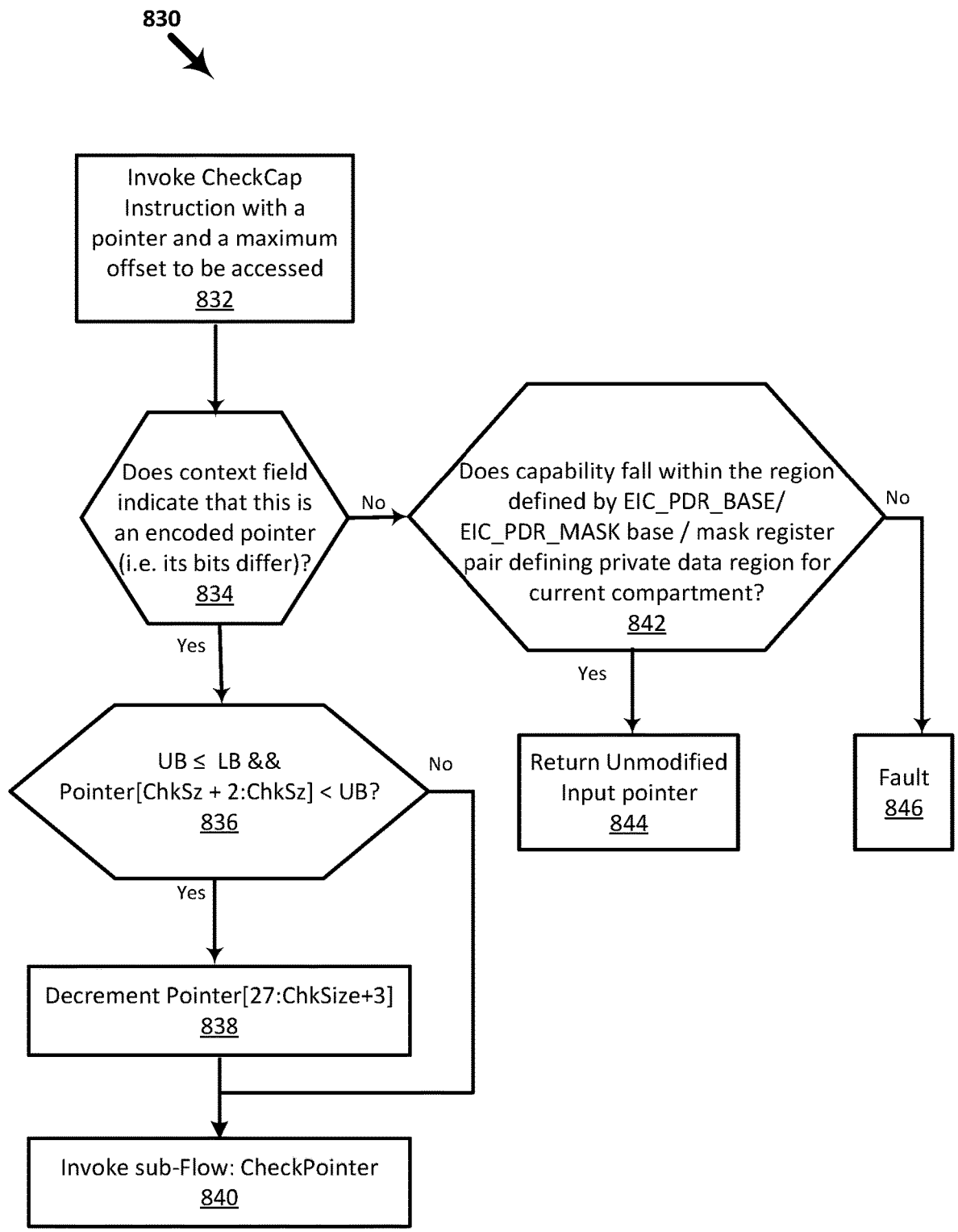
FIG. 8B is a block flow diagram illustrating a Check Pointer sub-flow of a security check, according to some embodiments.

FIG. 8B is a block flow diagram illustrating a Check Pointer sub-flow of a security check, according to some embodiments. As shown, a trusted execution environment (TEE) is to execute flow 830 starting at 832, where it is to invoke CheckCap Instruction with a pointer and a maximum offset to be accessed. At 834, the TEE is to determine: Does the context field indicate that this is an encoded pointer (i.e. its bits differ)? If not, the TEE is to determine at 842: Does capability fall within the region defined by EIC_PDR_BASE/EIC_PDR_MASK base/mask register pair defining private data region for current compartment? If not, TEE is to generate a fault at 846. But if the answer at 842 is Yes, the TEE at 844 is to return an unmodified input pointer.

Returning to 834, if the answer is Yes, the TEE at 836 is to determine whether UB≤LB && Pointer [ChkSz+2:ChkSz]<UB. If not, the TEE at 840 is to invoke a CheckPointer sub-flow.

On the other hand, if the answer at 836 was "Yes," the TEE at 838 is to decrement pointer[27:ChkSize+3] and then, at 840, the TEE is to invoke a CheckPointer sub-flow.

Execution and security checking flows of disclosed embodiments are further illustrated and described with respect to FIGS. 3A-7D, 9-12, 17A-B, and 18A-B.

Figure 8C:
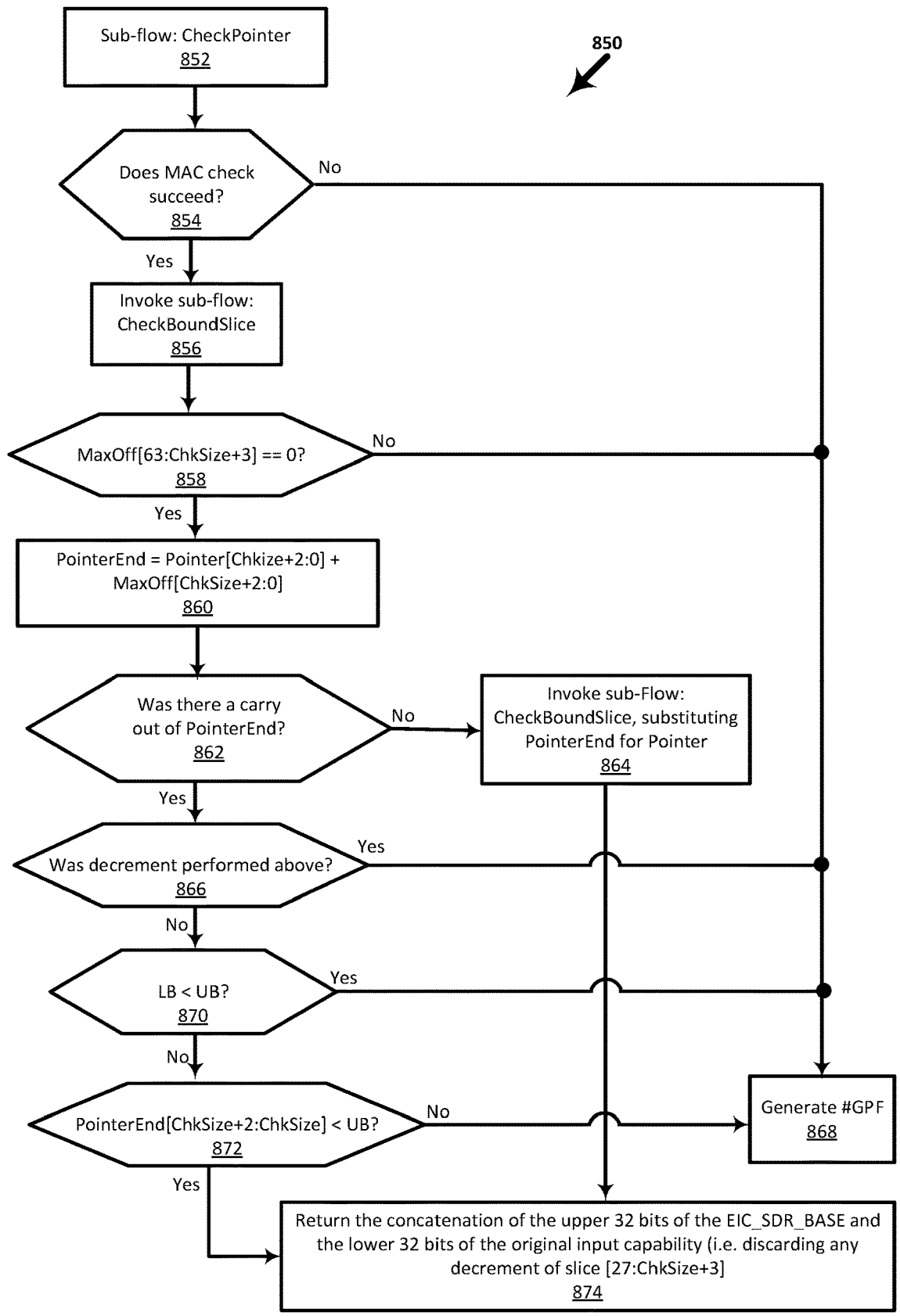
FIG. 8C is a block flow diagram illustrating a CheckBoundSlice sub-flow of a security check flow, according to some embodiments.

FIG. 8C is a block flow diagram illustrating a Check-Pointer sub-flow of a security check flow, according to some embodiments. CheckPointer is a sub-flow insofar as it is invoked at operation 840 (FIG. 8B). As shown, a trusted execution environment (TEE) is to execute flow 850 starting at 852. At 854, the TEE is to determine: Does MAC check succeed? If not, the TEE is to generate a fault at 868, and the flow ends. And if the answer at 854 is Yes, the TEE at 856 is to invoke sub-flow CheckBoundSlice (described in FIG. 8D). Then, at 858, the TEE is to determine: does MaxOff [63:ChkSize+3]=0? If not, the TEE to generate a fault at 868. But if so, the TEE at 860 is to set PointerEnd=Pointer [Chkize+2:0]+MaxOff[ChkSize+2:0]. Then, at 862, the TEE is to determine: was there a carry out of PointerEnd? If not, the TEE at 864 is to invoke sub-Flow: CheckBoundSlice, substituting PointerEnd for Pointer. But if the answer at 862 was yes, the TEE at 866 is to determine: Was decrement performed above? If so, the TEE is to generate a fault at 868. But if not the TEE is to determine at 872: is PointerEnd [ChkSize+2:ChkSize]<UB? If not, the TEE is to generate a fault at 868. But if the answer at 872 is Yes, the TEE at 874 is to return the concatenation of the upper 32 bits of the EIC_SDR_BASE and the lower 32 bits of the original input capability (i.e. discarding any decrement of slice [27:ChkSize+3].

Execution and security checking flows of disclosed embodiments are further illustrated and described with respect to FIGS. 3A-7D, 9-12, 17A-B, and 18A-B.

Figure 8D:
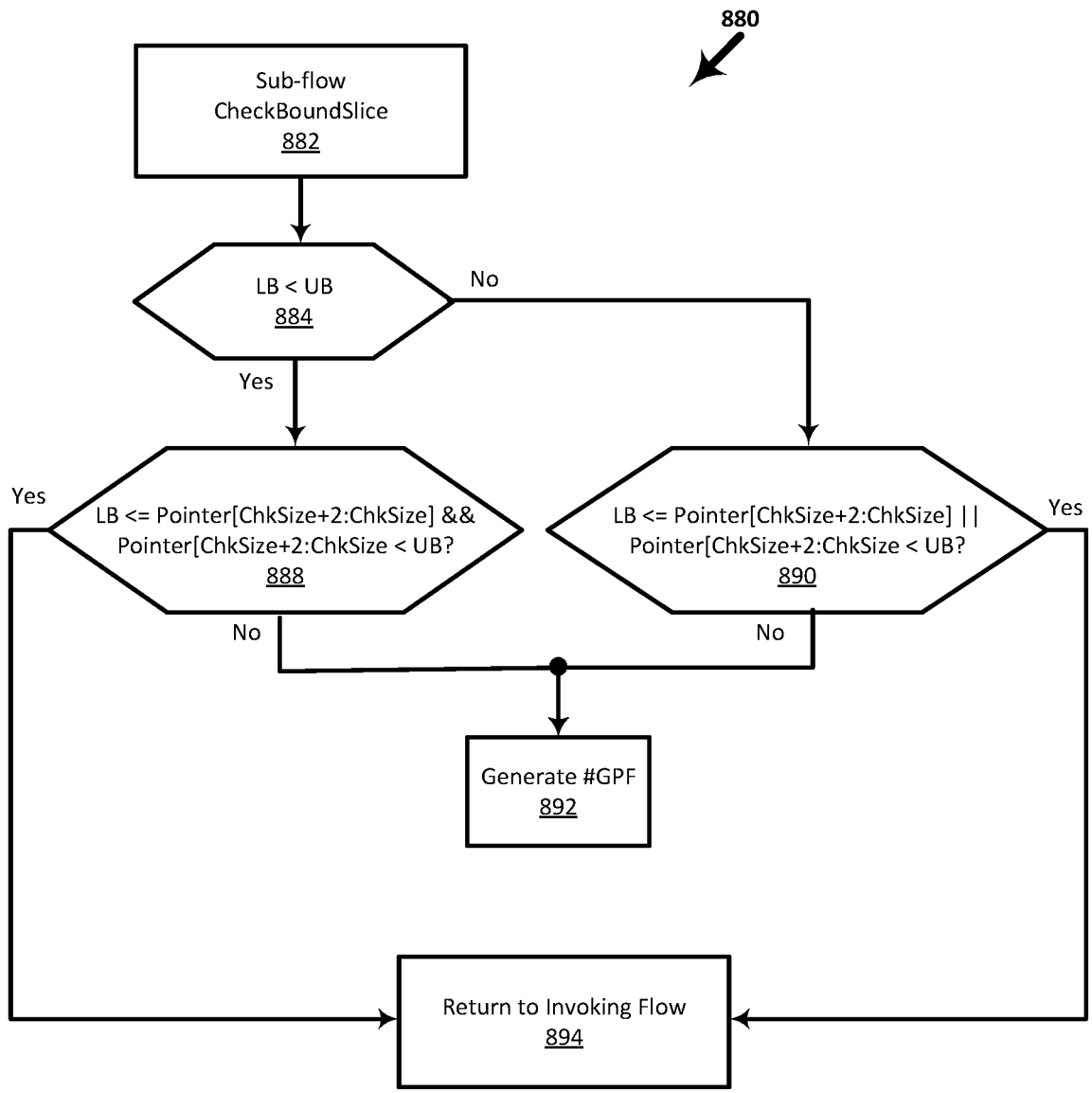
FIG. 8D is a block flow diagram illustrating a CheckBoundSlice sub-flow of a security check flow, according to some embodiments.

FIG. 8D is a block flow diagram illustrating a CheckBoundSlice sub-flow of a security check flow, according to some embodiments. CheckBoundSlice is a sub-flow, insofar as it is invoked by operation 856 (FIG. 8C). CheckBoundSlice flow starts at 882. At 884, the TEE is to determine: is LB<UB? If not, the TEE at 890 is to determine: is LB<=Pointe [ChkSize+2:ChkSize]||Pointer[ChkSize+2:ChkSize<UB? If not, the TEE at 892 is to generate a fault. But if the answer at 890 is Yes, the TEE at 894 is to return to the invoking flow, CheckPointer (FIG. 8C).

Returning to 884, if the answer is Yes, the TEE at 888 is to determine: is LB<=Pointer[ChkSize+2:ChkSize] && Pointer[ChkSize+2:ChkSize<UB? If not, the TEE at 892 is to generate a fault. But if the answer at 888 is Yes, the TEE at 894 is to return to the invoking flow, CheckPointer (FIG. 8C).

Figure 9:
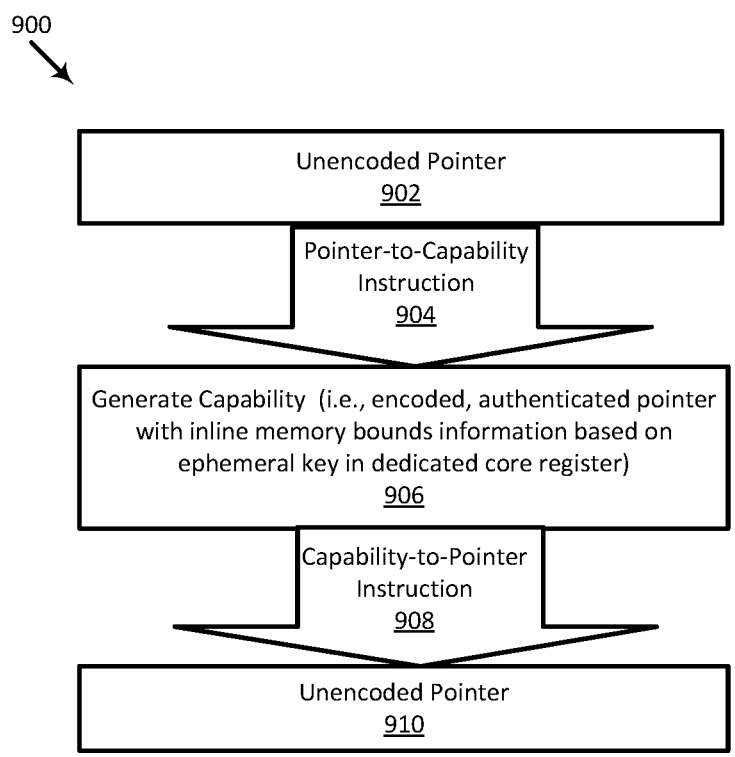
FIG. 9 is a block flow diagram illustrating conversion between an unencoded pointer to a capability, according to some embodiments.

FIG. 9 is a block flow diagram illustrating conversion between an unencoded pointer to a capability, according to some embodiments. Illustrated is the overall flow from the trusted execution environment generating an unencoded pointer, authenticating it, providing it to the compartment, and then the compartment using it.

As shown, flow 900 is to be performed by execution circuitry including a trusted execution environment (TEE), and starts at 902, at which the TEE receives an unencoded pointer. Along with the input, the TEE at 904 is to receive a Pointer-to-Capability Instruction, such as GenCap, described above. At 906, the TEE is to generate a capability (i.e., defined here as an encoded, authenticated pointer with inline memory bounds information based on an ephemeral key in a dedicated core register). At 908, the TEE is to receive a capability-to-pointer instruction, such as CheckCap, described above. The flow ends at 910 by the TEE providing an unencoded pointer (for example, to be used by a destination compartment to access a message block sent from another compartment).

Figure 10:
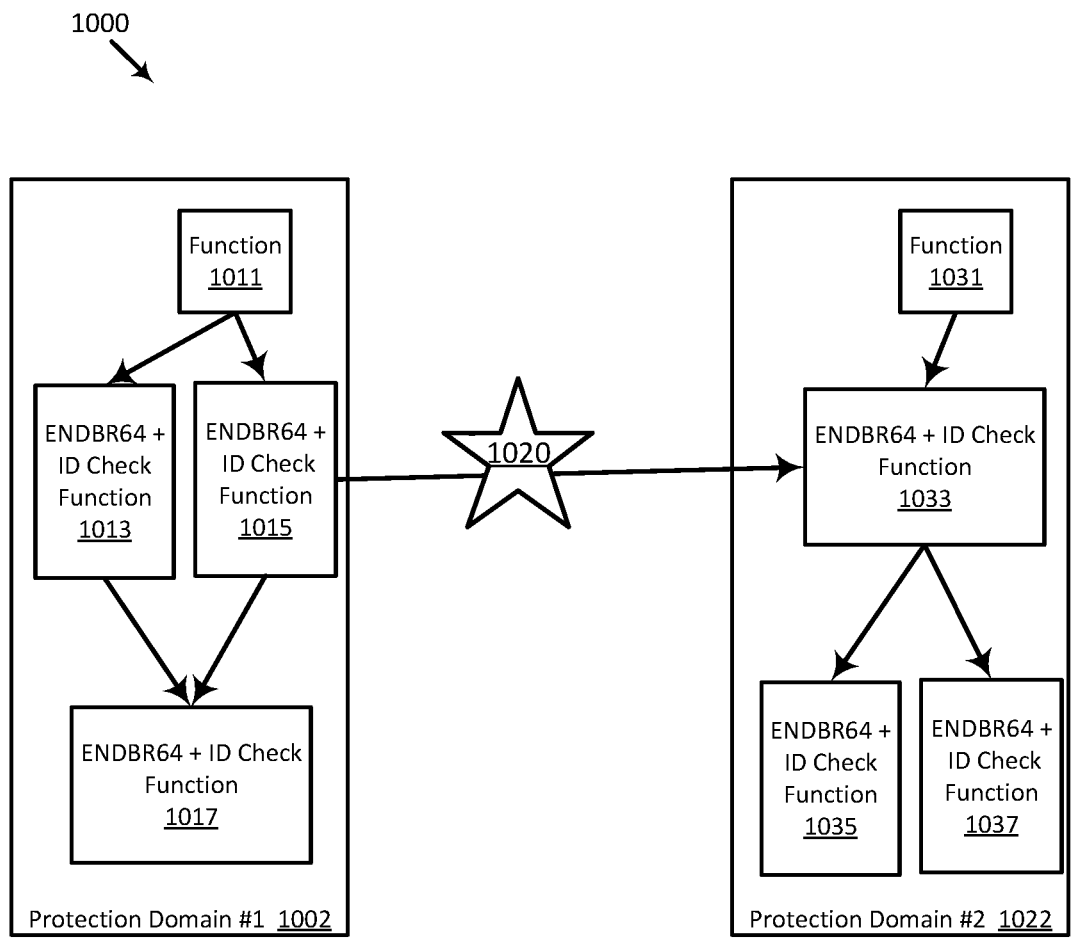
FIG. 10 illustrates maintaining integrity between service compartments by adding bounds checks after each END-BRANCH, according to some embodiments.

FIG. 10 illustrates maintaining integrity between service compartments by adding bounds checks after each END-BRANCH, according to some embodiments. As shown, system 1000 includes protection domain #1 1002, which includes function 1011, ENDBR64+ID Check Function 1013, ENDBR64+ID Check Function 1015, and ENDBR64+ID Check Function 1017. System 1000 further includes protection domain #2 1022, which includes function 1031, ENDBR64+ID Check Function 1033, ENDBR64+ID Check Function 1035, and ENDBR64+ID Check Function 1037.

Also illustrated is message block 1020 transitioning between the protection domains 1002 and 1022.

In operation, the current protection domain ID is stored in a thread-local location and is checked after each authorized indirect branch target. The root protection domain (PD) (sometimes referred to as the TEE) provides one special entry-point usable by non-root PDs to invoke the root PD. It has an ENDBR64 instruction, but that is not followed by an ID check.

In operation, the root PD (i.e., TEE) determines which PD to invoke next and updates the thread-local indicator of the current scheduled PD prior to invoking it. The root PD maintains shadow stacks for the service PDs to prevent the use of returns to perform unauthorized control flow transfers between services.

Some embodiments employ an alternative to permit sharing of functions between multiple compartments by checking a bitmask against the current PDID (protection domain ID). If the bit in the bitmask indexed by the current PDID is set, then the call is permitted. This limits the number of PDIDs that are supported simultaneously in each runtime instance, though. In some embodiments, functions that are exclusive to a single compartment as well as those that are shared amongst compartments are supported simultaneously, and each use the appropriate types of checks.

In some embodiments, the code for each compartment is scanned prior to being loaded to ensure that it is appropriately instrumented with CheckCap instructions and Intel© Control-flow Enhancement Technology (CET) control flow checks and to determine that it does not include prohibited instructions such as WRPKRU instructions that are attempted to be used to reconfigure EIC or to extract its key or to invoke unauthorized system calls. Such load-time checks verify that all indirect memory accesses have been generated by CheckCap. CheckCap transparently handles and checks both unencoded references to the private memory region as well as authenticated capabilities pointing to the shared blackboard. In such embodiments, a fault (#GP) results in immediate termination of active service protection domain to mitigate brute-force attacks against EIC. Some embodiments also check direct branches to ensure that they stay within the bounds of the compartment.

Emerging formats such as WebAssembly simplify scanning code, and they are compatible with this approach. WebAssembly also confers benefits such as intrinsic control flow integrity, likely eliminating the need to use CET and hence offering improved performance.

Note that in some embodiments, the code for each compartment resides outside of the private memory region for that compartment, which also effectively enforces execute-only permissions useful for protecting secrets embedded in that code.

There is still some possibility that an adversary may undetectably forge a capability. Some embodiments apply authenticated encryption to data in the shared heap and efficiently transfer the key and nonce for the authenticated encryption to the intended destination of the data via the trusted execution environment. This is a much lighter-weight process than establishing an encrypted tunnel over a network. The authenticated encryption protects both the integrity and confidentiality of the data. Some embodiments use a different key or nonce for each exchange, thereby providing replay protection.

Figure 11:
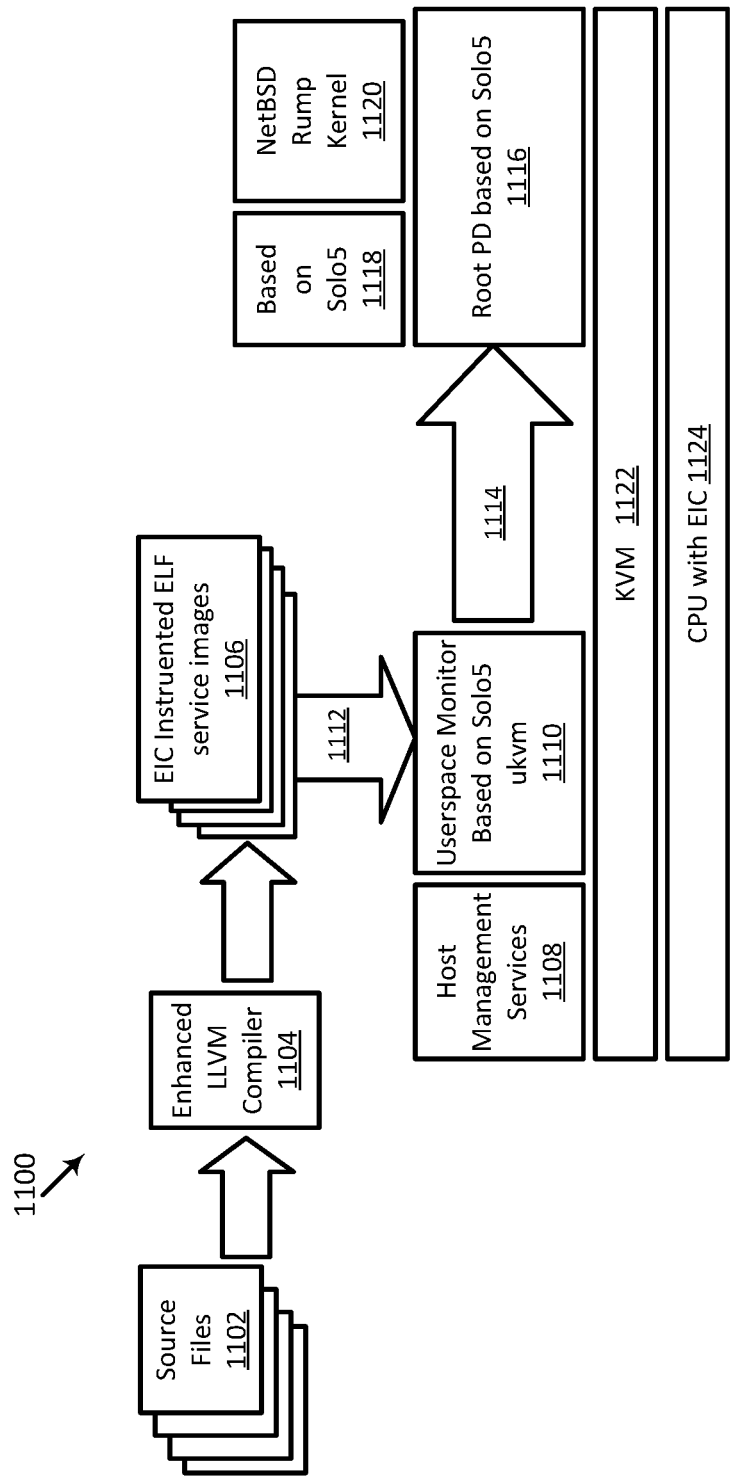
FIG. 11 illustrates an end-to-end system using encoded inline capabilities, according to an embodiment.

FIG. 11 illustrates an end-to-end system using encoded inline capabilities, according to an embodiment. As shown, system 1100 includes source files 1102 and enhanced LLVM compiler 1104.

As used herein, LLVM refers to the LLVM compiler infrastructure project, which is a collection of modular and reusable compiler and toolchain technologies used to develop compiler front ends and back ends. LLVM features, documentation, and related documents are available at llvm.org.

System 1100 further includes EIC instrumented executable and linkable format (ELF) service images 1106, which are fed via arc 1112 to userspace monitor based on Solo5 ukvm 1110, which works with host management services 1108. As used herein, Solo5 is a sandboxed execution environment for unikernels, which here is shown as ukvm. As shown, the system is supported by KVM 1122 and CPU with EIC 1124. As used herein, KVM refers to a Kernel-based Virtual Machine, which is a virtualization infrastructure for the Linux kernel that turns it into a hypervisor.

The output of 1110 passes via arc 1114 to Root PD (sometimes referred to as the TEE) based on Solo5 1116, which is coupled to Based on Solo5 1118 and NetBSD Rump kernel 1120.

Of course, it should be understood that the components illustrated in end-to-end flow are just exemplary components that can benefit from disclosed encoded inline capabilities (EIC). The illustrated components are not meant to limit applicability of disclosed embodiments.

Software Innovations to Support EIC

The compiler must be enhanced to insert the needed CheckCap instructions prior to memory accesses. In some embodiments, compilers are also enhanced to explicitly specify whether a particular global variable needs to be accessible from multiple compartments, although simply placing certain heap allocations in the shared data region may be sufficient.

In some embodiments, a trusted validator component verifies that needed instrumentation (e.g., appropriate CheckCap instructions and PDID checks following END-BRANCH instructions) is in place prior to permitting the compartment to be launched. Alternatively, the validator accepts an intermediate representation as input and inserts the appropriate instrumentation itself.

The trusted execution environment provides services such as memory allocation on the shared heap and private message heaps, reference counting of those allocations, scheduling, adapting local and remote requests, etc.

In some embodiments, the trusted execution environment decides, when allocating and transferring objects, whether it is faster to allocate them in the shared heap (i.e., if they are large) or in a private, runtime-managed message heap in each relevant compartment. Regardless, the application programming interfaces (APIs) for allocating and transferring objects are identical. The trusted execution environment transparently decides on the location and hence whether to use encoded pointers to refer to the object. If the object is small and allocated on the private message heaps, then the runtime directly copies data between the two heaps. The runtime uses reference counting to manage data both in the shared heap and in each private, runtime-managed message heap. Note that, in some embodiments, each compartment also maintains its own private heap that is not managed by the runtime.

In some embodiments, the trusted execution environment offers generic data transfer APIs that detect whether the specified endpoint is in the same address space or a different address space and automatically use the optimal transport mechanism. This also supports transparent interoperability with legacy services.

Note that this same system design can also be used with alternative compartmentalization mechanisms such as Protection Keys.

This is just a sample architecture, and the basic concept of single address space isolation can be implemented in many other ways to suit the requirements of various FaaS frameworks such as OpenWhisk, Oracle Fn, commercial FaaS offerings, etc.

In some embodiments, an EIC state is saved and restored using XSAVE/XRSTOR. EIC is not restricted to userspace; it can also be used in the kernel, e.g., to isolate drivers.

EIC states (EIC_AUTH_KEY, EIC_SDR_BASE, EIC_PDR_BASE, EIC_PDR_MASK), in some embodiments, are saved and restored on context switches. To achieve this, they can be part of the context stored by XSAVE/XRSTOR instructions, and also part of VMCS for VM switches, thus minimizing software changes.

Compartments can be run concurrently on multiple threads/cores as long as the trusted execution environment installs the same EIC key for each of them.

In some embodiments, a separate EIC key is used for each "epoch" of compartment execution. As used herein, a compartment's lifetime consists of one or more epochs. For example, a service that handles network requests defines a separate epoch for each incoming request. That enables the service to save its state in its private memory region across multiple requests, but it still loses access to messages transferred through the shared heap. This is a desirable property to avoid race conditions. For example, in some embodiments, a single packet is propagated through a chain of services, and only one service is granted access to the packet at a time.

In some embodiments, preemption of compartments is also supported by saving and later restoring EIC state, in addition to the ordinary execution context of the compartment.

EIC keys need to be generated very rapidly to keep up with the creation and destruction of epochs. One option for satisfying this requirement is for the trusted execution environment to offload the key generation task to an accelerator, such as Intel© QuickAssist, and store batches of keys received from the accelerator, ready to be installed in the EIC authentication key register on demand. Alternatively, in some embodiments, a new instruction is defined to update the EIC authentication key and even start generating the next key in the background as soon as the previous one is installed.

In some embodiments, the key derivation/generation is performed using Intel© Quick Assist Technology (QAT) cryptographic API Key Derivation Functions (KDFs) such as those defined in cpa_cy_key.h. QAT can support very high throughput of symmetric-key generation (in the range of 100 Gbps), which is sufficient to meet the demands of network infrastructures. Alternatively, NIST-approved KDFs are implemented in hardware (NIST spec SP 800-108 outlines the basic framework for key derivation). For example, KDF in counter mode using a Pseudo-Random Function (PRF) with a Key Derivation Key (KDK) derived from Intel® Digital Random Number Generator (DRNG) software may be used.

Alternative Embodiments

In some embodiments, capability information is encrypted rather than authenticated, which is accompanied by certain tradeoffs. Corruption of authenticated capabilities can be detected prior to decoding the capability/pointer, which may be advantageous for explaining the security semantics of EIC. In contrast, corruption of encrypted capabilities is detected after the capability is decoded, at the point when an access is attempted through the resultant pointer (e.g., general protection fault due to non-canonicality or page fault due to probabilistically pointing to an unmapped page). However, hybrid models are possible, in which fixed bits are encrypted and the scheme is partially reliant on late-detected faults for security, but in which earlier checks are also performed. For example, in some embodiments, an early canonicality check is pulled forwarded into CheckCap to result in a de facto MAC check.

In some embodiments, memory operands for standard instructions are redefined to perform checks equivalent to those in CheckCap inline with memory accesses. In X86, addresses are typically encoded with SIB in a form [BASE+INDEX*SCALE]+DISPLACEMENT.

Example: LEA 16(% RAX+% RCX*8), % RDX

If the base register (% RAX, in this example) is determined to be a capability through a specific pattern in the context field of its pointer value, then the effective address computation involves an implicit CheckCap operation, which advantageously allows the CheckCap operation to be inserted without requiring it to be explicitly inserted. Instrumentation to perform control flow checks, however, is still needed. Some embodiments eliminate that instrumentation by adding some feature such as a linear range register for restricting relative instruction pointer values, with a designated page that can update the range register when switching compartments or code-scanning to verify that no such update instructions are present in any of the code flows within unprivileged services.

EIC is currently defined to minimize hardware touchpoints, so pointer manipulation instructions and the register file do not distinguish between unencoded and authenticated pointers.

However, building in deeper support for encoded capabilities in some embodiments offers performance or assurance benefits. For example, in some embodiments, specialized pointer load instructions are defined that detect whether a pointer is authenticated when loading it into a register and performing authentication at that point. In that case, updates to the pointer are tracked and an exception is generated immediately when an out-of-bounds pointer update is performed, although that can result in incompatibility with certain programming languages that require the ability to temporarily represent out-of-bounds pointers. The register file, in some embodiments, is enhanced to also decode pointers and store them in an expanded format that facilitates more efficient checks and updates.

As another alternative to optimize an implicit CheckCap implementation, in some embodiments, caching of translations is implemented with 'Memory Target Buffers' similar to either TLBs or BTBs, mapping either a capability to base or instruction to base, to avoid the need for subsequent translations. In some embodiments, MTB records contain decoded limits, which simplify validation of bounds. MTB lookup can be based on the capability being used, or on the address of the executing instruction with a tag to check whether the same capability is being used in repeated invocations of the instruction.

Some disclosed embodiments focus on a single authentication key, but other embodiments extend EIC in a straightforward fashion to support multiple, simultaneous keys stored in separate registers or derived from a single master key based on a contextual input (e.g. a key ID). In some such embodiments, each of those keys is associated with a single shared data region or multiple shared data regions. The advantage of supporting multiple keys in different registers, as is done in some embodiments, is to enable different groups of pointers to be revoked separately by refreshing the corresponding key. Even with a single master key register, as in some embodiments, supporting multiple effective keys is useful for coarse-grained type safety enforcement. Different types of objects, in various embodiments, have their pointers authenticated with separate effective keys.

It may also be useful to support rapidly switching EIC compartment configurations (the settings of EIC_AUTH_KEY, EIC_PDR_BASE, EIC_PDR_MASK, and possibly EIC_SDR_BASE) in hardware rather than requiring the involvement of the trusted execution environment. For example, in some embodiments, a new atomic branch type is defined that performs such a switch based on in-memory compartment descriptors.

To reclaim bits for a stronger MAC, in some embodiments, the granularity of the overall pointer is reduced, e.g., by requiring that all pointers be 16-byte aligned to avoid storing the lowest four bits of the pointer. However, that breaks compatibility with standard pointer arithmetic and poses challenges for deriving pointers to fields within structures, etc.

Services narrow capabilities that they have received using approved code sequences, in some embodiments, such as the following:

CheckCap $sz, % RCX⇒% RAX
MOV $(sz-8), % RSI//The new size must be no larger than the original size
GenCap % RSI, % RAX⇒% RDX The necessary property to enforce when deriving a new capability C1 from an existing capability C0 is that the authorized bounds of C1 must not exceed those of C0 in either direction. This property can be checked simply based on inspecting the parameters to the paired GenCap and CheckCap instructions.

As an alternative to the private memory region base/mask pair, in some embodiments, a range register is specified instead to support more flexible alignment.

If it is possible for the compiler to statically distinguish between attempts to access the private memory region vs. the shared data region, in some embodiments, the compiler emits different instrumentation tailored to each. For example, in some embodiments, a range register or base/mask pair is used to specify the private memory region and an instruction checks an address against those, and a different instruction type is used to check attempted accesses against encoded pointers. Alternatively, in some embodiments, implicit checks are performed based on the effective segment of an access (e.g. DS, ES, and SS within the private memory region and GS for accesses through capabilities).

Some embodiments authenticate or encrypt code pointers in addition to data pointers. In some embodiments, a distinct context field value is defined for code pointers. For example, if the context value 2'b01 is used for data pointers, then the context value 2'b10 is used for code pointers. A CheckCodeCap instruction may be defined to authenticate and decode encoded code pointers. In some embodiments, indirect branch instructions are preceded by CheckCodeCap instructions to ensure that indirect branches are directed to authorized destinations. This eliminates the need for CET to control indirect branch destinations. CheckCodeCap performs different checks depending on whether the input code pointer value is encoded, as indicated by it having a context value of 2'b10, or unencoded, as indicated by it having a context value of 2'b00 or 2'b11. In some embodiments, CheckCodeCap checks unencoded code pointers against a base and mask register pair defining the authorized code region for unchecked code pointers, or it may simply not check unencoded code pointers. In some embodiments, passing an encoded data pointer, as indicated by it having a context value of 2'b01, to CheckCodeCap is disallowed and results in an exception being generated. The encoding of code pointers is simpler than that of data pointers, since it is unnecessary to specify object bounds for code pointers. Thus, in some embodiments, it is possible to allocate more of the pointer bits to the MAC to strengthen it. Alternatively, more of the pointer bits could be used to specify code locations, enabling access to a larger code address space. In some embodiments, a GenCodeCap instruction is defined to accept an unencoded code pointer as input and to generate an encoded and authenticated code pointer as output. Such embodiments generate a fault if the input code pointer is unrepresentable in encoded form, e.g. if it has upper address bits set that overlap with the bit positions used for storing the context value or the MAC in the encoded pointer format.

Multi-Address Space Usage

This disclosure has primarily focused on isolating multiple compartments within a single address space, but the underlying mechanisms are equally useful for restricting accesses from multiple address spaces to a memory region that is shared amongst them at the paging level. In some embodiments, EIC imposes a finer-grained level of sharing control so that even though the whole shared data region is available from every process in that set, the sandboxed portion of each process only receives access to particular objects within that shared region. Of course, in some embodiments, this is extended in a straightforward fashion to support multiple compartments in some or all of the processes.

Figure 12:
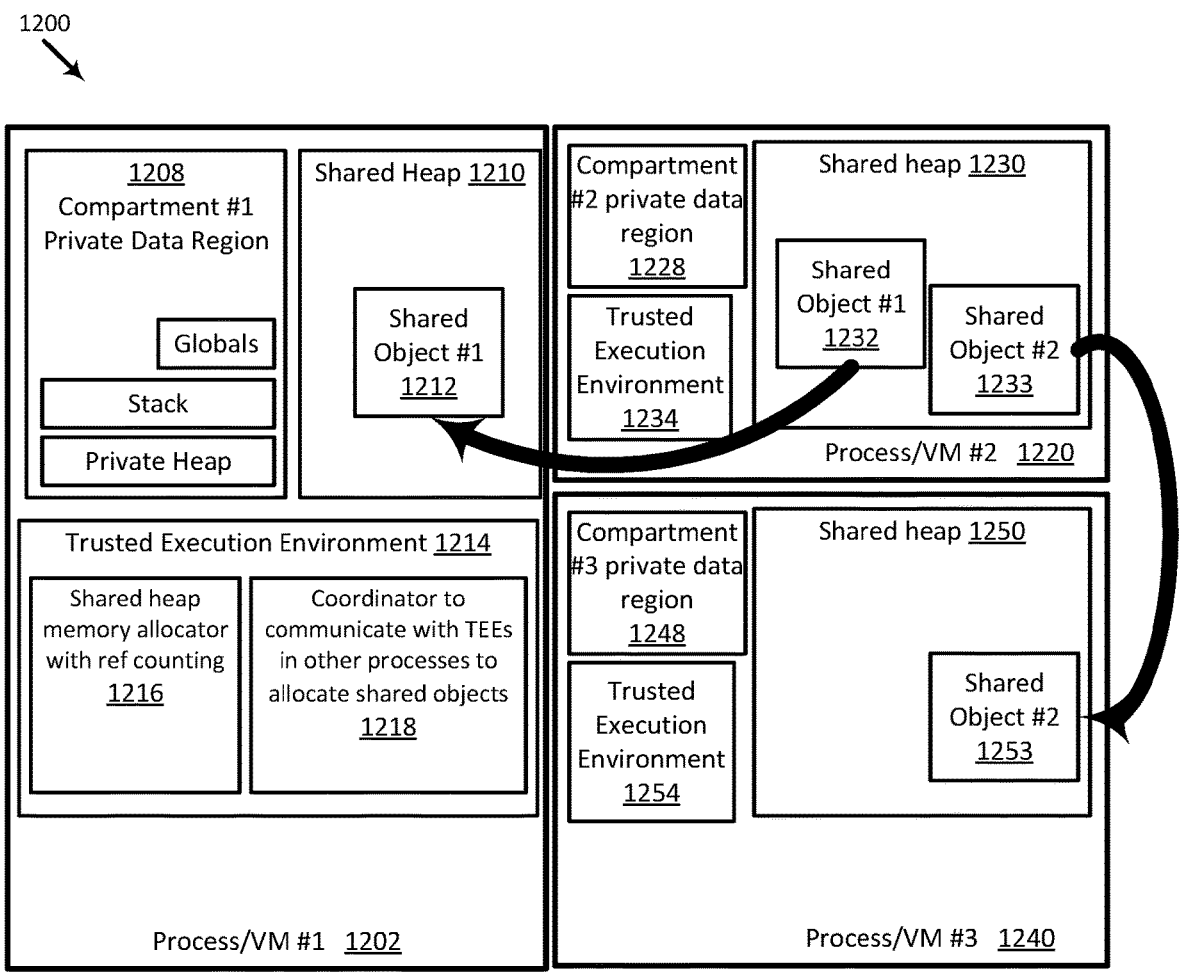
FIG. 12 illustrates a system for using encoded inline capabilities with multiple address spaces, according to an embodiment.

FIG. 12 illustrates a system for using encoded inline capabilities with multiple address spaces, according to an embodiment. As shown, memory 1200 includes three process/VM instances, 1202, 1220, and 1240. Process/VM #1 1202 includes compartment #1 private data region 1208, shared heap 1210, which includes shared object #1 1212, and trusted execution environment (TEE) 1214, which includes shared heap memory allocator with ref counting 1216, and coordinator 1218 to communicate with trusted runtimes in other processes to allocate shared objects. Process/VM #2 1220 includes compartment #2 private data region 1228, trusted execution environment 1234, and shared heap 1230, which includes shared object #1 1232 and shared object #2 1233. Process/VM #3 1240 includes compartment #3 private data region 1248, trusted execution environment 1254, and shared heap 1250, which includes shared object #2 1253. Though not shown, each TEE 1234 and 1254 includes a controller like coordinator 1218 to communicate with trusted runtimes in other processes to allocate shared objects.

As shown, each TEE 1214, 1234, and 1254 is to provision and configure the compartments in its address range. In some embodiments, each TEE 1214, 1234, and 1254 is in a different processor or processor core, and in other embodiments, one of more of the TEEs are on a same processor. Each TEE 1214, 1234, and 1254 is further to receive and respond to GenCap and CheckCap requests from its constituent compartments.

Here, the illustrated operation involves a request to send a first and a second message block (via GenCap) received from compartment #2 private data region 1228 to destination compartments #1 private data region 1208 and #3 private data region 1248, respectively. In some embodiments, TEE 1234 receives and responds to a GenCap request from compartment #2 private data region 1228 to generate an access control capability, and TEE 1214 and 1254 are to receive and respond to CheckCap requests from destination compartments #1 private data region 1208 and #3 private data region 1248, respectively. In other embodiments, TEE 1234 receives and responds to the GenCap request from compartment #2 private data region 1228 to generate the access control capability. In some embodiments, TEE 1234 also responds to CheckCap requests received from compartment #1 private data region 1208 and compartment #3 private data region 1248 through their respective TEEs, 1214 and 1254.

Figure 13:
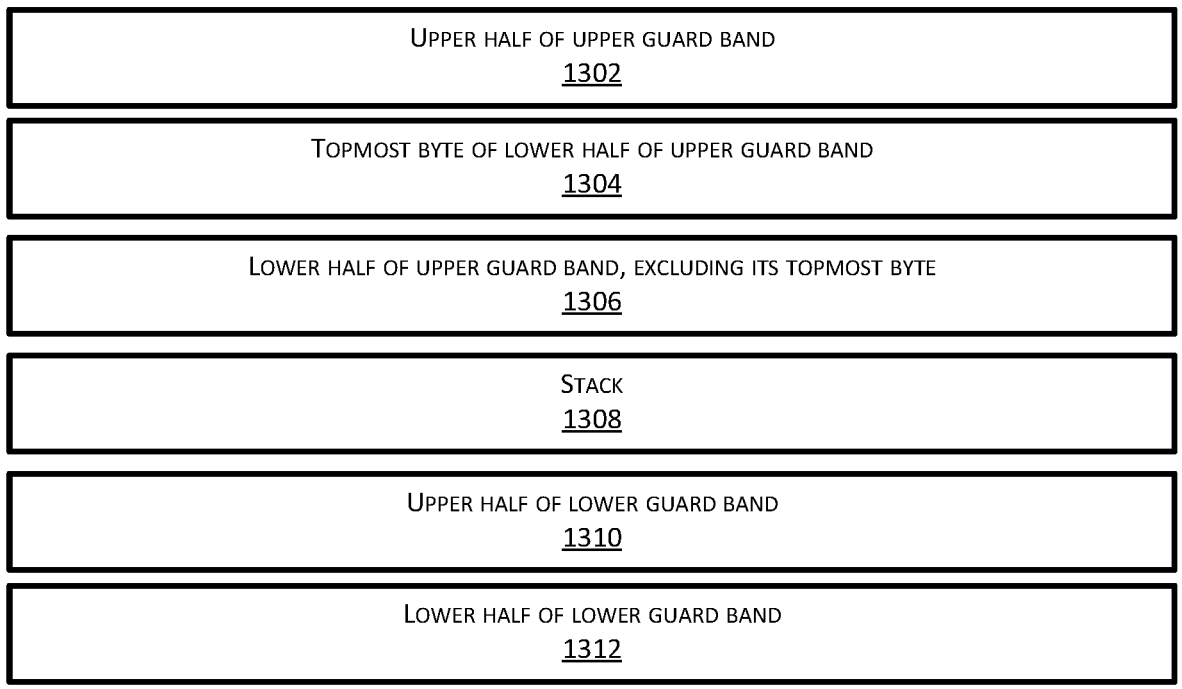
FIG. 13 illustrates a memory map including a stack, according to some embodiments.

FIG. 13 illustrates a memory map including a stack, according to some embodiments. As shown, memory map 1300 includes upper half of upper guard band 1302, topmost byte of lower half of upper guard band 1304, upper half of upper guard band, excluding its topmost byte 1306, stack 1308, upper half of lower guard band 1310, and lower half of lower guard band 1312.

Instrumenting Code with GenCap and CheckCap Instructions

In some embodiments, memory accesses are instrumented with CheckCap instructions, e.g.:

(at entry, encoded pointer stored in RAX)
CheckCap 7, % RAX⇒% RCX; Decode pointer from RAX and load into RCX
MOV (% RCX)⇒% RDX; Load from object It is possible to optimize sequences of code that access different offsets within the same object to only execute a single CheckCap specifying the maximum offset. Here is an example:

(at entry, encoded pointer stored in RAX)
CheckCap 23, % RAX⇒% RCX; Decode pointer from RAX and load into RCX
MOV (% RCX)⇒% RDX; Load from object
MOV 16(% RCX)⇒% RSI; Load from different offset in object It is the responsibility of a validator component to check that the instrumentation is adequate to enforce security prior to launching the compartment. In this example, it checks that anywhere RCX is used, the maximum offset that can be accessed from RCX is less than or equal to the offset that was specified in the check: 23. If any instruction were to modify RCX prior to using it to specify an address, then that must be taken into account during the checks. Certain modifications may be too complex for the validator to statically verify them, depending on the abilities of the validator to analyze complex code. For example, if some other register is added to RCX, as in some embodiments, then the validator needs to determine bounds on the possible values of that addend, which may require additional code analysis. In such cases, the validator rejects the provided binary.

In addition to the simple optimizations described above to reduce the number of CheckCap instructions needed, more advanced optimizations are possible like those used to optimize MPX instrumentation. For example, in some embodiments, loops that iterate through arrays have the CheckCap instruction lifted out of the loop and modified to check the entire set of iterated accesses at once.

Any fault detected while executing CheckCap must trigger the immediate termination of the faulting compartment to preclude brute force attacks against the EIC authentication key. Terminating the compartment results in the erasure of the key used to authenticate capabilities for that compartment. It may still be possible for an adversary to launch a distributed brute force attack by deploying many parallel compartments and attempting the same attack in each, but such an attempt can be detected by a service provider (i.e., if a particular customer's compartments generate a large number of faults, then that customer may be suspected of malicious activity and blocked). Ordinarily, CheckCap instructions should not generate faults, although benign software bugs may result in some faults.

TSX has been misused in the past as a mechanism for suppressing faults during security attacks, and, in some embodiments, such uses are prevented for EIC-enabled workloads. For example, in some embodiments, CheckCap is defined to unconditionally abort to avoid revealing information about the MAC key.

It is also necessary to regulate control flow transitions so that only the trusted execution environment is able to transfer control from one compartment to another. As mentioned above, mechanisms based on Intel® Control-flow Enhancement Technology (CET) control flow checks are suitable for regulating those control flow transitions.

Software Hardening/Exploit Mitigation Usages

Beyond networked service isolation, EIC can be used to define memory regions for data with different sensitivity levels. For example, the SafeStack pass in LLVM stores stack allocations that are always accessed safely separately from those allocations that may be accessed unsafely. This can mitigate ROP vulnerabilities and corruption of spilled register data. However, it is necessary to protect the safe stack from unauthorized accesses, e.g. due to stray pointer writes. In some embodiments, EIC enforces such a policy by placing the safe stack outside of the private memory region and only instrumenting memory accesses that are NOT authorized to access the safe stack with CheckCap instructions. Furthermore, EIC supports making this policy more flexible by offering the ability for the program to define capabilities containing bounds for safe stack allocations and passing those to code that may perform unsafe memory accesses. Since the code is instrumented, the CheckCap instructions will prevent any unsafe accesses. Unsafe stack allocations and other memory allocations will still be accessed with no overhead from checking encoded pointers, only the minimal overhead from the private memory region base/mask check. This enables additional, sensitive stack allocations to be selectively moved to the safe stack, even though the compiler was not previously able to do so given the possibility for unsafe accesses to the objects in the absence of bounds checks. Fundamentally, the ability for a single instruction, CheckCap, to process both encoded and unencoded pointers is what provides this flexibility.

Another similar example is DataShield (see www.datashieldprotect.com), which allows developers to annotate sensitive data and ensures that any code that may access that data is instrumented with bounds-checking logic. It improves efficiency relative to bounds-checking all data. Currently, DataShield stores bounds information in a metadata table, which restricts the flexibility of the policy by requiring a strict partition between sensitive and insensitive code and data. Otherwise, if code authorized to access sensitive data tried to access non-sensitive data, it would not find the necessary bounds metadata, resulting in incorrect program behavior. This inflexibility results in high overhead. In some embodiments, EIC helps reduce overhead by embedding metadata inline with only those pointers that require it. In some embodiments, sensitive data is stored in the shared data region, although it is in fact private to a single application in this model. The primary model described above of implicitly specifying chunk size based on location in the shared heap is unlikely to be suitable for protecting a stack structure, but sensitive stack allocations can be converted to heap allocations, or, as in some embodiments, a field is added to the encoded pointers to explicitly specify chunk sizes. Of course, that would require taking those bits from some other field, which may have tradeoffs such as weakening the MAC. Non-sensitive data in some embodiments is stored in the private memory region. The same code, in some embodiments, processes data with either classification, and appropriate bounds checks are performed on both types of accesses to prevent corruption of sensitive data. In some embodiments, EIC is used to track data flows from memory through registers whether it was loaded from the shared data region or the private memory region and ensure that any registers tainted by data from the shared data region are only ever written back to the shared data region if an authorized declassify instruction is used to declassify the data in the register. This serves as a check on the compiler's algorithms that perform static information flow analysis through the program and identify data allocations that may end up tainted with sensitive data and hence must be allocated in the shared data region.

Validating Untrusted Binaries

In some embodiments, untrusted binaries are validated as being properly instrumented with security checks prior to executing them. This section describes possible mechanisms for performing such validation. The method of validation varies depending on the base binary format that is selected. To illustrate the validation, three exemplary embodiments are described:

1. ELF or other executable formats: A low-level, machine-specific format.
2. LLVM machine IR: Also low-level and machine-specific, but with more semantic information about control flow structure, etc.
3. WebAssembly modules: A platform-independent format with expressive control flow instructions and restricted semantics expressly intended to permit easy validation.

"Validation" can take a number of forms. The server may require that all necessary security instrumentation was inserted when the binary was generated. Alternatively, the server may take on some of the responsibility for inserting security instrumentation. This may lead to the preference of one format over another. For example, LLVM machine IR and WebAssembly are both intended to be transformed by a compiler into a final executable representation, so it is natural to insert instrumentation at that stage.

Some memory accesses in programs specifically reference the stack or globals, whereas others are directed by pointers that refer to the heap, stack, or globals. Some embodiments obviate the need for invoking CheckCap by simply validating that such memory accesses do in fact refer only to the authorized stack or global regions.

Accesses to global variables and constants within the current binary file must be performed using RIP-relative addressing so that the code validator can inspect each such access and verify that it points to a memory region that is entirely contained within either the bss or data section of the current binary file. In some embodiments, there are limitations in the types of accesses (e.g., dynamically computed offsets within an array) that can be statically validated, so such accesses need to be treated like other pointer accesses that require dynamic validation as described previously (e.g., using CheckCap).

Some embodiments avoid instrumenting programs that frequently access the stack by restricting stack accesses to always be within some maximum offset from a base register pointing into the stack. The validator also checks updates to base registers pointing into the stack. According to some embodiments, the security property to be enforced is represented by Theorem 1, below.

Theorem 1

Theorem 1: Any attempted stack access that falls outside the authorized bounds of the stack results in a page fault.

This theorem is trivially satisfied by marking all memory outside of the stack as inaccessible, but such a system would not be practically usable. Instead, some embodiments define guard bands of memory above and below the stack that are unmapped and hence inaccessible. With this as context, Theorem 1 is decomposed into the following lemmata. The term "stack base register" as used herein refers to any live register interval that is used as a base register for a stack memory access. RSP is always considered to be a stack base register, but other registers can be used as stack base registers as well. It can be challenging to even identify stack base registers. In some embodiments, a "SafeStack" pass is used to move any stack allocation whose address may be passed to a subroutine to a separately-allocated stack on the heap. Those accesses in some embodiments are fulfilled similarly to other heap accesses as described above. This permits the same stack base register determination to be used as was used for SafeStack hardening: Only RSP initially points into the stack at the start of a function, so only registers that are derived from RSP are stack base registers.

Lemma 1.1: At the time that a register is used as the base for a stack memory access, it is either within the authorized bounds of the stack, no greater than (guard band size/2) bytes below the lower stack boundary, or less than (guard band size/2) bytes above the upper stack boundary. This is represented graphically in FIG. 13 as regions 1306, 1308, and 1310.

Lemma 1 can be argued informally using two sub-lemmata, lemma 1.1.1 and lemma 1.1.2.

Lemma 1.1.1

First, Lemma 1.1.1: At the time that a stack base register is updated, its original value is no lower than the lower stack boundary and it is below the upper stack boundary (not equal to the upper stack boundary). Argument for Lemma 1.1.1: The code validator can statically check that any instruction that updates the stack base register is preceded by an instruction that attempts to access the memory pointed to by the previous value of the stack base register. The code validator also needs to check that no other instruction between these two updates that same stack base register. The compiler may need to be enhanced to ensure that this is always the case by inserting dummy stack accesses immediately preceding stack access instructions that otherwise would invalidate this lemma. Note that some instructions both update the stack pointer (a special stack base register) and access the stack (in different orders), such as PUSH, POP, CALL, and RET.

Lemma 1.1.2

Second, Lemma 1.1.2: No stack base register is updated by more than (guard band size/2) bytes at a time. Argument for Lemma 1.1.2: The code validator can statically check this property, although it may constrain the instructions that can be used to update stack base registers. For example, the code validator may only support a specific set of instructions that update stack base registers by amounts specified as immediate operands or static implicit amounts as in PUSH, POP, CALL, and RET instructions. In practice, this is sufficient to handle most or all code emitted by LLVM. Argument for Lemma 1.1: Lemma 1.1.1 and Lemma 1.1.2 taken together imply that after any update of a stack base register, that register must point within the regions 1306, 1308, or 1310 in FIG. 13.

Lemma 1.2

Lemma 1.2: All stack accesses specify a displacement that is no greater than (guard band size/2) bytes from the base register.

Argument for Lemma 1.2: The code validator can statically check this property, although it may constrain the memory addressing forms that can be used to access the stack. For example, the code validator may only support instructions that specify either no displacement or an immediate displacement. Instructions that implicitly access the current stack slot such as POP and RET are considered to specify no offset from the stack pointer. Instructions that implicitly access the next stack slot such as PUSH and CALL are considered to specify an offset of—(word size) from the stack pointer.

Argument for Theorem 1: Taking Lemma 1.1 and Lemma 1.2 together, the lowest stack address that can be computed is the lowest address in the lower guard band. Any access to this address will result in a page fault. The highest stack address that can be computed is the address of the topmost byte in the upper guard band. Any access to this address will result in a page fault, even if the access is larger than a byte and regardless of any mapping above the upper guard band.

An alternative to the approach described above is to allow the program to invoke a runtime-provided component to safely access a runtime-managed stack, but that would impose substantial overhead.

Hybrid Capability Models

Authenticating or encrypting capabilities simplifies the task of revoking capabilities, as described above. However, tagged memory capabilities such as CHERI (See chericpu.org) offer advantages such as deterministic protection (i.e. no potential for an adversary to guess a MAC or ciphertext that permits forgery of a capability). The two types of models can be hybridized in a straightforward fashion to obtain the best of both worlds, although such hybridization may provide minimal benefit if MACs or ciphertexts are made sufficiently long. Of course, large MACs/ciphertexts may impose significant memory footprint overhead for many usages.

Further Examples

Example 1 provides an exemplary system including a memory and a trusted execution environment (TEE), the TEE to configure a plurality of compartments in an address space of the memory, each compartment including a private memory and a pointer to a message block in a shared heap, receive a request to send a message from a first compartment, the request including the pointer to the message block and a destination compartment, respond to the request by authenticating the request, generating a corresponding encoded capability, conveying the encoded capability to the destination compartment, and scheduling the destination compartment to respond to the request; and subsequently, receive and respond to a check capability request from the destination compartment by checking the encoded capability and, when the check passes, providing a memory address to access the message block, and, otherwise, generating a fault, wherein each compartment is isolated from other compartments, is unable to access private memory regions of other compartments, and is unable to access any message objects in the shared heap that are assigned to other compartments.

Example 2 includes the substance of the exemplary system of Example 1, wherein bounds of the private memory regions and of the shared heap are stored in a base and mask pair of registers.

Example 3 includes the substance of the exemplary system of Example 1, wherein the TEE is further to authenticate the message received from the first compartment by assuring that the pointer to the message block is bounded within a heap address range assigned to the first compartment.

Example 4 includes the substance of the exemplary system of Example 1, wherein the TEE is further to check that the message block is disposed at a heap location bounded within a heap address range assigned to the destination compartment.

Example 5 includes the substance of the exemplary system of Example 1, further including a second memory and a second TEE communicatively coupled to the TEE, the second TEE to configure a second plurality of compartments in a second address space of the second memory, the second TEE further re receive and respond to a second request to send a message block from one of the second plurality of compartments to one of the plurality of compartments, the second TEE further to authenticate the second request, generate a corresponding second encoded capability, and cause the second encoded capability to be conveyed to the destination compartment through the TEE.

Example 6 includes the substance of the exemplary system of Example 1, wherein the TEE uses an Advanced Encryption Standard cipher when generating the corresponding encoded capability.

Example 7 includes the substance of the exemplary system of Example 1, wherein the conveyed encoded capability includes a message authentication code (MAC), and wherein the TEE, when responding to the check capability request, regenerates the MAC and compares the conveyed MAC to the regenerated MAC.

Example 8 provides an exemplary method performed by a trusted execution environment (TEE), the method including: configuring a plurality of compartments in an address space of a memory, each compartment including a private memory and a pointer to a message block in a shared heap, receiving a request to send a message from a first compartment, the request including the pointer to the message block and a destination compartment specifier, responding to the request by authenticating the request, generating a corresponding encoded capability, conveying the encoded capability to the destination compartment, and scheduling the destination compartment to respond to the request; and subsequently, receiving and responding to a check capability request from the destination compartment by checking the encoded capability and, when the check passes, providing a memory address to access the message block, and, otherwise, generating a fault, wherein each compartment is isolated from other compartments, is unable to access private memory regions of other compartments, and is unable to access any message objects in the shared heap that are assigned to other compartments.

Example 9 includes the substance of the exemplary method of Example 8, wherein bounds of the private memory regions and of the shared heap are stored in a base and mask pair of registers.

Example 10 includes the substance of the exemplary method of Example 8, further including the TEE authenticating the message received from the first compartment by assuring that the pointer to the message block is bounded within a heap address range assigned to the first compartment.

Example 11 includes the substance of the exemplary method of Example 8, wherein the TEE is further to check that the message block is disposed at a heap location bounded within a heap address range assigned to the destination compartment.

Example 12 includes the substance of the exemplary method of Example 8, further including a second memory and a second TEE communicatively coupled to the TEE, the second TEE to configure a second plurality of compartments in a second address space of the second memory, the second TEE further re receive and respond to a second request to send a message block from one of the second plurality of compartments to one of the plurality of compartments, the second TEE further to authenticate the second request, generate a corresponding second encoded capability, and cause the second encoded capability to be conveyed to the destination compartment through the TEE.

Example 13 includes the substance of the exemplary method of Example 8, wherein the TEE uses an Advanced Encryption Standard cipher when generating the corresponding encoded capability.

Example 14 includes the substance of the exemplary method of Example 8, wherein the conveyed encoded capability includes a message authentication code (MAC), and wherein the TEE, when responding to the check capability request, regenerates the MAC and compares the conveyed MAC to the regenerated MAC.

Example 15 provides an exemplary non-transitory computer-readable medium containing instructions that, when executed by execution circuitry including a trusted execution environment (TEE), cause the TEE to respond by: configuring a plurality of compartments in an address space of a memory, each compartment including a private memory and a pointer to a message block in a shared heap, receiving a request to send a message from a first compartment, the request including the pointer to the message block and a destination compartment specifier, responding to the request by authenticating the request, generating a corresponding encoded capability, conveying the encoded capability to the destination compartment, and scheduling the destination compartment to respond to the request; and subsequently, receiving and responding to a check capability request from the destination compartment by checking the encoded capability and, when the check passes, providing a memory address to access the message block, and, otherwise, generating a fault, wherein each compartment is isolated from other compartments, is unable to access private memory regions of other compartments, and is unable to access any message objects in the shared heap that are assigned to other compartments.

Example 16 includes the substance of the exemplary non-transitory computer-readable medium of Example 15, wherein bounds of the private memory regions and of the shared heap are stored in a base and mask pair of registers.

Example 17 includes the substance of the exemplary non-transitory computer-readable medium of Example 15, further including the TEE authenticating the message received from the first compartment by assuring that the pointer to the message block is bounded within a heap address range assigned to the first compartment.

Example 18 includes the substance of the exemplary non-transitory computer-readable medium of Example 15, wherein the TEE is further to check that the message block is disposed at a heap location bounded within a heap address range assigned to the destination compartment.

Example 19 includes the substance of the exemplary non-transitory computer-readable medium of Example 15, further including a second memory and a second TEE communicatively coupled to the TEE, the second TEE to configure a second plurality of compartments in a second address space of the second memory, the second TEE further re receive and respond to a second request to send a message block from one of the second plurality of compartments to one of the plurality of compartments, the second TEE further to authenticate the second request, generate a corresponding second encoded capability, and cause the second encoded capability to be conveyed to the destination compartment through the TEE.

Example 20 includes the substance of the exemplary non-transitory computer-readable medium of claim 15, wherein the conveyed encoded capability includes a message authentication code (MAC), and wherein the TEE, when responding to the check capability request, regenerates the MAC and compares the conveyed MAC to the regenerated MAC Instruction Sets An instruction set may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. A set of SIMD extensions referred to as the Advanced Vector Extensions (AVX) (AVX1 and AVX2) and using the Vector Extensions (VEX) coding scheme has been released and/or published (e.g., see Intel® 64 and IA-32 Architectures Software Developer's Manual, September 2014; and see Intel® Advanced Vector Extensions Programming Reference, October 2014).

Exemplary Instruction Formats

Embodiments of the instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

Generic Vector Friendly Instruction Format

A vector friendly instruction format is an instruction format that is suited for vector instructions (e.g., there are certain fields specific to vector operations). While embodiments are described in which both vector and scalar operations are supported through the vector friendly instruction format, alternative embodiments use only vector operations the vector friendly instruction format.

Figure 14A:
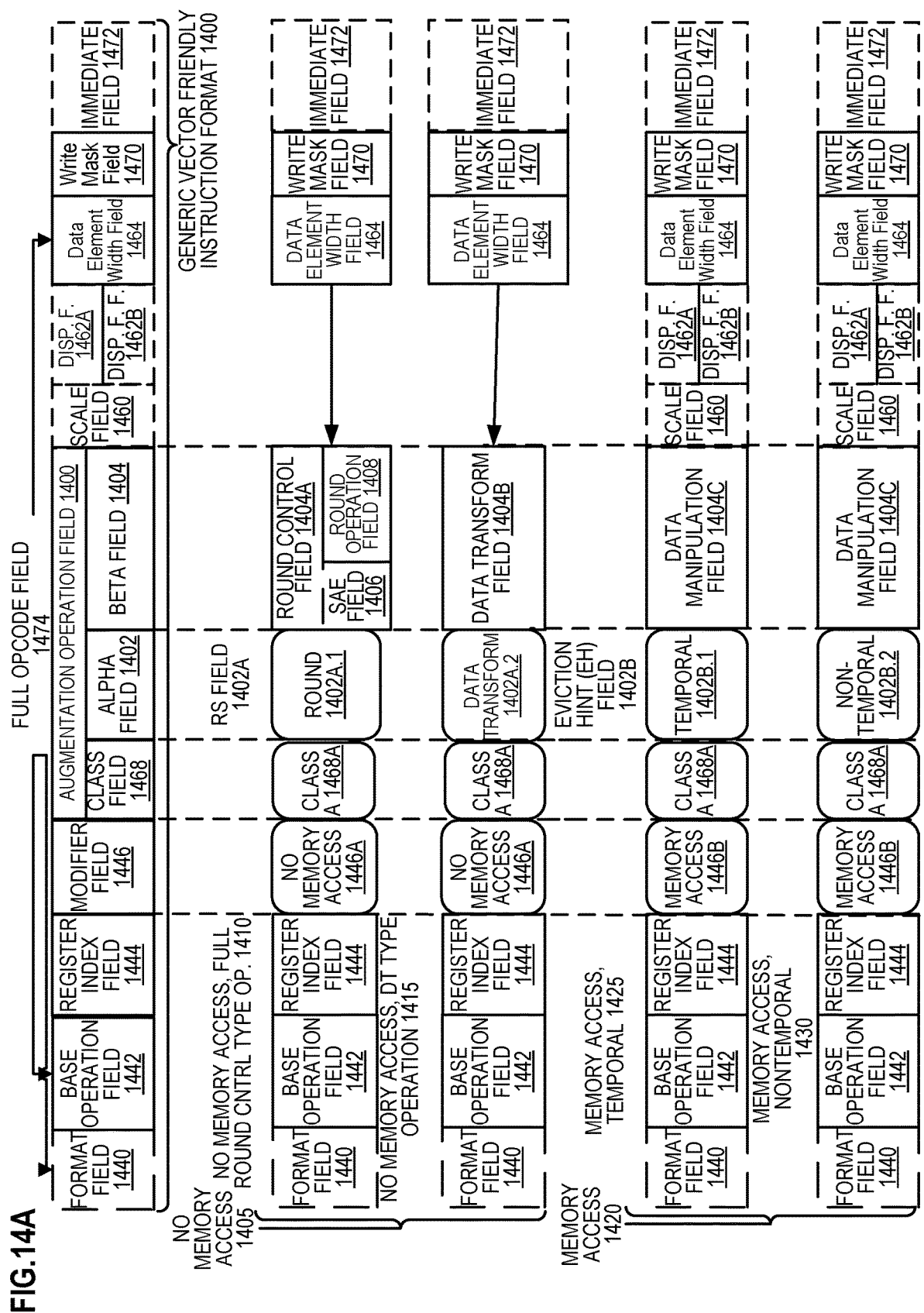
FIGS. 14A-14B are block diagrams illustrating a generic vector friendly instruction format and instruction templates thereof according to some embodiments.
Figure 14B:
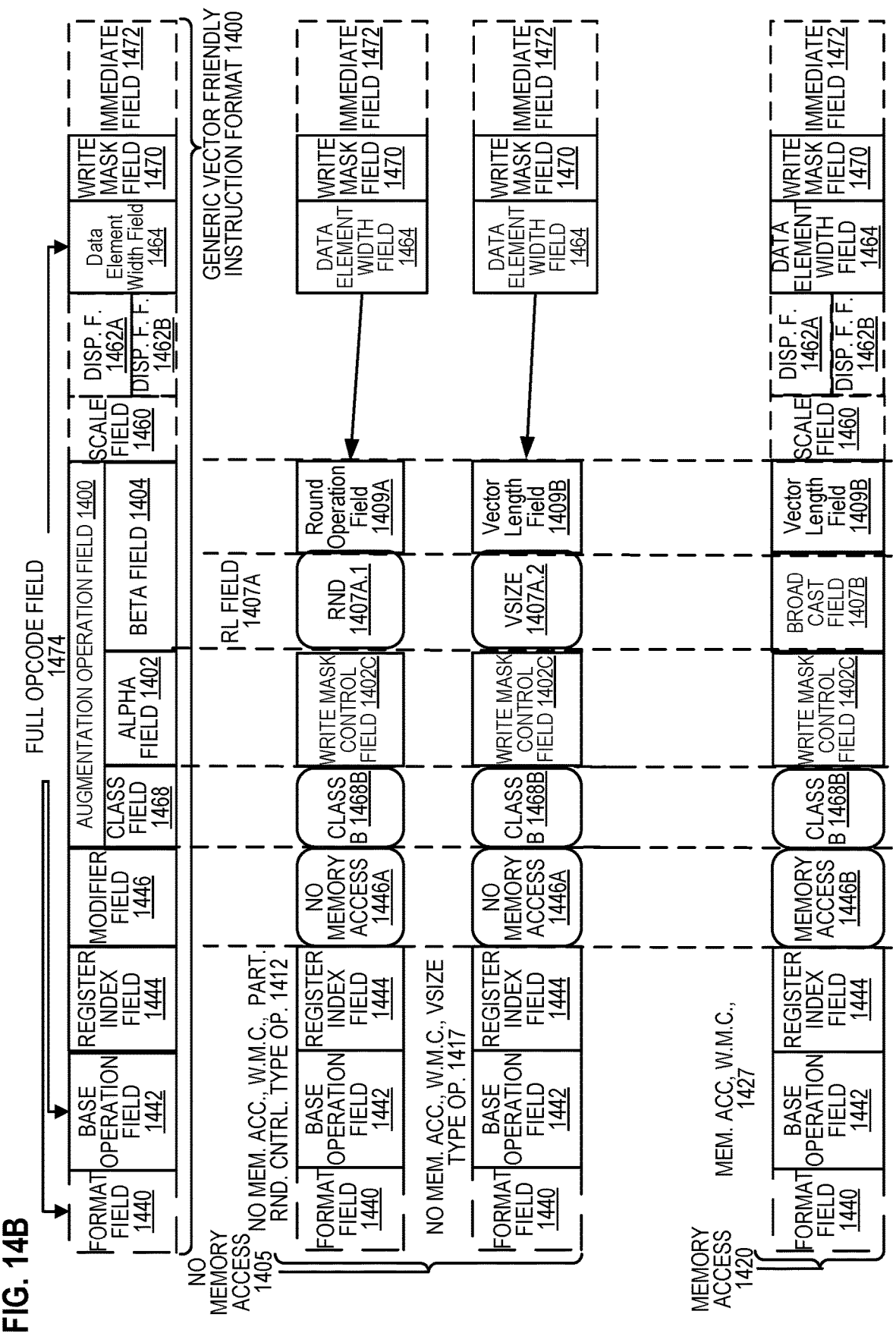

FIGS. 14A-14B are block diagrams illustrating a generic vector friendly instruction format and instruction templates thereof according to some embodiments. FIG. 14A is a block diagram illustrating a generic vector friendly instruction format and class A instruction templates thereof according to some embodiments; while FIG. 14B is a block diagram illustrating the generic vector friendly instruction format and class B instruction templates thereof according to some embodiments. Specifically, a generic vector friendly instruction format 1400 for which are defined class A and class B instruction templates, both of which include no memory access 1405 instruction templates and memory access 1420 instruction templates. The term generic in the context of the vector friendly instruction format refers to the instruction format not being tied to any specific instruction set.

While embodiments will be described in which the vector friendly instruction format supports the following: a 64 byte vector operand length (or size) with 32 bit (4 byte) or 64 bit (8 byte) data element widths (or sizes) (and thus, a 64 byte vector consists of either 16 doubleword-size elements or alternatively, 8 quadword-size elements); a 64 byte vector operand length (or size) with 16 bit (2 byte) or 8 bit (1 byte) data element widths (or sizes); a 32 byte vector operand length (or size) with 32 bit (4 byte), 64 bit (8 byte), 16 bit (2 byte), or 8 bit (1 byte) data element widths (or sizes); and a 16 byte vector operand length (or size) with 32 bit (4 byte), 64 bit (8 byte), 16 bit (2 byte), or 8 bit (1 byte) data element widths (or sizes); alternative embodiments may support more, less and/or different vector operand sizes (e.g., 256 byte vector operands) with more, less, or different data element widths (e.g., 128 bit (16 byte) data element widths).

The class A instruction templates in FIG. 14A include: 1) within the no memory access 1405 instruction templates there is shown a no memory access, full round control type operation 1410 instruction template and a no memory access, data transform type operation 1415 instruction template; and 2) within the memory access 1420 instruction templates there is shown a memory access, temporal 1425 instruction template and a memory access, non-temporal 1430 instruction template. The class B instruction templates in FIG. 14B include: 1) within the no memory access 1405 instruction templates there is shown a no memory access, write mask control, partial round control type operation 1412 instruction template and a no memory access, write mask control, vsize type operation 1417 instruction template; and 2) within the memory access 1420 instruction templates there is shown a memory access, write mask control 1427 instruction template.

The generic vector friendly instruction format 1400 includes the following fields listed below in the order illustrated in FIGS. 14A-14B.

Format field 1440—a specific value (an instruction format identifier value) in this field uniquely identifies the vector friendly instruction format, and thus occurrences of instructions in the vector friendly instruction format in instruction streams. As such, this field is optional in the sense that it is not needed for an instruction set that has only the generic vector friendly instruction format.

Base operation field 1442—its content distinguishes different base operations.

Register index field 1444—its content, directly or through address generation, specifies the locations of the source and destination operands, be they in registers or in memory. These include a sufficient number of bits to select N registers from a P×Q (e.g. 32×512, 16×128, 32×1024, 64×1024) register file. While in one embodiment N may be up to three sources and one destination register, alternative embodiments may support more or less sources and destination registers (e.g., may support up to two sources where one of these sources also acts as the destination, may support up to three sources where one of these sources also acts as the destination, may support up to two sources and one destination).

Modifier field 1446—its content distinguishes occurrences of instructions in the generic vector instruction format that specify memory access from those that do not; that is, between no memory access 1405 instruction templates and memory access 1420 instruction templates. Memory access operations read and/or write to the memory hierarchy (in some cases specifying the source and/or destination addresses using values in registers), while non-memory access operations do not (e.g., the source and destinations are registers). While in one embodiment this field also selects between three different ways to perform memory address calculations, alternative embodiments may support more, less, or different ways to perform memory address calculations.

Augmentation operation field 1450—its content distinguishes which one of a variety of different operations to be performed in addition to the base operation. This field is context specific. In some embodiments, this field is divided into a class field 1468, an alpha field 1452, and a beta field 1454. The augmentation operation field 1450 allows common groups of operations to be performed in a single instruction rather than 2, 3, or 4 instructions.

Scale field 1460—its content allows for the scaling of the index field's content for memory address generation (e.g., for address generation that uses $2^{scale}$*index+base).

Displacement Field 1462A—its content is used as part of memory address generation (e.g., for address generation that uses $2^{scale}$*index+base+displacement).

Displacement Factor Field 1462B (note that the juxtaposition of displacement field 1462A directly over displacement factor field 1462B indicates one or the other is used)—its content is used as part of address generation; it specifies a displacement factor that is to be scaled by the size of a memory access (N)—where N is the number of bytes in the memory access (e.g., for address generation that uses $2^{scale}$*index+base+scaled displacement). Redundant low-order bits are ignored and hence, the displacement factor field's content is multiplied by the memory operands total size (N) in order to generate the final displacement to be used in calculating an effective address. The value of N is determined by the processor hardware at runtime based on the full opcode field 1474 (described later herein) and the data manipulation field 1454C. The displacement field 1462A and the displacement factor field 1462B are optional in the sense that they are not used for the no memory access 1405 instruction templates and/or different embodiments may implement only one or none of the two.

Data element width field 1464—its content distinguishes which one of a number of data element widths is to be used (in some embodiments for all instructions; in other embodiments for only some of the instructions). This field is optional in the sense that it is not needed if only one data element width is supported and/or data element widths are supported using some aspect of the opcodes.

Write mask field 1470—its content controls, on a per data element position basis, whether that data element position in the destination vector operand reflects the result of the base operation and augmentation operation. Class A instruction templates support merging-writemasking, while class B instruction templates support both merging- and zeroing-writemasking. When merging, vector masks allow any set of elements in the destination to be protected from updates during the execution of any operation (specified by the base operation and the augmentation operation); in other one embodiment, preserving the old value of each element of the destination where the corresponding mask bit has a 0. In contrast, when zeroing vector masks allow any set of elements in the destination to be zeroed during the execution of any operation (specified by the base operation and the augmentation operation); in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the write mask field 1470 allows for partial vector operations, including loads, stores, arithmetic, logical, etc. While embodiments are described in which the write mask field's 1470 content selects one of a number of write mask registers that contains the write mask to be used (and thus the write mask field's 1470 content indirectly identifies that masking to be performed), alternative embodiments instead or additional allow the mask write field's 1470 content to directly specify the masking to be performed.

Immediate field 1472—its content allows for the specification of an immediate. This field is optional in the sense that is it not present in an implementation of the generic vector friendly format that does not support immediate and it is not present in instructions that do not use an immediate.

Class field 1468—its content distinguishes between different classes of instructions. With reference to FIGS. 14A-B, the contents of this field select between class A and class B instructions. In FIGS. 14A-B, rounded corner squares are used to indicate a specific value is present in a field (e.g., class A 1468A and class B 1468B for the class field 1468 respectively in FIGS. 14A-B).

Instruction Templates of Class A

In the case of the non-memory access 1405 instruction templates of class A, the alpha field 1452 is interpreted as an RS field 1452A, whose content distinguishes which one of the different augmentation operation types are to be performed (e.g., round 1452A.1 and data transform 1452A.2 are respectively specified for the no memory access, round type operation 1410 and the no memory access, data transform type operation 1415 instruction templates), while the beta field 1454 distinguishes which of the operations of the specified type is to be performed. In the no memory access 1405 instruction templates, the scale field 1460, the displacement field 1462A, and the displacement scale filed 1462B are not present.

No-Memory Access Instruction Templates—Full Round Control Type Operation

In the no memory access full round control type operation 1410 instruction template, the beta field 1454 is interpreted as a round control field 1454A, whose content(s) provide static rounding. While in the described embodiments the round control field 1454A includes a suppress all floating point exceptions (SAE) field 1456 and a round operation control field 1458, alternative embodiments may encode both these concepts into the same field or only have one or the other of these concepts/fields (e.g., may have only the round operation control field 1458).

SAE field 1456—its content distinguishes whether or not to disable the exception event reporting; when the SAE field's 1456 content indicates suppression is enabled, a given instruction does not report any kind of floating-point exception flag and does not raise any floating-point exception handler.

Round operation control field 1458—its content distinguishes which one of a group of rounding operations to perform (e.g., Round-up, Round-down, Round-towards-zero and Round-to-nearest). Thus, the round operation control field 1458 allows for the changing of the rounding mode on a per instruction basis. In some embodiments where a processor includes a control register for specifying rounding modes, the round operation control field's 1450 content overrides that register value.

No Memory Access Instruction Templates—Data Transform Type Operation

In the no memory access data transform type operation 1415 instruction template, the beta field 1454 is interpreted as a data transform field 1454B, whose content distinguishes which one of a number of data transforms is to be performed (e.g., no data transform, swizzle, broadcast).

In the case of a memory access 1420 instruction template of class A, the alpha field 1452 is interpreted as an eviction hint field 1452B, whose content distinguishes which one of the eviction hints is to be used (in FIG. 14A, temporal 1452B.1 and non-temporal 1452B.2 are respectively specified for the memory access, temporal 1425 instruction template and the memory access, non-temporal 1430 instruction template), while the beta field 1454 is interpreted as a data manipulation field 1454C, whose content distinguishes which one of a number of data manipulation operations (also known as primitives) is to be performed (e.g., no manipulation; broadcast; up conversion of a source; and down conversion of a destination). The memory access 1420 instruction templates include the scale field 1460, and optionally the displacement field 1462A or the displacement scale field 1462B.

Vector memory instructions perform vector loads from and vector stores to memory, with conversion support. As with regular vector instructions, vector memory instructions transfer data from/to memory in a data element-wise fashion, with the elements that are actually transferred is dictated by the contents of the vector mask that is selected as the write mask.

Memory Access Instruction Templates—Temporal

Temporal data is data likely to be reused soon enough to benefit from caching. This is, however, a hint, and different processors may implement it in different ways, including ignoring the hint entirely.

Memory Access Instruction Templates—Non-Temporal

Non-temporal data is data unlikely to be reused soon enough to benefit from caching in the 1st-level cache and should be given priority for eviction. This is, however, a hint, and different processors may implement it in different ways, including ignoring the hint entirely.

Instruction Templates of Class B

In the case of the instruction templates of class B, the alpha field 1452 is interpreted as a write mask control (Z) field 1452C, whose content distinguishes whether the write masking controlled by the write mask field 1470 should be a merging or a zeroing.

In the case of the non-memory access 1405 instruction templates of class B, part of the beta field 1454 is interpreted as an RL field 1457A, whose content distinguishes which one of the different augmentation operation types are to be performed (e.g., round 1457A.1 and vector length (VSIZE) 1457A.2 are respectively specified for the no memory access, write mask control, partial round control type operation 1412 instruction template and the no memory access, write mask control, VSIZE type operation 1417 instruction template), while the rest of the beta field 1454 distinguishes which of the operations of the specified type is to be performed. In the no memory access 1405 instruction templates, the scale field 1460, the displacement field 1462A, and the displacement scale filed 1462B are not present.

In the no memory access, write mask control, partial round control type operation 1410 instruction template, the rest of the beta field 1454 is interpreted as a round operation field 1459A and exception event reporting is disabled (a given instruction does not report any kind of floating-point exception flag and does not raise any floating-point exception handler).

Round operation control field 1459A—just as round operation control field 1458, its content distinguishes which one of a group of rounding operations to perform (e.g., Round-up, Round-down, Round-towards-zero and Round-to-nearest). Thus, the round operation control field 1459A allows for the changing of the rounding mode on a per instruction basis. In some embodiments where a processor includes a control register for specifying rounding modes, the round operation control field's 1450 content overrides that register value.

In the no memory access, write mask control, VSIZE type operation 1417 instruction template, the rest of the beta field 1454 is interpreted as a vector length field 1459B, whose content distinguishes which one of a number of data vector lengths is to be performed on (e.g., 128, 256, or 512 byte).

In the case of a memory access 1420 instruction template of class B, part of the beta field 1454 is interpreted as a broadcast field 1457B, whose content distinguishes whether or not the broadcast type data manipulation operation is to be performed, while the rest of the beta field 1454 is interpreted the vector length field 1459B. The memory access 1420 instruction templates include the scale field 1460, and optionally the displacement field 1462A or the displacement scale field 1462B.

With regard to the generic vector friendly instruction format 1400, a full opcode field 1474 is shown including the format field 1440, the base operation field 1442, and the data element width field 1464. While one embodiment is shown where the full opcode field 1474 includes all of these fields, the full opcode field 1474 includes less than all of these fields in embodiments that do not support all of them. The full opcode field 1474 provides the operation code (opcode).

The augmentation operation field 1450, the data element width field 1464, and the write mask field 1470 allow these features to be specified on a per instruction basis in the generic vector friendly instruction format.

The combination of write mask field and data element width field create typed instructions in that they allow the mask to be applied based on different data element widths.

The various instruction templates found within class A and class B are beneficial in different situations. In some embodiments, different processors or different cores within a processor support only class A, only class B, or both classes. For instance, a high performance general purpose out-of-order core intended for general-purpose computing may support only class B, a core intended primarily for graphics and/or scientific (throughput) computing may support only class A, and a core intended for both may support both (of course, a core that has some mix of templates and instructions from both classes but not all templates and instructions from both classes is within the purview of disclosed embodiments). Also, a single processor may include multiple cores, all of which support the same class or in which different cores support different class. For instance, in a processor with separate graphics and general-purpose cores, one of the graphics cores intended primarily for graphics and/or scientific computing may support only class A, while one or more of the general purpose cores may be high performance general purpose cores with out of order execution and register renaming intended for general-purpose computing that support only class B. Another processor that does not have a separate graphics core, may include one more general purpose in-order or out-of-order cores that support both class A and class B. Of course, features from one class may also be implement in the other class in different embodiments. Programs written in a high level language would be put (e.g., just in time compiled or statically compiled) into an variety of different executable forms, including: 1) a form having only instructions of the class(es) supported by the target processor for execution; or 2) a form having alternative routines written using different combinations of the instructions of all classes and having control flow code that selects the routines to execute based on the instructions supported by the processor which is currently executing the code.

Exemplary Specific Vector Friendly Instruction Format

FIG. 15A is a block diagram illustrating an exemplary specific vector friendly instruction format according to some embodiments. FIG. 15A shows a specific vector friendly instruction format 1500 that is specific in the sense that it specifies the location, size, interpretation, and order of the fields, as well as values for some of those fields. The specific vector friendly instruction format 1500 may be used to extend the x86 instruction set, and thus some of the fields are similar or the same as those used in the existing x86 instruction set and extension thereof (e.g., AVX). This format remains consistent with the prefix encoding field, real opcode byte field, MOD R/M field, SIB field, displacement field, and immediate fields of the existing x86 instruction set with extensions. The fields from FIG. 14 into which the fields from FIG. 15A map are illustrated.

It should be understood that, although embodiments are described with reference to the specific vector friendly instruction format 1500 in the context of the generic vector friendly instruction format 1400 for illustrative purposes, disclosed embodiments are not limited to the specific vector friendly instruction format 1500 except where claimed. For example, the generic vector friendly instruction format 1400 contemplates a variety of possible sizes for the various fields, while the specific vector friendly instruction format 1500 is shown as having fields of specific sizes. By way of specific example, while the data element width field 1464 is illustrated as a one-bit field in the specific vector friendly instruction format 1500, disclosed embodiments are not so limited (that is, the generic vector friendly instruction format 1400 contemplates other sizes of the data element width field 1464).

The generic vector friendly instruction format 1400 includes the following fields listed below in the order illustrated in FIG. 15A.

EVEX Prefix (Bytes 0-3) 1502—is encoded in a four-byte form.

Format Field 1440 (EVEX Byte 0, bits [7:0])—the first byte (EVEX Byte 0) is the format field 1440 and it contains 0x62 (the unique value used for distinguishing the vector friendly instruction format in some embodiments).

The second-fourth bytes (EVEX Bytes 1-3) include a number of bit fields providing specific capability.

REX field 1505 (EVEX Byte 1, bits [7-5])—consists of a EVEX.R bit field (EVEX Byte 1, bit [7]-R), EVEX.X bit field (EVEX byte 1, bit [6]-X), and 1457BEX byte 1, bit [5]-B).

The EVEX.R, EVEX.X, and EVEX.B bit fields provide the same functionality as the corresponding VEX bit fields, and are encoded using is complement form, i.e. ZMM0 is encoded as 1111B, ZMM15 is encoded as 0000B. Other fields of the instructions encode the lower three bits of the register indexes as is known in the art (rrr, xxx, and bbb), so that Rrrr, Xxxx, and Bbbb may be formed by adding EVEX.R, EVEX.X, and EVEX.B.

REX' 1510A—this is the first part of the REX' field 1510 and is the EVEX.R' bit field (EVEX Byte 1, bit [4]-R') that is used to encode either the upper 16 or lower 16 of the extended 32 register set. In some embodiments, this bit, along with others as indicated below, is stored in bit inverted format to distinguish (in the well-known x86 32-bit mode) from the BOUND instruction, whose real opcode byte is 62, but does not accept in the MOD R/M field (described below) the value of 11 in the MOD field; alternative embodiments do not store this and the other indicated bits below in the inverted format. A value of 1 is used to encode the lower 16 registers. In other words, R'Rrrr is formed by combining EVEX.R', EVEX.R, and the other RRR from other fields.

Opcode map field 1515 (EVEX byte 1, bits [3:0]-mmmm)—its content encodes an implied leading opcode byte (OF, OF 38, or OF 3).

Data element width field 1464 (EVEX byte 2, bit [7]-W)—is represented by the notation EVEX.W. EVEX.W is used to define the granularity (size) of the datatype (either 32-bit data elements or 64-bit data elements).

EVEX.vvvv 1520 (EVEX Byte 2, bits [6:3]-vvvv)— the role of EVEX.vvvv may include the following: 1) EVEX.vvvv encodes the first source register operand, specified in inverted (Is complement) form and is valid for instructions with 2 or more source operands; 2) EVEX.vvvv encodes the destination register operand, specified in 1s complement form for certain vector shifts; or 3) EVEX.vvvv does not encode any operand, the field is reserved and should contain 1111b. Thus, EVEX.vvvv field 1520 encodes the 4 low-order bits of the first source register specifier stored in inverted (Is complement) form. Depending on the instruction, an extra different EVEX bit field is used to extend the specifier size to 32 registers.

EVEX.U 1468 Class field (EVEX byte 2, bit [2]-U)—If EVEX.U=0, it indicates class A or EVEX.U0; if EVEX.U=1, it indicates class B or EVEX.U1.

Prefix encoding field 1525 (EVEX byte 2, bits [1:0]-pp)—provides additional bits for the base operation field. In addition to providing support for the legacy SSE instructions in the EVEX prefix format, this also has the benefit of compacting the SIMD prefix (rather than requiring a byte to express the SIMD prefix, the EVEX prefix requires only 2 bits). In one embodiment, to support legacy SSE instructions that use a SIMD prefix (66H, F2H, F3H) in both the legacy format and in the EVEX prefix format, these legacy SIMD prefixes are encoded into the SIMD prefix encoding field; and at runtime are expanded into the legacy SIMD prefix prior to being provided to the decoder's PLA (so the PLA can execute both the legacy and EVEX format of these legacy instructions without modification). Although, in some embodiments, newer instructions use the EVEX prefix encoding field's content directly as an opcode extension, certain embodiments expand in a similar fashion for consistency but allow for different meanings to be specified by these legacy SIMD prefixes. An alternative embodiment may redesign the PLA to support the 2-bit SIMD prefix encodings, and thus not require the expansion.

Alpha field 1452 (EVEX byte 3, bit [7]-EH; also known as EVEX.EH, EVEX.rs, EVEX.RL, EVEX.write mask control, and EVEX.N; also illustrated with α)—as previously described, this field is context specific.

Beta field 1454 (EVEX byte 3, bits [6:4]-SSS, also known as EVEX.$s_{2-0}$, EVEX.$r_{2-0}$, EVEX.rr1, EVEX.LL0, EVEX.LLB; also illustrated with βββ)—as previously described, this field is context specific.

REX' 1510B—this is the remainder of the REX' field 1510 and is the EVEX.V' bit field (EVEX Byte 3, bit [3]—V') that may be used to encode either the upper 16 or lower 16 of the extended 32 register set. This bit is stored in bit inverted format. A value of 1 is used to encode the lower 16 registers. In other words, V'VVVV is formed by combining EVEX.V', EVEX.vvvv.

Write mask field 1470 (EVEX byte 3, bits [2:0]-kkk)—its content specifies the index of a register in the write mask registers as previously described. In some embodiments, the specific value EVEX.kkk=000 has a special behavior implying no write mask is used for the particular instruction (this may be implemented in a variety of ways including the use of a write mask hardwired to all ones or hardware that bypasses the masking hardware).

Real Opcode Field 1530 (Byte 4) is also known as the opcode byte. Part of the opcode is specified in this field.

MOD R/M Field 1540 (Byte 5) includes MOD field 1542, Reg field 1544, and R/M field 1546. As previously described, the MOD field's 1542 content distinguishes between memory access and non-memory access operations. The role of Reg field 1544 can be summarized to two situations: encoding either the destination register operand or a source register operand or be treated as an opcode extension and not used to encode any instruction operand. The role of R/M field 1546 may include the following: encoding the instruction operand that references a memory address or encoding either the destination register operand or a source register operand.

Scale, Index, Base (SIB) Byte (Byte 6)—As previously described, the scale field's 1450 content is used for memory address generation. SIB.xxx 1554 and SIB.bbb 1556—the contents of these fields have been previously referred to with regard to the register indexes Xxxx and Bbbb.

Displacement field 1462A (Bytes 7-10)—when MOD field 1542 contains 10, bytes 7-10 are the displacement field 1462A, and it works the same as the legacy 32-bit displacement (disp32) and works at byte granularity.

Displacement factor field 1462B (Byte 7)—when MOD field 1542 contains 01, byte 7 is the displacement factor field 1462B. The location of this field is that same as that of the legacy x86 instruction set 8-bit displacement (disp8), which works at byte granularity. Since disp8 is sign extended, it can only address between −128 and 127 bytes offsets; in terms of 64-byte cache lines, disp8 uses 8 bits that can be set to only four really useful values −128, −64, 0, and 64; since a greater range is often needed, disp32 is used; however, disp32 requires 4 bytes. In contrast to disp8 and disp32, the displacement factor field 1462B is a reinterpretation of disp8; when using displacement factor field 1462B, the actual displacement is determined by the content of the displacement factor field multiplied by the size of the memory operand access (N). This type of displacement is referred to as disp8*N. This reduces the average instruction length (a single byte of used for the displacement but with a much greater range). Such compressed displacement is based on the assumption that the effective displacement is multiple of the granularity of the memory access, and hence, the redundant low-order bits of the address offset do not need to be encoded. In other words, the displacement factor field 1462B substitutes the legacy x86 instruction set 8-bit displacement. Thus, the displacement factor field 1462B is encoded the same way as an x86 instruction set 8-bit displacement (so no changes in the ModRM/SIB encoding rules) with the only exception that disp8 is overloaded to disp8*N. In other words, there are no changes in the encoding rules or encoding lengths but only in the interpretation of the displacement value by hardware (which needs to scale the displacement by the size of the memory operand to obtain a byte-wise address offset). Immediate field 1472 operates as previously described.

Full Opcode Field

FIG. 15B is a block diagram illustrating the fields of the specific vector friendly instruction format 1500 that make up the full opcode field 1474 according to some embodiments. Specifically, the full opcode field 1474 includes the format field 1440, the base operation field 1442, and the data element width (W) field 1464. The base operation field 1442 includes the prefix encoding field 1525, the opcode map field 1515, and the real opcode field 1530.

Register Index Field

FIG. 15C is a block diagram illustrating the fields of the specific vector friendly instruction format 1500 that make up the register index field 1444 according to some embodiments. Specifically, the register index field 1444 includes the REX field 1505, the REX' field 1510, the MODR/M.reg field 1544, the MODR/M.r/m field 1546, the VVVV field 1520, xxx field 1554, and the bbb field 1556.

Augmentation Operation Field

Figure 15D:
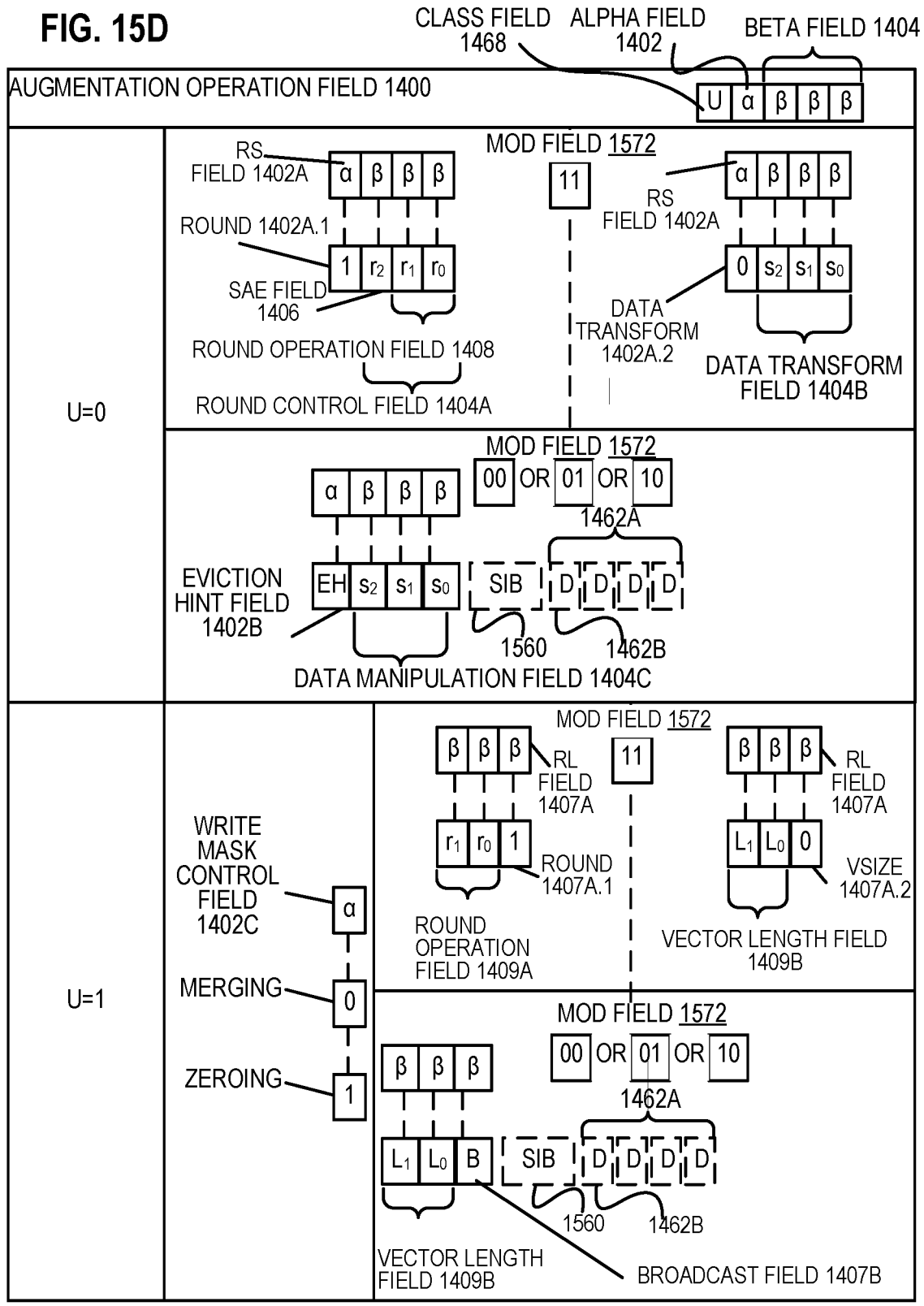
FIG. 15D is a block diagram illustrating the fields of the specific vector friendly instruction format that make up the augmentation operation field according to one embodiment.

FIG. 15D is a block diagram illustrating the fields of the specific vector friendly instruction format 1500 that make up the augmentation operation field 1450 according to some embodiments. When the class (U) field 1468 contains 0, it signifies EVEX.U0 (class A 1468A); when it contains 1, it signifies EVEX.U1 (class B 1468B). When U=0 and the MOD field 1542 contains 11 (signifying a no memory access operation), the alpha field 1452 (EVEX byte 3, bit [7]-EH) is interpreted as the rs field 1452A. When the rs field 1452A contains a 1 (round 1452A.1), the beta field 1454 (EVEX byte 3, bits [6:4]-SSS) is interpreted as the round control field 1454A. The round control field 1454A includes a one bit SAE field 1456 and a two bit round operation field 1458. When the rs field 1452A contains a 0 (data transform 1452A.2), the beta field 1454 (EVEX byte 3, bits [6:4]-SSS) is interpreted as a three bit data transform field 1454B. When U=0 and the MOD field 1542 contains 00, 01, or 10 (signifying a memory access operation), the alpha field 1452 (EVEX byte 3, bit [7]-EH) is interpreted as the eviction hint (EH) field 1452B and the beta field 1454 (EVEX byte 3, bits [6:4]-SSS) is interpreted as a three bit data manipulation field 1454C.

When U=1, the alpha field 1452 (EVEX byte 3, bit [7]-EH) is interpreted as the write mask control (Z) field 1452C. When U=1 and the MOD field 1542 contains 11 (signifying a no memory access operation), part of the beta field 1454 (EVEX byte 3, bit [4]-$S_0$) is interpreted as the RL field 1457A; when it contains a 1 (round 1457A.1) the rest of the beta field 1454 (EVEX byte 3, bit [6-5]-$S_{2-1}$) is interpreted as the round operation field 1459A, while when the RL field 1457A contains a 0 (VSIZE 1457.A2) the rest of the beta field 1454 (EVEX byte 3, bit [6-5]—$S_{2-1}$) is interpreted as the vector length field 1459B (EVEX byte 3, bit [6-5]-$L_{1-0}$). When U=1 and the MOD field 1542 contains 00, 01, or 10 (signifying a memory access operation), the beta field 1454 (EVEX byte 3, bits [6:4]-SSS) is interpreted as the vector length field 1459B (EVEX byte 3, bit [6-5]-$L_{1-0}$) and the broadcast field 1457B (EVEX byte 3, bit [4]-B).

Exemplary Register Architecture

Figure 16:
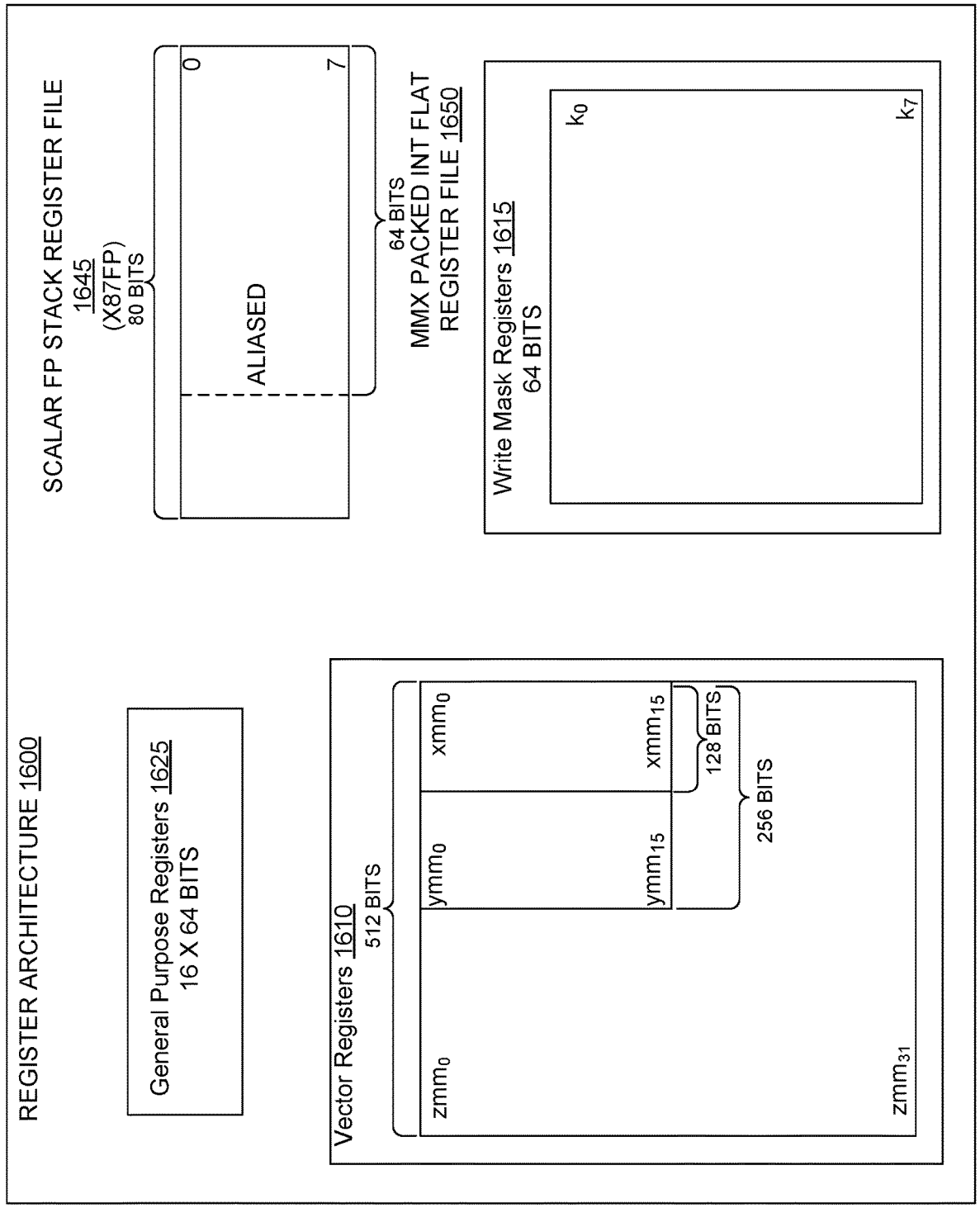
FIG. 16 is a block diagram of a register architecture according to one embodiment.

FIG. 16 is a block diagram of a register architecture 1600 according to some embodiments. In the embodiment illustrated, there are 32 vector registers 1610 that are 512 bits wide; these registers are referenced as zmm0 through zmm31. The lower order 256 bits of the lower 16 zmm registers are overlaid on registers ymm0-16. The lower order 128 bits of the lower 16 zmm registers (the lower order 128 bits of the ymm registers) are overlaid on registers xmm0-15. The specific vector friendly instruction format 1500 operates on these overlaid register file as illustrated in the below tables.

| Adjustable Vector Length | Class | Operations | Registers |
|---|---|---|---|
| Instruction Templates that do not include the vector length field 1459B | A (FIG. 14A; U = 0) B (FIG. 14B; U = 1) | 1410, 1415, 1425, 1430 1412 | zmm registers (the vector length is 64 byte) zmm registers (the vector length is 64 byte) |
| Instruction templates that do include the vector length field 1459B | B (FIG. 14B; U = 1) | 1417, 1427 | zmm, ymm, or xmm registers (the vector length is 64 byte, 32 byte, or 16 byte) depending on the vector length field 1459B |

In other words, the vector length field 1459B selects between a maximum length and one or more other shorter lengths, where each such shorter length is half the length of the preceding length; and instructions templates without the vector length field 1459B operate on the maximum vector length. Further, in one embodiment, the class B instruction templates of the specific vector friendly instruction format 1500 operate on packed or scalar single/double-precision floating point data and packed or scalar integer data. Scalar operations are operations performed on the lowest order data element position in an zmm/ymm/xmm register; the higher order data element positions are either left the same as they were prior to the instruction or zeroed depending on the embodiment.

Write mask registers 1615—in the embodiment illustrated, there are 8 write mask registers (k0 through k7), each 64 bits in size. In an alternate embodiment, the write mask registers 1615 are 16 bits in size. As previously described, in some embodiments, the vector mask register k0 cannot be used as a write mask; when the encoding that would normally indicate k0 is used for a write mask, it selects a hardwired write mask of 0xffff, effectively disabling write masking for that instruction.

General-purpose registers 1625—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 1645, on which is aliased the MMX packed integer flat register file 1650—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments may use wider or narrower registers. Additionally, alternative embodiments may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

FIG. 17A is a block diagram illustrating both an exemplary in-order pipeline and an exemplary register renaming, out-of-order issue/execution pipeline according to some embodiments. FIG. 17B is a block diagram illustrating both an exemplary embodiment of an in-order architecture core and an exemplary register renaming, out-of-order issue/execution architecture core to be included in a processor according to some embodiments. The solid lined boxes in FIGS. 17A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 17A, a processor pipeline 1700 includes a fetch stage 1702, a length decode stage 1704, a decode stage 1706, an allocation stage 1708, a renaming stage 1710, a scheduling (also known as a dispatch or issue) stage 1712, a register read/memory read stage 1714, an execute stage 1716, a write back/memory write stage 1718, an exception handling stage 1722, and a commit stage 1724.

FIG. 17B shows processor core 1790 including a front end unit 1730 coupled to an execution environment unit 1750, and both are coupled to a memory unit 1770. The core 1790 may be a reduced instruction set computing (RISC) core, a complex instruction set computing (CISC) core, a very long instruction word (VLIW) core, or a hybrid or alternative core type. As yet another option, the core 1790 may be a special-purpose core, such as, for example, a network or communication core, compression engine, coprocessor core, general purpose computing graphics processing unit (GPGPU) core, graphics core, or the like.

The front end unit 1730 includes a branch prediction unit 1732 coupled to an instruction cache unit 1734, which is coupled to an instruction translation lookaside buffer (TLB) 1736, which is coupled to an instruction fetch unit 1738, which is coupled to a decode unit 1740. The decode unit 1740 (or decoder) may decode instructions, and generate as an output one or more micro-operations, micro-code entry points, microinstructions, other instructions, or other control signals, which are decoded from, or which otherwise reflect, or are derived from, the original instructions. The decode unit 1740 may be implemented using various different mechanisms. Examples of suitable mechanisms include, but are not limited to, look-up tables, hardware implementations, programmable logic arrays (PLAs), microcode read only memories (ROMs), etc. In one embodiment, the core 1790 includes a microcode ROM or other medium that stores microcode for certain macroinstructions (e.g., in decode unit 1740 or otherwise within the front end unit 1730). The decode unit 1740 is coupled to a rename/allocator unit 1752 in the execution environment unit 1750.

The execution environment unit 1750 includes the rename/allocator unit 1752 coupled to a retirement unit 1754 and a set of one or more scheduler unit(s) 1756. The scheduler unit(s) 1756 represents any number of different schedulers, including reservations stations, central instruction window, etc. The scheduler unit(s) 1756 is coupled to the physical register file(s) unit(s) 1758. Each of the physical register file(s) units 1758 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 1758 comprises a vector registers unit, a write mask registers unit, and a scalar registers unit. These register units may provide architectural vector registers, vector mask registers, and general purpose registers. The physical register file(s) unit(s) 1758 is overlapped by the retirement unit 1754 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 1754 and the physical register file(s) unit(s) 1758 are coupled to the execution cluster(s) 1760. The execution cluster(s) 1760 includes a set of one or more execution units 1762 and a set of one or more memory access units 1764. The execution units 1762 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 1756, physical register file(s) unit(s) 1758, and execution cluster(s) 1760 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 1764). It should also be understood that where separate pipelines are used, one or more of these pipelines may be out-of-order issue/execution and the rest in-order.

The set of memory access units 1764 is coupled to the memory unit 1770, which includes a data TLB unit 1772 coupled to a data cache unit 1774 coupled to a level 2 (L2) cache unit 1776. In one exemplary embodiment, the memory access units 1764 may include a load unit, a store address unit, and a store data unit, each of which is coupled to the data TLB unit 1772 in the memory unit 1770. The instruction cache unit 1734 is further coupled to a level 2 (L2) cache unit 1776 in the memory unit 1770. The L2 cache unit 1776 is coupled to one or more other levels of cache and eventually to a main memory.

By way of example, the exemplary register renaming, out-of-order issue/execution core architecture may implement the pipeline 1700 as follows: 1) the instruction fetch 1738 performs the fetch and length decoding stages 1702 and 1704; 2) the decode unit 1740 performs the decode stage 1706; 3) the rename/allocator unit 1752 performs the allocation stage 1708 and renaming stage 1710; 4) the scheduler unit(s) 1756 performs the schedule stage 1712; 5) the physical register file(s) unit(s) 1758 and the memory unit 1770 perform the register read/memory read stage 1714; the execution cluster 1760 perform the execute stage 1716; 6) the memory unit 1770 and the physical register file(s) unit(s) 1758 perform the write back/memory write stage 1718; 7) various units may be involved in the exception handling stage 1722; and 8) the retirement unit 1754 and the physical register file(s) unit(s) 1758 perform the commit stage 1724.

The core 1790 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 1790 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 1734/1774 and a shared L2 cache unit 1776, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary in-Order Core Architecture

FIGS. 18A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 18A is a block diagram of a single processor core, along with its connection to the on-die interconnect network 1802 and with its local subset of the Level 2 (L2) cache 1804, according to some embodiments. In one embodiment, an instruction decoder 1800 supports the x86 instruction set with a packed data instruction set extension. An L1 cache 1806 allows low-latency accesses to cache memory into the scalar and vector units. While in one embodiment (to simplify the design), a scalar unit 1808 and a vector unit 1810 use separate register sets (respectively, scalar registers 1812 and vector registers 1814) and data transferred between them is written to memory and then read back in from a level 1 (L1) cache 1806, alternative embodiments may use a different approach (e.g., use a single register set or include a communication path that allow data to be transferred between the two register files without being written and read back).

The local subset of the L2 cache 1804 is part of a global L2 cache that is divided into separate local subsets, one per processor core. Each processor core has a direct access path to its own local subset of the L2 cache 1804. Data read by a processor core is stored in its L2 cache subset 1804 and can be accessed quickly, in parallel with other processor cores accessing their own local L2 cache subsets. Data written by a processor core is stored in its own L2 cache subset 1804 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 18B is an expanded view of part of the processor core in FIG. 18A according to some embodiments. FIG. 18B includes an L1 data cache 1806A part of the L1 cache 1804, as well as more detail regarding the vector unit 1810 and the vector registers 1814. Specifically, the vector unit 1810 is a 16-wide vector processing unit (VPU) (see the 16-wide ALU 1828), which executes one or more of integer, single-precision float, and double-precision float instructions. The VPU supports swizzling the register inputs with swizzle unit 1820, numeric conversion with numeric convert units 1822A-B, and replication with replication unit 1824 on the memory input. Write mask registers 1826 allow predicating resulting vector writes.

FIG. 19 is a block diagram of a processor 1900 that may have more than one core, may have an integrated memory controller, and may have integrated graphics according to some embodiments. The solid lined boxes in FIG. 19 illustrate a processor 1900 with a single core 1902A, a system agent 1910, a set of one or more bus controller units 1916, while the optional addition of the dashed lined boxes illustrates an alternative processor 1900 with multiple cores 1902A-N, a set of one or more integrated memory controller unit(s) 1914 in the system agent unit 1910, and special purpose logic 1908.

Thus, different implementations of the processor 1900 may include: 1) a CPU with the special purpose logic 1908 being integrated graphics and/or scientific (throughput) logic (which may include one or more cores), and the cores 1902A-N being one or more general purpose cores (e.g., general purpose in-order cores, general purpose out-of-order cores, a combination of the two); 2) a coprocessor with the cores 1902A-N being a large number of special purpose cores intended primarily for graphics and/or scientific (throughput); and 3) a coprocessor with the cores 1902A-N being a large number of general purpose in-order cores. Thus, the processor 1900 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1900 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1906, and external memory (not shown) coupled to the set of integrated memory controller units 1914. The set of shared cache units 1906 may include one or more mid-level caches, such as level 2 (L2), level 3 (L3), level 4 (L4), or other levels of cache, a last level cache (LLC), and/or combinations thereof. While in one embodiment a ring based interconnect unit 1912 interconnects the integrated graphics logic 1908 (integrated graphics logic 1908 is an example of and is also referred to herein as special purpose logic), the set of shared cache units 1906, and the system agent unit 1910/integrated memory controller unit(s) 1914, alternative embodiments may use any number of well-known techniques for interconnecting such units. In one embodiment, coherency is maintained between one or more cache units 1906 and cores 1902-A-N.

In some embodiments, one or more of the cores 1902A-N are capable of multi-threading. The system agent 1910 includes those components coordinating and operating cores 1902A-N. The system agent unit 1910 may include for example a power control unit (PCU) and a display unit. The PCU may be or include logic and components needed for regulating the power state of the cores 1902A-N and the integrated graphics logic 1908. The display unit is for driving one or more externally connected displays.

The cores 1902A-N may be homogenous or heterogeneous in terms of architecture instruction set; that is, two or more of the cores 1902A-N may be capable of execution the same instruction set, while others may be capable of executing only a subset of that instruction set or a different instruction set.

Exemplary Computer Architectures

FIGS. 20-23 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 20:
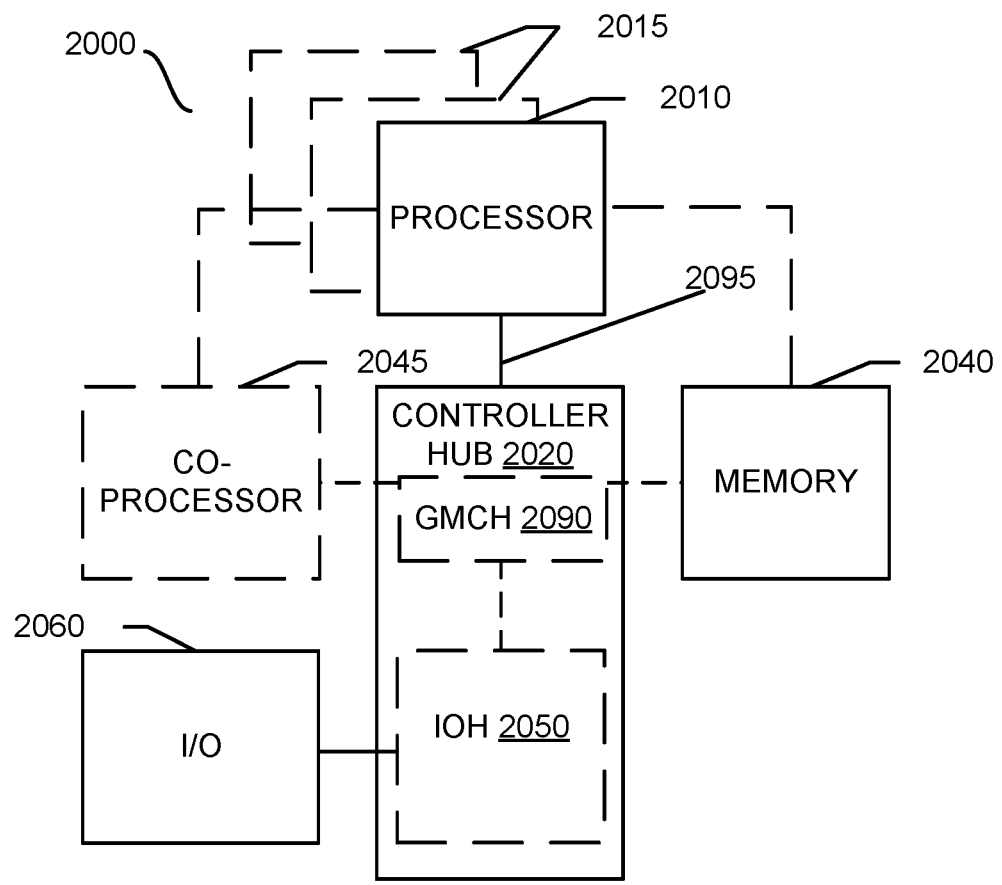
FIGS. 20-23 are block diagrams of exemplary computer architectures.

Referring now to FIG. 20, shown is a block diagram of a system 2000 in accordance some embodiments. The system 2000 may include one or more processors 2010, 2015, which are coupled to a controller hub 2020. In one embodiment the controller hub 2020 includes a graphics memory controller hub (GMCH) 2090 and an Input/Output Hub (IOH) 2050 (which may be on separate chips); the GMCH 2090 includes memory and graphics controllers to which are coupled memory 2040 and a coprocessor 2045; the IOH 2050 couples input/output (I/O) devices 2060 to the GMCH 2090. Alternatively, one or both of the memory and graphics controllers are integrated within the processor (as described herein), the memory 2040 and the coprocessor 2045 are coupled directly to the processor 2010, and the controller hub 2020 in a single chip with the IOH 2050.

The optional nature of additional processors 2015 is denoted in FIG. 20 with broken lines. Each processor 2010, 2015 may include one or more of the processing cores described herein and may be some version of the processor 1900.

The memory 2040 may be, for example, dynamic random access memory (DRAM), phase change memory (PCM), or a combination of the two. For at least one embodiment, the controller hub 2020 communicates with the processor(s) 2010, 2015 via a multi-drop bus, such as a frontside bus (FSB), point-to-point interface such as QuickPath Interconnect (QPI), or similar connection 2095.

In one embodiment, the coprocessor 2045 is a special-purpose processor, such as, for example, a high-throughput MIC processor, a network or communication processor, compression engine, graphics processor, GPGPU, embedded processor, or the like. In one embodiment, controller hub 2020 may include an integrated graphics accelerator.

There can be a variety of differences between the physical resources 2010, 2015 in terms of a spectrum of metrics of merit including architectural, microarchitectural, thermal, power consumption characteristics, and the like.

In one embodiment, the processor 2010 executes instructions that control data processing operations of a general type. Embedded within the instructions may be coprocessor instructions. The processor 2010 recognizes these coprocessor instructions as being of a type that should be executed by the attached coprocessor 2045. Accordingly, the processor 2010 issues these coprocessor instructions (or control signals representing coprocessor instructions) on a coprocessor bus or other interconnect, to coprocessor 2045. Coprocessor(s) 2045 accept and execute the received coprocessor instructions.

Figure 21:
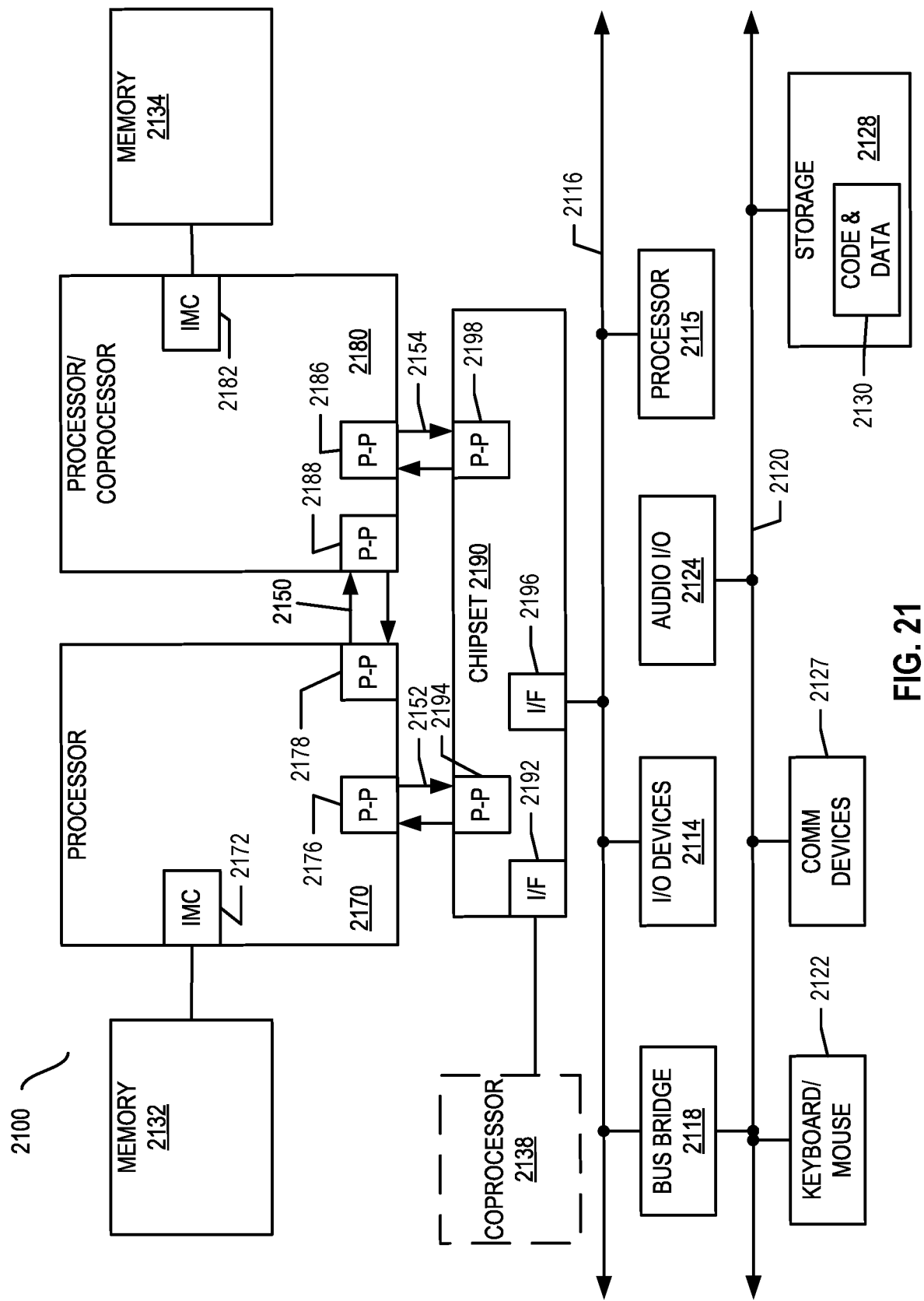

Referring now to FIG. 21, shown is a block diagram of a first more specific exemplary system 2100 in accordance with some embodiments. As shown in FIG. 21, multiprocessor system 2100 is a point-to-point interconnect system, and includes a first processor 2170 and a second processor 2180 coupled via a point-to-point interconnect 2150. Each of processors 2170 and 2180 may be some version of the processor 1900. In some embodiments, processors 2170 and 2180 are respectively processors 2010 and 2015, while coprocessor 2138 is coprocessor 2045. In another embodiment, processors 2170 and 2180 are respectively processor 2010 coprocessor 2045.

Processors 2170 and 2180 are shown including integrated memory controller (IMC) units 2172 and 2182, respectively. Processor 2170 also includes as part of its bus controller units point-to-point (P-P) interfaces 2176 and 2178; similarly, second processor 2180 includes P-P interfaces 2186 and 2188. Processors 2170, 2180 may exchange information via a point-to-point (P-P) interface 2150 using P-P interface circuits 2178, 2188. As shown in FIG. 21, IMCs 2172 and 2182 couple the processors to respective memories, namely a memory 2132 and a memory 2134, which may be portions of main memory locally attached to the respective processors.

Processors 2170, 2180 may each exchange information with a chipset 2190 via individual P-P interfaces 2152, 2154 using point to point interface circuits 2176, 2194, 2186, 2198. Chipset 2190 may optionally exchange information with the coprocessor 2138 via a high-performance interface 2192. In one embodiment, the coprocessor 2138 is a special-purpose processor, such as, for example, a high-throughput MIC processor, a network or communication processor, compression engine, graphics processor, GPGPU, embedded processor, or the like.

A shared cache (not shown) may be included in either processor or outside of both processors yet connected with the processors via P-P interconnect, such that either or both processors' local cache information may be stored in the shared cache if a processor is placed into a low power mode.

Chipset 2190 may be coupled to a first bus 2116 via an interface 2196. In one embodiment, first bus 2116 may be a Peripheral Component Interconnect (PCI) bus, or a bus such as a PCI Express bus or another third generation I/O interconnect bus, although the scope of disclosed embodiments is not so limited.

As shown in FIG. 21, various I/O devices 2114 may be coupled to first bus 2116, along with a bus bridge 2118 which couples first bus 2116 to a second bus 2120. In one embodiment, one or more additional processor(s) 2115, such as coprocessors, high-throughput MIC processors, GPGPU's, accelerators (such as, e.g., graphics accelerators or digital signal processing (DSP) units), field programmable gate arrays, or any other processor, are coupled to first bus 2116. In one embodiment, second bus 2120 may be a low pin count (LPC) bus. Various devices may be coupled to a second bus 2120 including, for example, a keyboard and/or mouse 2122, communication devices 2127 and a storage unit 2128 such as a disk drive or other mass storage device which may include instructions/code and data 2130, in one embodiment. Further, an audio I/O 2124 may be coupled to the second bus 2120. Note that other architectures are possible. For example, instead of the point-to-point architecture of FIG. 21, a system may implement a multi-drop bus or other such architecture.

Figure 22:
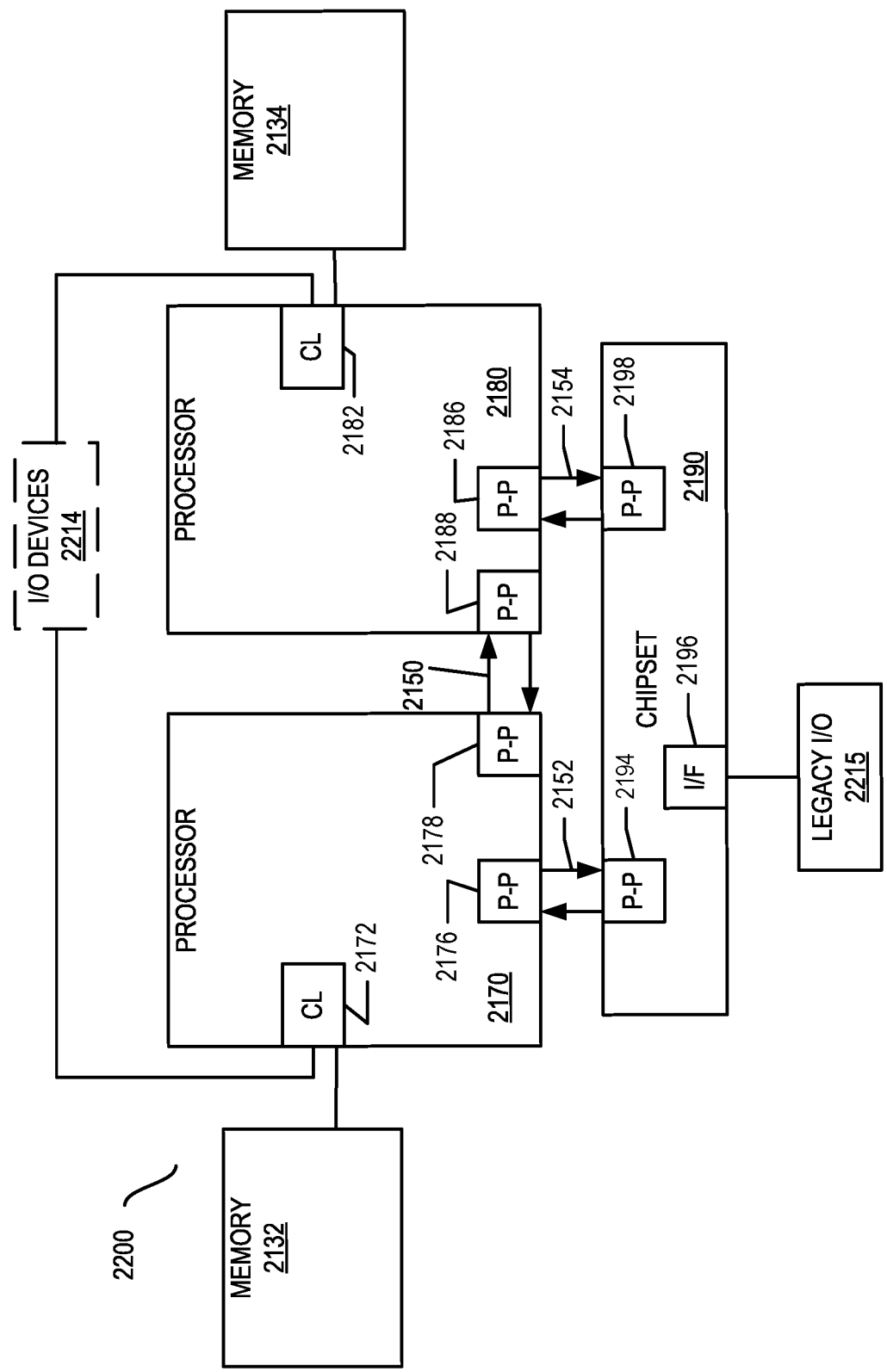

Referring now to FIG. 22, shown is a block diagram of a second more specific exemplary system 2200 in accordance with some embodiments. Like elements in FIGS. 21 and 22 bear like reference numerals, and certain aspects of FIG. 21 have been omitted from FIG. 22 in order to avoid obscuring other aspects of FIG. 22.

FIG. 22 illustrates that the processors 2170, 2180 include integrated memory and I/O control logic ("CL") 2172 and 2182, respectively. Thus, the CL 2172, 2182 include integrated memory controller units and include I/O control logic. FIG. 22 illustrates that not only are the memories 2132, 2134 coupled to the CL 2172, 2182, but also that I/O devices 2214 are also coupled to the control logic 2172, 2182. Legacy I/O devices 2215 are coupled to the chipset 2190.

Figure 23:
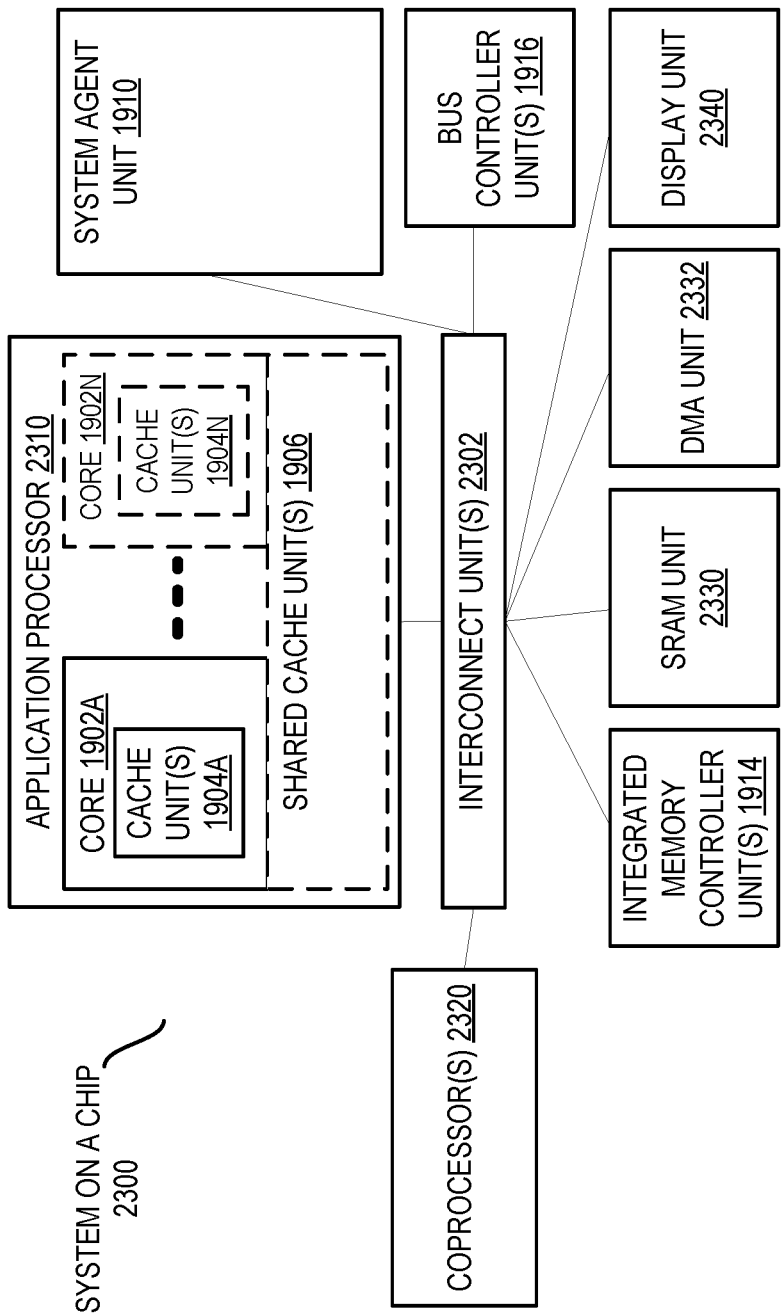

Referring now to FIG. 23, shown is a block diagram of a SoC 2300 in accordance with some embodiments. Similar elements in FIG. 19 bear like reference numerals. Also, dashed lined boxes are optional features on more advanced SoCs. In FIG. 23, an interconnect unit(s) 2302 is coupled to: an application processor 2310 which includes a set of one or more cores 1902A-N, which include cache units 1904A-N, and shared cache unit(s) 1906; a system agent unit 1910; a bus controller unit(s) 1916; an integrated memory controller unit(s) 1914; a set or one or more coprocessors 2320 which may include integrated graphics logic, an image processor, an audio processor, and a video processor; an static random access memory (SRAM) unit 2330; a direct memory access (DMA) unit 2332; and a display unit 2340 for coupling to one or more external displays. In one embodiment, the coprocessor(s) 2320 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments may be implemented as computer programs or program code executing on programmable systems comprising at least one processor, a storage system (including volatile and non-volatile memory and/or storage elements), at least one input device, and at least one output device.

Program code, such as code 2130 illustrated in FIG. 21, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

FIG. 24 is a block diagram contrasting the use of a software instruction converter to convert binary instructions in a source instruction set to binary instructions in a target instruction set according to some embodiments. In the illustrated embodiment, the instruction converter is a software instruction converter, although alternatively the instruction converter may be implemented in software, firmware, hardware, or various combinations thereof. FIG. 24 shows a program in a high level language 2402 is compiled using an x86 compiler 2404 to generate x86 binary code 2406 that can be natively executed by a processor with at least one x86 instruction set core 2416. The processor with at least one x86 instruction set core 2416 represents any processor that can perform substantially the same functions as an Intel® processor with at least one x86 instruction set core by compatibly executing or otherwise processing (1) a substantial portion of the instruction set of the Intel® x86 instruction set core or (2) object code versions of applications or other software targeted to run on an Intel® processor with at least one x86 instruction set core, in order to achieve substantially the same result as an Intel® processor with at least one x86 instruction set core. The x86 compiler 2404 represents a compiler that is operable to generate x86 binary code 2406 (e.g., object code) that can, with or without additional linkage processing, be executed on the processor with at least one x86 instruction set core 2416. Similarly, FIG. 24 shows the program in the high level language 2402 is compiled using an alternative instruction set compiler 2408 to generate alternative instruction set binary code 2410 that can be natively executed by a processor without at least one x86 instruction set core 2414 (e.g., a processor with cores that execute the MIPS instruction set of MIPS Technologies of Sunnyvale, Calif. and/or that execute the ARM instruction set of ARM Holdings of Sunnyvale, Calif.). The instruction converter 2412 is used to convert the x86 binary code 2406 into code that can be natively executed by the processor without an x86 instruction set core 2414. This converted code is not likely to be the same as the alternative instruction set binary code 2410 because an instruction converter capable of this is difficult to make; however, the converted code will accomplish the general operation and be made up of instructions from the alternative instruction set. Thus, the instruction converter 2412 represents software, firmware, hardware, or a combination thereof that, through emulation, simulation or any other process, allows a processor or other electronic device that does not have an x86 instruction set processor or core to execute the x86 binary code 2406.

What is claimed is:

1. An apparatus comprising:
a trusted execution environment to configure a plurality of compartments in an address space of memory, each compartment comprising a private memory and a pointer to an object in a shared heap of the plurality of compartments, wherein each compartment is isolated from other compartments, is unable to access the private memory of other compartments, and is unable to access any object in the shared heap that is solely assigned to another compartment;
decode circuitry to decode a single instruction into a decoded single instruction, the single instruction comprising a pointer for a first compartment to a first object in the shared heap; and
execution circuitry to execute the decoded single instruction to generate an encoded capability, based at least in part on the pointer to the first object, to allow access to the first object in the shared heap by a second compartment in response to the second compartment having the encoded capability.

2. The apparatus of claim 1, wherein:
the decode circuitry is to decode a second single instruction into a decoded second single instruction, the second single instruction comprising the encoded capability from the second compartment; and
the execution circuitry is to execute the decoded second single instruction to check the encoded capability from the second compartment and, when the check passes, provide the pointer to the first object in the shared heap to the second compartment, and, when the check fails, does not provide the pointer to the first object in the shared heap to the second compartment.

3. The apparatus of claim 2, wherein the second single instruction comprises an access size and the check comprises a check that an access at the pointer to the first object of the access size is within its authorized bounds.

4. The apparatus of claim 3, wherein the check further comprises an authentication check.

5. The apparatus of claim 4, wherein the encoded capability includes a conveyed message authentication code (MAC), and the authentication check generates a regenerated MAC, and compares the conveyed MAC to the regenerated MAC.

6. The apparatus of claim 2, wherein the check comprises an authentication check.

7. The apparatus of claim 6, wherein the encoded capability includes a conveyed message authentication code (MAC), and the authentication check generates a regenerated MAC, and compares the conveyed MAC to the regenerated MAC.

8. The apparatus of claim 2, wherein execution of the decoded second single instruction by the execution circuitry is to trigger termination of the second compartment in response to the check failing.

9. A method comprising:
configuring a plurality of compartments in an address space of memory by a trusted execution environment, each compartment comprising a private memory and a pointer to an object in a shared heap of the plurality of compartments, wherein each compartment is isolated from other compartments, is unable to access the private memory of other compartments, and is unable to access any object in the shared heap that is solely assigned to another compartment;
decoding, by decode circuitry, a single instruction into a decoded single instruction, the single instruction comprising a pointer for a first compartment to a first object in the shared heap; and
executing, by execution circuitry, the decoded single instruction to generate an encoded capability, based at least in part on the pointer to the first object, to allow access to the first object in the shared heap by a second compartment in response to the second compartment having the encoded capability.

10. The method of claim 9, further comprising:
decoding, by the decode circuitry, a second single instruction into a decoded second single instruction, the second single instruction comprising the encoded capability from the second compartment; and
executing, by the execution circuitry, the decoded second single instruction to check the encoded capability from the second compartment and, when the check passes, provide the pointer to the first object in the shared heap to the second compartment, and, when the check fails, does not provide the pointer to the first object in the shared heap to the second compartment.

11. The method of claim 10, wherein the second single instruction comprises an access size and the check comprises a check that an access at the pointer to the first object of the access size is within its authorized bounds.

12. The method of claim 11, wherein the check further comprises an authentication check.

13. The method of claim 12, wherein the encoded capability includes a conveyed message authentication code (MAC), and the authentication check generates a regenerated MAC, and compares the conveyed MAC to the regenerated MAC.

14. The method of claim 10, wherein the check comprises an authentication check.

15. The method of claim 14, wherein the encoded capability includes a conveyed message authentication code (MAC), and the authentication check generates a regenerated MAC, and compares the conveyed MAC to the regenerated MAC.

16. The method of claim 10, wherein the executing the decoded second single instruction triggers termination of the second compartment in response to the check failing.

17. A non-transitory computer-readable medium containing code, that when executed by a machine, causes the machine to perform a method comprising:
configuring a plurality of compartments in an address space of memory by a trusted execution environment, each compartment comprising a private memory and a pointer to an object in a shared heap of the plurality of compartments, wherein each compartment is isolated from other compartments, is unable to access the private memory of other compartments, and is unable to access any object in the shared heap that is solely assigned to another compartment;
decoding, by decode circuitry, a single instruction into a decoded single instruction, the single instruction comprising a pointer for a first compartment to a first object in the shared heap; and
executing, by execution circuitry, the decoded single instruction to generate an encoded capability, based at least in part on the pointer to the first object, to allow access to the first object in the shared heap by a second compartment in response to the second compartment having the encoded capability.

18. The non-transitory computer-readable medium of claim 17, wherein the method further comprises:
    decoding, by the decode circuitry, a second single instruction into a decoded second single instruction, the second single instruction comprising the encoded capability from the second compartment; and
    executing, by the execution circuitry, the decoded second single instruction to check the encoded capability from the second compartment and, when the check passes, provide the pointer to the first object in the shared heap to the second compartment, and, when the check fails, does not provide the pointer to the first object in the shared heap to the second compartment.

19. The non-transitory computer-readable medium of claim 18, wherein the second single instruction comprises an access size and the check comprises a check that an access at the pointer to the first object of the access size is within its authorized bounds.

20. The non-transitory computer-readable medium of claim 19, wherein the check further comprises an authentication check.

21. The non-transitory computer-readable medium of claim 20, wherein the encoded capability includes a conveyed message authentication code (MAC), and the authentication check generates a regenerated MAC, and compares the conveyed MAC to the regenerated MAC.

22. The non-transitory computer-readable medium of claim 18, wherein the check comprises an authentication check.

23. The non-transitory computer-readable medium of claim 22, wherein the encoded capability includes a conveyed message authentication code (MAC), and the authentication check generates a regenerated MAC, and compares the conveyed MAC to the regenerated MAC.

24. The non-transitory computer-readable medium of claim 18, wherein the executing the decoded second single instruction triggers termination of the second compartment in response to the check failing.

* * * * *